(12) United States Patent
Jung et al.

(10) Patent No.: US 11,885,065 B2
(45) Date of Patent: Jan. 30, 2024

(54) CLOTHING TREATMENT APPARATUS AND CONTROL METHOD THEREFOR

(71) Applicant: LG Electronics Inc., Seoul (KR)

(72) Inventors: Hansu Jung, Seoul (KR); Jaemin Kim, Seoul (KR); Sangwoo Park, Seoul (KR); Junho Lee, Seoul (KR); Lisuel Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/075,050

(22) Filed: Dec. 5, 2022

(65) Prior Publication Data

US 2023/0104393 A1 Apr. 6, 2023

Related U.S. Application Data

(63) Continuation of application No. 17/053,002, filed as application No. PCT/KR2019/005318 on May 3, 2019, now Pat. No. 11,535,975.

(30) Foreign Application Priority Data

May 4, 2018 (KR) .................... 10-2018-0052016
May 4, 2018 (KR) .................... 10-2018-0052019
(Continued)

(51) Int. Cl.
*D06F 58/50* (2020.01)
*D06F 34/10* (2020.01)
(Continued)

(52) U.S. Cl.
CPC .............. *D06F 58/50* (2020.02); *D06F 34/10* (2020.02); *D06F 58/20* (2013.01); *D06F 58/206* (2013.01);
(Continued)

(58) Field of Classification Search
CPC .......... D06F 58/50; D06F 58/34; D06F 34/10; D06F 58/20; D06F 58/206;
(Continued)

(56) References Cited

U.S. PATENT DOCUMENTS 1,975,805 A * 10/1934 Smith ................. A61L 2/02
43/900
3,426,555 A * 2/1969 McCutcheon, Jr. .... D06F 43/08
68/18 R
(Continued)

FOREIGN PATENT DOCUMENTS

CN 103384737 11/2013
CN 104870710 8/2015
(Continued)

OTHER PUBLICATIONS

Office Action in Korean Appln. No. KR 10-2018-0052016, dated Jan. 17, 2023, 15 pages (with English translation).
(Continued)

*Primary Examiner* — Stephen M Gravini
(74) *Attorney, Agent, or Firm* — Fish & Richardson P.C.

(57) ABSTRACT

The present specification relates to a clothing treatment apparatus and a control method therefor, the clothing treatment apparatus comprising: a plurality of inverters for controlling the motors of a drum, a compressor, and a blowing fan; a converter for converting input power input from an external source and outputting the converted power to the inverters; and a control unit for controlling the plurality of inverters and the converter.

20 Claims, 37 Drawing Sheets

(30) Foreign Application Priority Data

| May 4, 2018 | (KR) | 10-2018-0052055 |
|---|---|---|
| May 4, 2018 | (KR) | 10-2018-0052059 |
| May 8, 2018 | (KR) | 10-2018-0052744 |

(51) Int. Cl.

| D06F 58/20 | (2006.01) |
|---|---|
| D06F 58/34 | (2020.01) |
| H02P 5/74 | (2006.01) |
| D06F 103/04 | (2020.01) |
| D06F 103/44 | (2020.01) |
| D06F 103/46 | (2020.01) |
| D06F 103/48 | (2020.01) |
| D06F 105/26 | (2020.01) |
| D06F 105/30 | (2020.01) |
| D06F 105/46 | (2020.01) |
| D06F 101/00 | (2020.01) |
| D06F 101/14 | (2020.01) |
| D06F 101/20 | (2020.01) |

(52) U.S. Cl.

CPC ............ D06F 58/34 (2020.02); H02P 5/74 (2013.01); *D06F 2101/00* (2020.02); *D06F 2101/14* (2020.02); *D06F 2101/20* (2020.02); *D06F 2103/04* (2020.02); *D06F 2103/44* (2020.02); *D06F 2103/46* (2020.02); *D06F 2103/48* (2020.02); *D06F 2105/26* (2020.02); *D06F 2105/30* (2020.02); *D06F 2105/46* (2020.02)

(58) Field of Classification Search

CPC ............ D06F 2105/46; D06F 2103/48; D06F 2101/14; D06F 2103/44; D06F 2013/04; D06F 2103/46; D06F 2101/20; D06F 2105/30; D06F 2105/26; D06F 2101/00; D06F 2103/50; D06F 2505/36; D06F 29/005

USPC .............................................. 34/90, 595–610

See application file for complete search history.

(56) References Cited

U.S. PATENT DOCUMENTS

| 5,396,413 | A | 3/1995 | Kaneko et al. |
|---|---|---|---|
| 5,564,831 | A | 10/1996 | Bashark |
| 8,424,347 | B2 | 4/2013 | Maekawa et al. |
| 9,097,462 | B2 | 8/2015 | Lorenc et al. |
| 9,356,542 | B2 | 5/2016 | Ragogna et al. |
| 9,670,612 | B2 | 6/2017 | Lee et al. |
| 10,003,295 | B2 | 6/2018 | Saha et al. |
| 10,087,572 | B2 | 10/2018 | Bilionis et al. |
| 10,316,460 | B2 | 6/2019 | Forman |
| 10,676,859 | B2 * | 6/2020 | Vitali ............ D06F 58/38 |
| 11,105,034 | B2 | 8/2021 | Jang et al. |
| 11,535,975 | B2 * | 12/2022 | Jung ............ D06F 58/206 |
| 11,638,363 | B2 * | 4/2023 | Lee ............ H05K 7/20145 34/493 |
| 2007/0145941 | A1 | 6/2007 | Asada et al. |
| 2010/0083693 | A1 | 4/2010 | Todd et al. |
| 2014/0018962 | A1 | 1/2014 | Jung et al. |
| 2015/0354870 | A1 | 12/2015 | Lee et al. |
| 2020/0190726 | A1 | 6/2020 | Jang et al. |
| 2021/0176891 | A1 | 6/2021 | Lee et al. |
| 2021/0254266 | A1 | 8/2021 | Jung et al. |
| 2023/0104393 | A1 * | 4/2023 | Jung ............ H02P 27/085 34/90 |
| 2023/0265599 | A1 * | 8/2023 | Rensing ............ D06F 58/04 34/321 |

FOREIGN PATENT DOCUMENTS

| EP | 2345757 | 7/2011 |
|---|---|---|
| EP | 2487290 | 8/2012 |
| EP | 3789534 | 2/2022 |
| JP | 2004-236965 | 8/2004 |
| JP | 2005-295759 | 10/2005 |
| JP | 2007318984 | 12/2007 |
| JP | 2010-081959 | 4/2010 |
| JP | 2013052065 | 3/2013 |
| JP | 2013-219989 | 10/2013 |
| JP | 2014-023747 | 2/2014 |
| JP | 2018-007502 | 1/2018 |
| KR | 10-1998-0032694 | 7/1998 |
| KR | 10-2013-0067440 | 6/2013 |
| KR | 1020130101914 | 9/2013 |
| KR | 1020140018583 | 2/2014 |
| KR | 10-2016-0046555 | 4/2016 |
| KR | 10-2016-0097920 | 8/2016 |
| KR | 1020170001437 | 1/2017 |
| SU | 1633042 | 3/1991 |
| WO | WO2012107347 | 8/2012 |
| WO | WO2019212282 | 11/2019 |

OTHER PUBLICATIONS

Office Action in Korean Appln. No. KR 10-2018-0052019, dated Jan. 17, 2023, 18 pages (with English translation).

Office Action in Korean Appln. No. KR 10-2018-0052055, dated Jan. 18, 2023, 10 pages (with English translation).

Office Action in Korean Appln. No. KR 10-2018-0052059, dated Jan. 26, 2023, 11 pages (with English translation).

Extended European Search Report in European Appln. No. 19795997.6, dated Jan. 14, 2022, 9 pages.

Office Action in Chinese Appln. No. 201980030261.9, dated Jun. 22, 2022, 27 pages (with English translation).

Notice of Allowance in Korean Appln. No. 10-2018-0052059, dated Oct. 10, 2023, 8 pages (with English translation).

Office Action in Korean Appln. No. 10-2018-0052744, dated Aug. 2, 2023, 8 pages (with English translation).

\* cited by examiner

CLOTHING TREATMENT APPARATUS AND CONTROL METHOD THEREFOR

CROSS-REFERENCE TO RELATED APPLICATIONS

This application is a continuation of U.S. application Ser. No. 17/053,002, filed on Nov. 4, 2020, which is a National Stage application under 35 U.S.C. § 371 of International Application No. PCT/KR2019/005318, filed on May 3, 2019, which claims the benefit of earlier filing dates of and the right of priority to Korean Patent Application Nos. 10-2018-0052016, filed on May 4, 2018, 10-2018-0052019, filed on May 4, 2018, 10-2018-0052055, filed on May 4, 2018, 10-2018-0052059, filed on May 4, 2018, and 10-2018-0052744, filed on May 8, 2018, the contents of which are incorporated by reference herein in their entirety.

TECHNICAL FIELD

The present disclosure relates to a clothing treatment apparatus including a plurality of inverters and a converter to perform a drying function, and a control method thereof.

BACKGROUND

A clothing treatment apparatus performing a drying function supplies hot air into a rotating drum while an object to be dried, such as clothes or bedding, is put into the drum to remove moisture absorbed by the object to be dried. The hot air supplied into the drum is generated by electric resistance heat, combustion heat using gas fuel, or a condenser constituting a heat pump cycle, and the generated hot air is supplied into the drum by a blower fan. The moisture of the object to be dried is evaporated in the drum, and the air getting out of the drum retains the moisture of the object to be dried, resulting in a high-temperature and high-humidity state.

Korean Patent Publication No. 10-2013-0101914 (published on Sep. 16, 2013, hereinafter referred to as "priority document") discloses a dryer having a drying mode selection member. Since the drum and the blower fan included in the dryer disclosed in the prior literature are connected to the same motor, the drum and the blower fan are driven in synchronization with each other.

As described above, in the case of a dryer in which the drum and the blower fan are connected to the same motor, the rotation control of the drum and the operation control of the blower fan cannot be independently carried out, and thus there is a problem of limiting the control method of the dryer.

In general, since a control unit of the dryer is designed to drive a single motor connected to the drum and the blower fan and a compressor of a heat pump system, the above problem of the dryer cannot be solved by simply adding an additional motor.

Meanwhile, in the case of a configuration in which a motor is added as described above, it may cause a problem due to overload as the number of motors provided in the dryer and inverters supplying power to the motor increases.

In order to solve the foregoing problem, a converter may be added to a circuit controlling the dryer, but when the converter and a plurality of inverters are simultaneously driven, oil in a compressor of the heat pump may flow back, thereby causing a leakage current on a control circuit. When the leakage current increases, it may lead to a problem in which the possibility of occurrence of an overshoot, that is, an overcurrent, increases.

Furthermore, as the number of motors provided in the dryer and inverters supplying power to the motors increases, the heat value of a substrate constituting the control unit increases, thereby deteriorating the operation stability of the clothing treatment apparatus.

In addition, in a configuration including a plurality of inverters in a control device, there is also a problem that it is difficult to stably perform the driving control of the motor. In the configuration of a control device including a plurality of inverters, driving control is carried out in such a manner that DC power is transferred from a DC link capacitor included in a converter to the plurality of inverters, and the plurality of inverters converts the received DC power into driving power to apply the converted DC power to each of the plurality of motors. The control unit of the dryer controls the operation of the converter and the plurality of inverters based on the DC link voltage, the output voltage of the converter, or the input/output voltage of the plurality of inverters, thereby controlling the driving of the plurality of motors. In such a control configuration, when a DC link voltage rises rapidly during an initial operation of the dryer, that is, during an initial operation of the converter, a difference between a previous voltage value and a current voltage value increases, and control for the converter or the plurality of inverters may not be carried out accurately. In other words, an error occurs between control periods, and there is a concern that the detection of an accurate control parameter and control based thereon may become unstable due to such an error. The concern of instability of control during the initial operation causes a problem in which the driving of the dryer itself is unstably carried out, and also causes a problem that the operation of the plurality of inverters receiving the DC power from the DC link capacitor is inaccurately carried out.

In recent years, consumers are demanding a dryer with a larger capacity, and in order to provide a dryer capable of solving the foregoing problems as well as satisfying such demand, studies on a dryer having a plurality of motors has been performed.

SUMMARY

An aspect of the present disclosure is to provide a clothing treatment apparatus capable of solving the above-described problems as a technical task, and a control method thereof.

An aspect of the present disclosure is to provide a clothing treatment apparatus capable of maintaining stability as well as driving a drum and a blower fan by separate motors, and a control method thereof.

Furthermore, an aspect of the present disclosure is to provide a clothing treatment apparatus provided with a plurality of inverters and a converter together to stably cope with overload, and a control method thereof.

Furthermore, an aspect of the present disclosure is to provide a method of controlling a converter included in a clothing treatment apparatus according to an operating state of the clothing treatment apparatus, a clothing treatment apparatus of performing the method, and a control method thereof.

Furthermore, an aspect of the present disclosure is to provide a clothing treatment apparatus capable of preventing the heat generation of a control unit even when drying capacity is increased, and a control method thereof.

Furthermore, an aspect of the present disclosure is to provide a clothing treatment apparatus capable of preventing a leakage current from occurring in a control circuit of the clothing treatment apparatus having a relatively large drying capacity, and a control method thereof.

Furthermore, an aspect of the present disclosure is to provide a clothing treatment apparatus of performing converter operation control to minimize a leakage current of a control circuit, and a control method thereof.

In particular, an aspect of the present disclosure is to provide a clothing treatment apparatus capable of eliminating the possibility of occurrence of an overcurrent without the need of determining an additional driving point during the driving of a converter, and a control method thereof.

In addition, an aspect of the present disclosure is to provide a clothing treatment apparatus capable of determining a time point of outputting a pulse width modulation duty of a converter when performing a drying operation in consideration of a size of load so as to improve the stable driving and control stability of a motor, and a control method thereof.

Furthermore, an aspect of the present disclosure is to provide a clothing treatment apparatus capable of performing converter operation control to prevent a malfunction due to a sudden increase in power consumption or an overload according to the operation state of a compressor and a plurality of motors, and a control method thereof.

Furthermore, an aspect of the present disclosure is to provide a clothing treatment apparatus capable of preventing a failure due to the heat generation of a converter as well as having a plurality of inverters and the converter together.

Furthermore, an aspect of the present disclosure is to provide a clothing treatment apparatus capable of reducing the heat generation of a converter when the converter and a compressor are provided in a single housing or provided in close proximity to each other, and a control method thereof.

Furthermore, an aspect of the present disclosure is to provide a clothing treatment apparatus capable of performing converter operation control so as to reduce current noise in a clothing treatment apparatus provided with a converter, and a control method thereof.

Furthermore, an aspect of the present disclosure is to provide a clothing treatment apparatus capable of accurately measuring a motor phase current of the clothing treatment apparatus provided with a plurality of inverters and a converter so as to reduce an operation error of the clothing treatment apparatus, and a control method thereof.

Moreover, an aspect of the present disclosure is to provide a clothing treatment apparatus capable of being usefully applicable to a control device of the clothing treatment apparatus including a power factor correction (PFC) applied converter and a plurality of inverters for controlling a plurality of motors to perform stable motor control, and a control method thereof.

In particular, an aspect of the present disclosure is to provide a clothing treatment apparatus capable of sequentially increasing a DC link voltage of a DC link capacitor so as to reduce an error between control periods during the initially driving of the clothing treatment apparatus, and a control method thereof.

Furthermore, an aspect of the present disclosure is to provide a clothing treatment apparatus capable of sequentially increasing a DC link voltage of a DC link capacitor so as to stably store a voltage stored in the DC link capacitor during the initial driving of the clothing treatment apparatus, and a control method thereof.

Furthermore, an aspect of the present disclosure is to provide a clothing treatment apparatus capable of sequentially increasing a DC link voltage of a DC link capacitor to stably transfer DC power supplied from the DC link capacitor to a plurality of inverters, and a control method thereof.

Besides, an aspect of the present disclosure is to provide a clothing treatment apparatus capable of appropriately increasing a DC link voltage according to a driving state of the clothing treatment apparatus, and a control method thereof.

In order to solve the foregoing technical problems, a clothing treatment apparatus and a control method thereof according to an embodiment of the present disclosure may provide embodiments of the clothing treatment apparatus and the control method thereof capable of solving one or more of the above technical problems, respectively.

In order to solve one or more of the foregoing technical problems, a clothing treatment apparatus according to an embodiment of the present disclosure may include a main body defining an appearance thereof, a drum that accommodates an object to be dried, which is rotatably provided inside the main body, a compressor of a heat pump that compresses refrigerant to allow dehumidified air to pass through a condenser so as to be thermally circulated to the drum when moisture is removed from heated air absorbed from the object to be dried, a blower fan that generates a flow of the heated air or dehumidified air, a plurality of inverters that transfer power to at least one of the drum, the compressor, and the blower fan, a converter that converts input power received from the outside to output the converted power to the inverters, and a control unit that generates command information corresponding to the plurality of inverters to control the converter based on the generated command information.

According to one embodiment, the plurality of inverters may include a first inverter that transfers power to a first motor that rotates the drum, a second inverter that transfers power to a second motor that rotates the blower fan, and a third inverter that transfers power to a third motor that drives the compressor.

According to one embodiment, the control unit may generate a first switching signal, a second switching signal, and a third switching signal corresponding to the first to third inverters, respectively, and control an operation of the converter based on the generated first to third switching signals.

According to one embodiment, the control unit may detect a magnitude of load applied to the first to third inverters, and control an operation of the converter based on the detected magnitude.

According to one embodiment, the clothing treatment apparatus may further include an input unit that receives a user input for setting an operation mode of the clothing treatment apparatus, wherein the control unit controls the converter based on the applied user input.

According to one embodiment, the control unit may control the converter based on an operation time of the clothing treatment apparatus set by the user input.

According to one embodiment, the control unit may control the converter based on a temperature of hot air supplied into the drum set by the user input.

According to one embodiment, the clothing treatment apparatus may further include a sensing unit that senses the weight of an object to be dried accommodated in the drum, wherein the control unit controls the converter based on the weight of the object to be dried accommodated in the drum.

According to one embodiment, the control unit may set the outputs of the first to third inverters, respectively, based on a set operation mode of the clothing treatment apparatus, and control the operation of the converter based on the set outputs of the first to third inverters.

According to one embodiment, the control unit may detect a voltage level of the input power, and distribute the output of the converter based on the detected level.

According to one embodiment, the converter may include an inductor that receives the input power to transfer energy, a power switch connected to a rear end of the inductor to transfer the energy from the inductor to an output end thereof during a switching-off operation according to a duty control signal based on a switching signal of the control unit, and block the transfer of the energy to the output end during a switching-on operation, a diode connected in parallel to the power switch at the rear end of the inductor to transfer the energy to the output end, and block a reverse flow of energy from the output end during the switching-on operation of the power switch, and an output capacitor connected in parallel to a load at the output end, which is a rear end of the diode to charge part of the energy transferred through the diode, and output the charged energy to the load during an on-operation of the power switch.

According to one embodiment, the control unit may control a switching operation of the converter by receiving feedback from the output of the converter.

In addition, in order to solve one or more of the foregoing technical problems, a clothing treatment apparatus according to another embodiment of the present disclosure may include a main body defining an appearance thereof, a drum that accommodates an object to be dried, which is rotatably provided inside the main body, a compressor of a heat pump that compresses refrigerant to allow dehumidified air to pass through a condenser so as to be thermally circulated to the drum when moisture is removed from heated air absorbed from the object to be dried, a blower fan that generates a flow of the heated air or dehumidified air, a converter that converts input power received from the outside to output the converted power to at least one of a first motor that rotates the drum, a second motor that drives the blower fan, and a third motor that drives the compressor, and a control unit that controls the switching elements of the converter in a pulse width modulation (PWM) mode, wherein the control unit variably sets a switching period, which is a period that generates a PWM signal for operating the converter.

According to one embodiment, the control unit may generate a second PWM signal after the first PWM signal is generated, and generates a third PWM signal after the second PWM signal is generated, and set a first switching period that is an interval between a time point of generating the first PWM signal and a time point of generating the second PWM signal, and a second switching period that is an interval between a time point of generating the second PWM signal and a time point of generating the third PWM signal to be different from each other.

According to one embodiment, the control unit may randomly select any one switching period value within a predetermined period range excluding the first switching period value, and set the selected switching period value as the second switching period.

According to one embodiment, the control unit may set the second switching period by increasing or decreasing a predetermined value in the first switching period.

According to one embodiment, the control unit may randomly select any one of a plurality of preset switching period values whenever generating any one PWM control signal, and generate a PWM control signal following the generated any one PWM control signal.

According to one embodiment, the control unit may randomly determine the switching period, but set the switching period such that the determined switching period is included in a preset switching period range.

According to one embodiment, the control unit may detect a magnitude of load applied to the first to third motors, and set the switching period range based on the detected magnitude of the load.

According to one embodiment, the control unit may select a plurality of preset switching period values in a predetermined order whenever generating any one PWM control signal, and generate a PWM control signal following the generated any one PWM control signal.

According to one embodiment, the control unit may detect a magnitude of load applied to the first to third motors, and fix a switching frequency to a preset frequency value when the detected magnitude of the load is above a preset limit load value.

According to one embodiment, the control unit may sense the heat value of the converter, and maintain the switching period as a one period value when the sensed heat value is less than a preset limit heat value, and variably set the switching period when the sensed heat value exceeds a preset limit heat value.

According to one embodiment, the clothing treatment apparatus may further include a sensor unit that senses the weight of a fabric accommodated in the drum, wherein the control unit increases a change width of the switching period when the weight of the fabric sensed by the sensor unit exceeds a preset limit weight.

In addition, in order to solve one or more of the foregoing technical problems, a clothing treatment apparatus according to still another embodiment of the present disclosure may include a drum that accommodates an object to be dried, which is rotatably provided inside the main body, a compressor of a heat pump that compresses refrigerant to allow dehumidified air to pass through a condenser so as to be thermally circulated to the drum when moisture is removed from heated air absorbed from the object to be dried, a blower fan that generates a flow of the heated air or dehumidified air, a plurality of motors that drives the drum, the blower fan, and the compressor of the heat pump, a converter that converts input AC power into DC power to provide the converted DC power to a DC link capacitor, a plurality of inverters that convert DC power stored in the DC link capacitor into AC power, and supply the AC power to the plurality of motors, respectively, by the switching operation of switching elements, and a control unit that controls the switching operation of switching elements provided in the converter and the plurality of inverters by pulse width modulation mode control, and control the switching operation of the converter in a first operation mode in which the pulse width modulation duty is limited after driving the blowing fan, and control the switching operation of the converter by switching the first operation mode to a second operation mode in which the limit of pulse width modulation duty is released when a predetermined condition is satisfied, wherein the switching operation of the converter is controlled to increase an output voltage output from the converter to the DC link capacitor according to the duty limit of pulse width modulation in the first operation mode, and to output the pulse width modulation duty within a predetermined limit current value to the plurality of inverters in the second operation mode.

According to one embodiment, the first operation mode may be performed simultaneously with the driving of the converter, and the second operation mode may be performed after a predetermined time period elapses after the driving of the converter.

According to one embodiment, the clothing treatment apparatus may further include a speed detection unit that detects a driving speed of the compressor of the heat pump, wherein the control unit computes the magnitude of load based on the driving speed detected by the speed detection unit, and maintain the first operation mode while the computed magnitude of load is below a predetermined level.

According to one embodiment, the control unit may control the switching operation of the converter by switching the first operation mode to the second operation mode when the computed magnitude of load exceeds the predetermined level.

According to one embodiment, the clothing treatment apparatus may further include a speed detection unit that detects a driving speed of the compressor of the heat pump, wherein the control unit performs the switching of the switching elements in the converter to perform the first operation mode in which the output voltage of the converter increases while the detected driving speed is below a predetermined threshold value, and to output a variable pulse width modulation duty according to a predetermined voltage command value when the detected driving speed exceeds the predetermined threshold value.

According to one embodiment, when the output voltage output from the converter exceeds a predetermined limit voltage while performing the first operation mode, it may be switched to the second operation mode.

According to one embodiment, when the magnitude of the output current of the converter is less than a predetermined threshold value after switching to the second operation mode, the control unit may control the switching operation of the converter in a third operation mode in which the output voltage of the converter increases step-by-step to a predetermined voltage command value.

According to one embodiment, when the output voltage of the converter reaches a predetermined voltage command value while performing the third operation mode, the control unit may control the switching operation of the converter to switch to the second operation mode so as to correspond to a set pulse width modulation duty.

According to one embodiment, the first operation mode may be performed simultaneously with the driving of the compressor of the heat pump after driving the blower fan.

According to one embodiment, the first operation mode may be performed after a predetermined time period has elapsed subsequent to driving the blower fan, the drum, and the compressor of the heat pump.

According to one embodiment, when it is detected that the current value of an output current detected while operating in the second operation mode exceeds a threshold value for more than a predetermined number of times, the control unit may reduce the magnitude of the predetermined limit current value.

According to one embodiment, reduction in the magnitude of the predetermined limiting current value may be performed by reducing the pulse width modulation duty for a predetermined time period.

In addition, another embodiment of a clothing treatment apparatus according to the foregoing embodiment may include a drum that accommodates an object to be dried, which is rotatably provided inside the main body, a compressor of a heat pump that compresses refrigerant to allow dehumidified air to pass through a condenser so as to be thermally circulated to the drum when moisture is removed from heated air absorbed from the object to be dried, a blower fan that generates a flow of the heated air or dehumidified air, a plurality of motors that drives the drum, the blower fan, and the compressor of the heat pump, a converter that converts input AC power into DC power to provide the converted DC power to a DC link capacitor, a plurality of inverters that convert DC power stored in the DC link capacitor into AC power, and supply the AC power to the plurality of motors, respectively, by the switching operation of switching elements, a speed detection unit that detects a driving speed of the compressor of the heat pump subsequent to driving the blower fan, and a control unit that controls the switching operation of switching elements provided in the converter and the plurality of inverters by pulse width modulation mode control, and control the switching operation of the converter using either one of a first operation mode in which the pulse width modulation duty is limited based on the driving speed detected by the speed detection unit and a second operation mode in which the limit of pulse width modulation duty is released, wherein the switching operation of the converter is controlled to increase an output voltage output from the converter to the DC link capacitor according to the duty limit of pulse width modulation in the first operation mode, and to output the pulse width modulation duty within a predetermined limit current value to the plurality of inverters in the second operation mode.

In addition, in order to solve one or more of the foregoing technical problems, a clothing treatment apparatus according to yet still another embodiment of the present disclosure may include a main body defining an appearance thereof, a drum that accommodates an object to be dried, which is rotatably provided inside the main body, a compressor of a heat pump that compresses refrigerant to allow dehumidified air to pass through a condenser so as to be thermally circulated to the drum when moisture is removed from heated air absorbed from the object to be dried, a blower fan that generates a flow of the heated air or dehumidified air, a converter that converts input power received from the outside to output the converted power to at least one of a first motor that rotates the drum, a second motor that drives the blower fan, and a third motor that drives the compressor, and a control unit that controls at least one of the converter and the compressor to allow the converter to be driven from a second time point later than a first time point at which the compressor is driven.

According to one embodiment, the control unit may drive the converter after a predetermined time interval elapses from a time point of initiating the driving of the compressor.

According to one embodiment, the control unit may detect the magnitude of load applied to the compressor, and control the driving of the converter to change a time interval from a time point of initiating the operation of the compressor to a time point of initiating the operation of the converter based on the detected load.

According to one embodiment, the control unit may generate a speed command value corresponding to the third motor, and control the driving of the converter based on the generated speed command value.

According to one embodiment, when a speed command value corresponding to the third motor increases, the control unit may control the driving of the converter to reduce a time interval from a time point of initiating the operation of the compressor to a time point of initiating the operation of the converter.

According to one embodiment, when the magnitude of the voltage applied to the third motor increases, the control unit may control the driving of the converter to reduce a time interval from a time point of initiating the operation of the compressor to a time point of initiating the operation of the converter.

According to one embodiment, when the magnitude of the current flowing through the third motor increases, the control unit may control the driving of the converter to reduce a time interval from a time point initiating the operation of the compressor to a time point of initiating the operation of the converter.

According to one embodiment, the clothing treatment apparatus may further include a weight sensing unit that senses the weight of a fabric accommodated in the drum, and the control unit may control the driving of the converter based on the weight of the fabric detected by the weight sensing unit.

According to one embodiment, when the weight of the fabric sensed by the sensor unit, the control unit may control the driving of the converter to reduce a time interval from a time point of initiating the compressor operation to a time point of initiating the operation of the converter.

According to one embodiment, the control unit may simultaneously drive the converter with the compressor when the magnitude of load applied to the compressor is above a preset limit load.

According to one embodiment, the control unit may activate the driving of the converter before the third motor reaches a preset speed.

According one embodiment, the control unit may compute the amount of power consumed by the first motor, the second motor, and the third motor, and control the driving of the converter based on the computed power.

According to one embodiment, the control unit may first rotate the drum, and drive the blower fan after the drum starts to rotate, and drive the compressor after the blower fan starts to drive.

According to one embodiment, the clothing treatment apparatus may further include an inverter including a first inverter, a second inverter and a third inverter for supplying power to the first to third motors, respectively, wherein the control unit independently controls the switching operations of the first to third inverters, respectively.

According to one embodiment, the control unit may control the driving of the converter based on a switching signal applied to the first to third inverters.

According to one embodiment, the control unit may delay a start time point of the operation of the converter by a predetermined time period from a start time point of the operation of the compressor or a start time point of the rotation of the drum to reduce a leakage current in the control unit.

In addition, in order to solve one or more of the foregoing technical problems, a clothing treatment apparatus according to still yet another embodiment of the present disclosure may control the operation of the converter to increase a DC link voltage stored in a DC link capacitor according to a preset increase reference when the clothing treatment apparatus is initially driven.

Here, the increase reference is a reference for an increase slope or an increase method of the DC link voltage, and refers to a reference for softly increasing the DC link voltage, and a control device of a clothing treatment apparatus, a clothing treatment apparatus and a control method thereof according to an embodiment of the present disclosure may be controlled to increase the DC link voltage according to the increase reference.

In other words, a clothing treatment apparatus and a control method thereof according to a fifth embodiment of the present disclosure may have a technical feature in that an operation of the converter that transmits DC power to the DC link capacitor is controlled, thereby controlling the DC link voltage to increase according to the increase reference.

More specifically, the converter may convert AC power into DC power to control the output of a rectifying member for transmitting the DC power to the DC link capacitor according to the increase reference so as to increase the output of the DC power being output from the rectifying member to the DC link capacitor according to the increase reference, thereby controlling the DC link voltage to increase according to the increase reference.

In this case, a target output value of the DC power output from the rectifying member to the DC link capacitor or a target voltage value of the DC link capacitor may be sequentially increased according to the increase reference to control the operation of the converter, thereby controlling the DC link voltage to increase according to the increase reference.

A clothing treatment apparatus and a control method thereof, a control device of a clothing treatment apparatus and a control method thereof according to an embodiment of the present disclosure having the above-described technical features may provide a control device for controlling a clothing treatment apparatus, a microcomputer of the clothing treatment apparatus, a control method of the control device of the clothing treatment apparatus, a control device of the clothing treatment apparatus, which is applicable and implementable to the control method of the clothing treatment apparatus, and embodiments of the control methods 1 and 2 of the clothing treatment apparatus.

A control device of the clothing treatment apparatus according to an embodiment of the present disclosure is a control device for controlling the clothing treatment apparatus, including a converter having a rectifying member that converts AC power input from an external power supply into DC power, and a DC link capacitor that smooths the DC power converted by the rectifying member, a plurality of inverters having a switching unit that converts the DC power smoothed by the DC link capacitor into driving power for driving a plurality of motors driving the clothing treatment apparatus to output it to the plurality of motors, respectively, and a control unit that generates a control signal for controlling the operation of the converter and the inverters to transfer it to the converter and the inverters, respectively, wherein the control unit controls the operation of the converter to increase a DC link voltage stored in the DC link capacitor according to a preset increase reference when the clothing treatment apparatus is initially driven, so as to increase the DC link voltage to the increase reference.

According to one embodiment, the control unit may sequentially increase a target output value of the DC power output from the converter according to the increase reference to control the operation of the converter.

According to one embodiment, the increase reference may be a reference for an increase slope or an increase method of the DC link voltage.

According to one embodiment, the increase reference may be set such that the DC link voltage increases by a predetermined level per hour up to a maximum voltage level.

According to one embodiment, the control unit may control an increase of the DC link voltage according to a capacity of an object to be dried that is accommodated in a drum of the clothing treatment apparatus.

According to one embodiment, when the capacity is less than a preset load reference, the control unit may control the operation of the converter to increase the DC link voltage according to the increase reference.

According to one embodiment, when the capacity is less than the load reference, the control unit may vary the increase reference according to the capacity to control the operation of the converter.

According to one embodiment, when the capacity is above the load reference, the control unit may control the operation of the converter to increase the DC link voltage without conforming to the increase reference.

In addition, a clothing treatment apparatus according to an embodiment of the present disclosure may include a drum in which an object to be dried is accommodated to perform a drying operation, a blower fan that promotes the flow of air inside the clothing treatment apparatus, a heat pump that removes moisture in the air exhausted from the drum to exchange heat, a plurality of motors that drive each of the drum, the blower fan, and the heat pump, a converter that converts AC power input from an external supply into DC power, a plurality of inverters that receive the DC power from the converter to convert into driving power for driving the plurality of motors so as to output it to the plurality of motors, respectively, and a control unit that controls the operation of the converter and the inverters, wherein the control unit controls an increase in a DC link voltage of a DC link capacitor provided in the converter according to the capacity of an object to be dried when the clothing treatment apparatus is initially driven.

According to one embodiment, when the capacity is less than a preset load reference, the control unit may control the DC link voltage to sequentially increase according to a preset increase reference.

According to one embodiment, when controlled to sequentially increase according to the increase reference, the control unit may sequentially increase a target output value of the DC power output from the converter according to the increase reference.

According to one embodiment, the control unit may vary the increase reference according to the capacity.

According to one embodiment, the control unit may control the DC link voltage to increase immediately when the capacity is above the load reference.

In addition, Embodiment 1 of the control method of controlling a clothing treatment apparatus according to the present disclosure is a method of controlling a clothing treatment apparatus including a drum in which an object to be dried is accommodated to perform a drying operation, a blower fan that promotes the flow of air inside the clothing treatment apparatus, a heat pump that removes moisture in the air exhausted from the drum to exchange heat, a plurality of motors that drive each of the drum, the blower fan, and the heat pump, a converter that converts AC power input from an external supply into DC power, a plurality of inverters that receive the DC power from the converter to convert into driving power for driving the plurality of motors so as to output it to the plurality of motors, respectively, and the method may include starting the driving of the clothing treatment apparatus, sensing a capacity of the object to be dried, determining an increase reference of a DC link voltage of a DC link capacitor included in the converter based on the capacity, and controlling the operation of the converter to increase the DC link voltage according to the increase reference.

According to one embodiment, said determining step may determine the increase reference to increase the DC link voltage at a predetermined slope when the capacity is less than a preset load reference.

According to one embodiment, said determining step may determine the predetermined slope according to the capacity.

According to one embodiment, said determining step may determine the increase reference to increase the DC link voltage without having a predetermined slope when the load capacity is above the load reference.

According to one embodiment, said determining step may increase a target output value of the DC power output from the converter according to the increase reference to control the operation of the converter.

In addition, Embodiment 2 of the control method of controlling a clothing treatment apparatus according to the present disclosure is a method of controlling a clothing treatment apparatus including a drum in which an object to be dried is accommodated to perform a drying operation, a blower fan that promotes the flow of air inside the clothing treatment apparatus, a heat pump that removes moisture in the air exhausted from the drum to exchange heat, a plurality of motors that drive each of the drum, the blower fan, and the heat pump, a converter that converts AC power input from an external supply into DC power, a plurality of inverters that receive the DC power from the converter to convert into driving power for driving the plurality of motors so as to output it to the plurality of motors, respectively, and the method may include initially driving the clothing treatment apparatus, converting the DC power into driving power, and outputting the driving power to the plurality of motors, respectively, to control the drying operation, wherein the said initially driving step includes sensing a capacity of the object to be dried, determining an increase reference of a DC link voltage of a DC link capacitor included in the converter based on the capacity, and controlling the operation of the converter to increase the DC link voltage according to the increase reference.

According to one embodiment, said initially driving step may be carried out during a preset driving time period.

Embodiments of a control device of a clothing treatment apparatus, a clothing treatment apparatus, and a control method thereof as described above may be a useful solution in particular for a control device of a clothing treatment apparatus including a power factor correction (PFC) applied converter and a plurality of inverters for controlling a plurality of motors, and a control method thereof.

Embodiments of the clothing treatment apparatus and the control method thereof according to the present disclosure may have an effect of stably driving a control circuit having a plurality of inverters and a converter.

Furthermore, embodiments of the clothing treatment apparatus and the control method thereof according to the present disclosure may have an effect of controlling the driving of the converter under conditions requiring high output, thereby improving drying performance.

Furthermore, embodiments of the clothing treatment apparatus and the control method thereof according to the present disclosure may variably set the switching period of the converter, thereby having an effect of reducing heat value.

Furthermore, embodiments of the clothing treatment apparatus and the control method thereof according to the present disclosure may randomly set the switching period of the converter, thereby having an effect of reducing the amplitude of noise.

In addition, the clothing treatment apparatus according to the present disclosure may variably set the switching period of the converter, thereby reducing electromagnetic interference (EMI) noise.

In particular, embodiments of the clothing treatment apparatus and the control method thereof according to the present disclosure may eliminate the possibility of overshoot without adjusting a time point of driving a load during the driving of the converter according to the use of a plurality of inverters, and release duty ratio limit to output a variable pulse width modulation duty when the magnitude of load increases, thereby having an effect of eliminating the possibility of stopping the driving of the compressor and ensuring control stability.

In other words, embodiments of the clothing treatment apparatus and the control method thereof according to the present disclosure may limit or vary the pulse width modulation duty output to the converter according to the magnitude of load, thereby having an effect of preventing the overshooting of leakage current as well as adaptively adjusting the output current of the converter.

Furthermore, embodiments of the clothing treatment apparatus and the control method thereof according to the present disclosure may control a time point of driving the converter, thereby having an effect of minimizing the occurrence of leakage current.

Furthermore, embodiments of the clothing treatment apparatus and its control method according to the present disclosure may actively adjust a time point of driving the converter under conditions requiring high output, thereby having an effect of ensuring driving stability and drying efficiency at the same time.

Furthermore, embodiments of the clothing treatment apparatus and the control method thereof according to the present disclosure may control the operation of the converter to increase a DC link voltage stored in a DC link capacitor according to a preset increase reference, thereby having an effect of softly increasing the DC link voltage according to the increase reference.

Furthermore, embodiments of the clothing treatment apparatus and the control method thereof according to the present disclosure may softly increase the DC link voltage according to the increase reference, thereby having an effect of reducing an error between control periods when the clothing treatment apparatus is initially driven as well as having an effect of performing accurate and stable control for the converter and the plurality of inverters when the clothing treatment apparatus is initially driven.

Furthermore, embodiments of the clothing treatment apparatus and the control method thereof according to the present disclosure may softly increase the DC link voltage according to the increase reference to have an effect of stably storing a voltage stored in a DC link capacitor as well as stably transferring DC power supplied from the DC link capacitor to a plurality of inverters, thereby having an effect of preventing the burnout of a control device provided with a plurality of circuit elements, and increasing the lifespan.

Moreover, embodiments of the clothing treatment apparatus and the control method thereof according to the present disclosure may change an increase reference of the DC link voltage according to a driving state of the clothing treatment apparatus to softly increase the DC link voltage, thereby having an effect of performing appropriate power control according to the driving state of the clothing treatment apparatus.

As a result, embodiments of the clothing treatment apparatus and the control method thereof according to the present disclosure may ensure control stability and reliability of a control device of the clothing treatment apparatus including a converter and a plurality of inverters, thereby having an effect of easily achieving the configuration of such a control device as well as performing appropriate and efficient control for a plurality of motors included in the clothing treatment apparatus.

DETAILED DESCRIPTION

Figure 1:
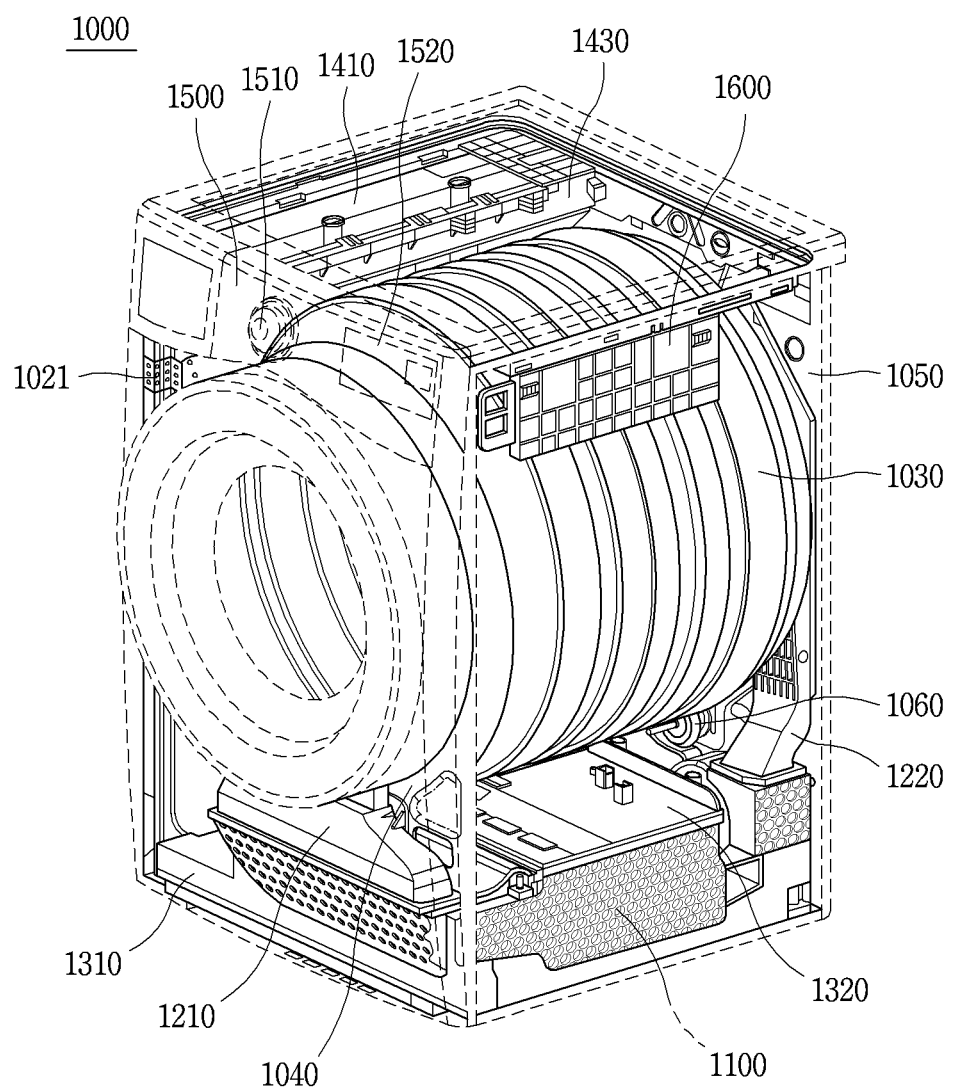
FIG. 1 is a perspective view showing a clothing treatment apparatus associated with an embodiment of the present disclosure.

Hereinafter, the embodiments disclosed herein will be described in detail with reference to the accompanying drawings, and it should be noted that technological terms used herein are merely used to describe a specific embodiment, but not to limit the present disclosure.

Also, unless particularly defined otherwise, technological terms used herein should be construed as a meaning that is generally understood by those having ordinary skill in the art disclosed in the present specification, and should not be construed too broadly or too narrowly.

[Basic Configuration of Clothing Treatment Apparatus]

First, a basic configuration of a clothing treatment apparatus to which embodiments of the present disclosure are applied will be described.

Hereinafter, a clothing treatment apparatus associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

In the present specification, it will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

FIG. 1 is a perspective view showing a clothing treatment apparatus 1000 associated with an embodiment of the present disclosure.

A cabinet 1010 defines an appearance of the clothing treatment apparatus 1000. A plurality of metal plates constituting the front, rear, left and right side, upper and lower portions of the clothing treatment apparatus 1000 are coupled to each other to define the cabinet 1010. A front opening portion 1011 is disposed on the front side portion of the cabinet 1010 to put an object to be treated in a drum 1030.

A door 1020 is disposed to open and close the front opening portion 1011. The door 1020 may be rotatably connected to the cabinet 1010 by a hinge 1021. The door 1020 may be formed of a partially transparent material. Therefore, even when the door 1020 is closed, an inside of the drum 1030 may be visually exposed through the transparent material.

The drum 1030 is rotatably provided inside the cabinet 1010. The drum 1030 is defined in a cylindrical shape to accommodate the object to be treated. The drum 1030 is disposed to be laid in a front-rear direction of the clothing treatment apparatus 1000 so as to receive an object to be treated through the front opening portion 1011. An outer circumferential surface of the drum 1030 may have concave-convex surfaces disposed along the circumference.

An opening portion open toward front and rear sides of the clothing treatment apparatus 1000 is disposed in the drum 1030. An object to be treated may be placed into the drum 1030 through the front opening portion. Hot dry air may be supplied into the drum 1030 through the rear opening portion.

The drum 1030 is rotatably supported by a front supporter 1040, a rear supporter 1050 and a roller 1060. The front supporter 1040 is disposed below a front side of the drum 1030, and the rear supporter 1050 is disposed at a rear side of the drum 1030.

The rollers 1060 may be provided on the front supporter 1040 and the rear supporter 1050, respectively. The roller 1060 is disposed immediately below the drum 1030 and brought into contact with an outer circumferential surface of the drum 1030. The roller 1060 is rotatably disposed, and an elastic member such as rubber is coupled to an outer circumferential surface of the roller 1060. The roller 1060 rotates in a direction opposite to the rotation direction of the drum 1030.

Heat pump cycle devices 1100 may be provided at a lower side of the drum 1030. Here, the lower side of the drum 1030 denotes a lower portion in a space between an outer circumferential surface of the drum 1030 and an inner circumferential surface of the cabinet 1010. The heat pump cycle devices 1100 refer to devices constituting a cycle to sequentially evaporate, compress, condense, and expand refrigerant. When the heat pump cycle devices 1100 are operated, air is dried at high temperature while sequentially exchanging heat with an evaporator 1110 and a condenser 1130.

An inlet duct 1210 and an outlet duct 1220 constitute a passage for circulating hot dry air formed by the heat pump cycle devices 1100 to the drum 1030. The inlet duct 1210 is disposed at a rear side of the drum 1030, and air dried at high temperature by the heat pump cycle devices 1100 is supplied to the drum 1030 through the inlet duct 1210. The outlet duct 1220 is disposed at a front lower side of the drum 1030, and air that has dried the object to be treated is recovered through the outlet duct 1220.

A base 1310 is provided at a lower side of the heat pump cycle devices 1100. The base 1310 refers to a molded body supporting various components of the clothing treatment apparatus 1000 including the heat pump cycle devices 1100 from the lower side.

A base cover 1320 is provided between the base 1310 and the drum 1030. The base cover 1320 is disposed to cover the heat pump cycle devices 1100 mounted on the base 1310. When a sidewall of the base 1310 and the base cover 1320 are coupled to each other, an air circulation passage is formed. Part of the heat pump cycle devices 1100 are provided in the air circulation passage.

A water tank 1410 is disposed on an upper left or upper right side of the drum 1030. Here, the upper left or upper right side of the drum 1030 denotes an upper left portion or an upper right portion in a space between an outer circumferential surface of the drum 1030 and an inner circumferential surface of the cabinet 1010. In FIG. 1, it is shown that the water tank 1410 is disposed at an upper left side of the drum 1030. Condensate water is collected in the water tank 1410.

When the air that has dried an object to be treated is recovered through the outlet duct 1220 to exchange heat with the evaporator 1110, condensate water is generated. More specifically, when the temperature of air is lowered by heat exchange performed in the evaporator 1110, the amount of saturated vapor that can be contained by the air is reduced. Since the air recovered through the outlet duct 1220 contains moisture exceeding the amount of saturated vapor, condensate water is inevitably generated.

A water pump 1440 (refer to FIG. 3) is provided inside the clothing treatment apparatus 1000. The water pump 1440 raises condensate water to the water tank 1410. This condensate water is collected in the water tank 1410.

A water tank cover 1420 may be disposed at one corner of a front portion of the clothing treatment apparatus 1000 so as to correspond to the position of the water tank 1410. The water tank cover 1420 is configured to be gripped by hand, and disposed on a front surface of the clothing treatment apparatus 1000. When the water tank cover 1420 is pulled to empty condensate water collected in the water tank 1410, the water tank 1410 is drawn out from a water tank support frame 1430 together with the water tank cover 1420.

The water tank support frame 1430 is disposed to support the water tank 1410 inside the cabinet 1010. The water tank support frame 1430 extends along an insertion or pull-out direction of the water tank 1410 to guide the insertion or pull-out of the water tank 1410.

An input/output panel 1500 may be disposed next to the water tank cover 1420. The input/output panel 1500 may include an input unit 1510 for receiving a selection of a clothing treatment course from a user, and an output unit 1520 for visually displaying an operation state of the clothing treatment apparatus 1000. The input unit 1510 may be configured with a jog dial, but is not necessarily limited thereto. The output unit 1520 may be disposed to visually display the operation state of the clothing treatment apparatus 1000, and the clothing treatment apparatus 1000 may have a separate configuration for an audible display in addition to the visual display.

The control unit 1600 is disposed to control the operation of the clothing treatment apparatus 1000 based on a user's input applied through the input unit 1510. The control unit 1600 may include a printed circuit board and elements mounted on the printed circuit board. When a user selects a clothing treatment course through the input unit 1510 to input a control command such as an operation of the clothing treatment apparatus 1000, the control unit 1600 controls the operation of the clothing treatment apparatus 1000 according to a preset algorithm.

The printed circuit board constituting the control unit 1600 and the elements mounted on the printed circuit board may be disposed on an upper left or upper right side of the drum 1030. In FIG. 1, it is shown that the printed circuit board is disposed on the upper right side of the drum 1030, which is an opposite side of the water tank 1410 at an upper side of the drum 1030. Considering that condensate water is collected in the water tank 1410, and air containing moisture flows through the heat pump cycle devices 1100 and ducts 1210, 1220, 1230, and electrical products such as a printed circuit board and elements are vulnerable to water, the printed circuit board and elements are preferably separated from the water tank 1410 or the heat pump cycle devices 1100 as far as possible.

Hereinafter, the drum 1030 and the air circulation passage will be described.

Figure 2A:
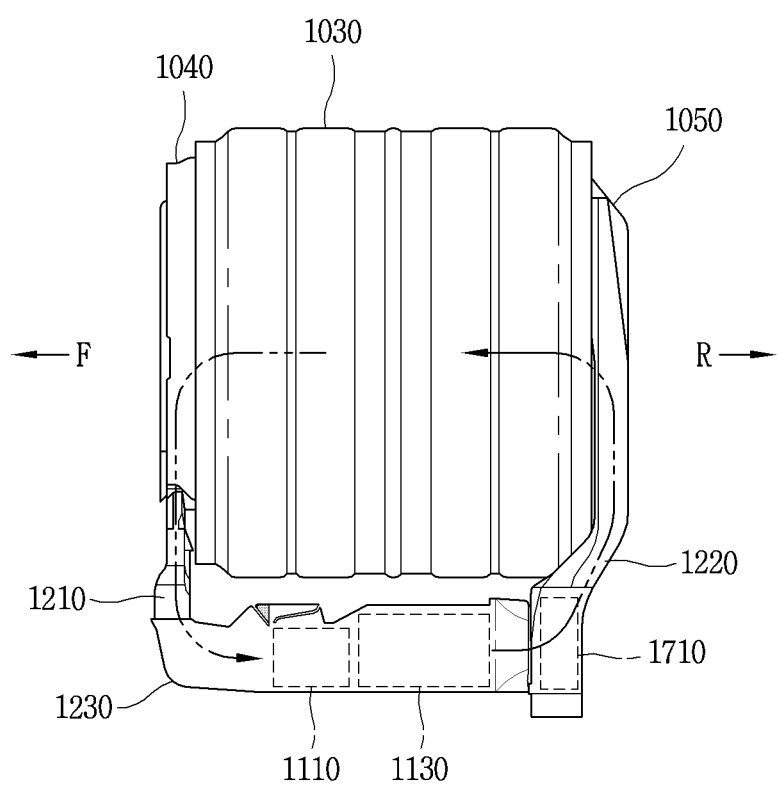
FIG. 2A is a side view of a drum and an air circulation passage in a clothing treatment apparatus according to an embodiment of the present disclosure.

FIG. 2A is a side view of the drum 1030 and the air circulation passage. In FIG. 2A, the left side corresponds to a front side (F) of the drum 1030 and the right side corresponds to a rear side (R) of the drum 1030.

In order to dry laundry or the like (objects to be treated) placed into the drum 1030, a process of supplying hot dry air into the drum 1030, recovering the air that has dried the laundry to remove moisture from the air must be repeated. In order to repeat this process in a condensing dryer, air must continuously circulate through the drum 1030. The circulation of air is carried out through the drum 1030 and the air circulation passage.

The air circulation passage is defined by the inlet duct 1210, the outlet duct 1220, and a connection duct 1230 disposed between the inlet duct 1210 and the outlet duct 1220. The inlet duct 1210, the outlet duct 1220, and the connection duct 1230 may be respectively defined by coupling a plurality of members.

Based on the flow of air, the inlet duct 1210, the drum 1030, the outlet duct 1220, and the connection duct 1230 are sequentially connected, and the connection duct 1230 is again connected to the inlet duct 1210 to provide a closed flow path.

The inlet duct 1210 extends from the connection duct 1230 to a rear surface of the rear supporter 1050. The rear surface of the rear supporter 1050 refers to a surface facing a rear side of the clothing treatment apparatus 1000. Since the drum 1030 and the connection duct 1230 are disposed to be spaced apart from each other in a top-down direction, the inlet duct 1210 may have a structure extending in a top-down direction toward a rear side of the drum 1030 from the connection duct 1230 disposed below the drum 1030.

The inlet duct 1210 is coupled to a rear surface of the rear supporter 1050. A hole is disposed at a rear side of the rear supporter 1050. Accordingly, hot dry air is supplied from the inlet duct 1210 to an inside of the drum 1030 through the hole disposed at the rear supporter 1050.

The outlet duct 1220 is disposed below the front supporter 1040. A front opening portion for putting an object to be treated in the drum must be disposed at a front side of the drum 1030, and thus the outlet duct 1220 is disposed below the front of the drum 1030.

The outlet duct 1220 extends from the front supporter 1040 to the connection duct 1230. The outlet duct 1220 may also extend in a top-down direction similarly to the inlet duct 1210, but a vertical extension length of the outlet duct 1220 is shorter than that of the inlet duct 1210. Air that has dried an object to be treated in the drum 1030 is recovered to the connection duct 1230 through the outlet duct 1220.

The evaporator 1110 and the condenser 1130 among heat pump cycle devices 1100 are provided inside the connection duct 1230. Furthermore, a circulation fan 1710 for supplying hot dry air to the inlet duct 1210 is also provided in the connection duct 1230. The evaporator 1110 is disposed at an upstream side of the condenser 1130 based on the flow of air, and the circulation fan 1710 is disposed at a downstream side of the condenser 1130. The circulation fan 1710 generates wind in a direction that sucks air from the condenser 1130 and supplies it to the inlet duct 1210.

Next, components below the drum 1030 will be described.

Figure 2B:
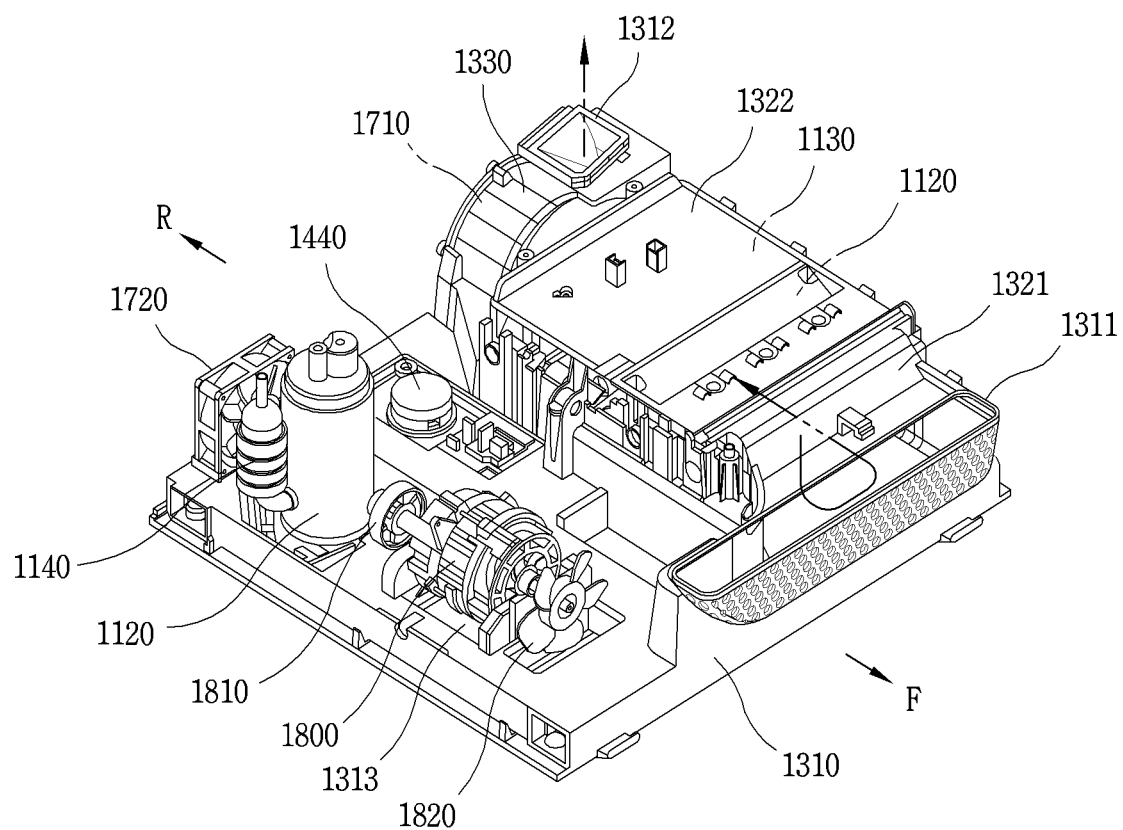
FIG. 2B is a perspective view of a base and parts mounted on the base in a clothing treatment apparatus according to an embodiment of the present disclosure.

FIG. 2B is a perspective view of a base 1310 and parts mounted on the base 1310.

The base 1310 is disposed to support the mechanical elements of the clothing treatment apparatus 1000, including heat pump cycle devices 1100. For the mounting of the mechanical elements, the base 1310 is provided with a number of mounting portions 1313. The mounting portion 1313 refers to a region provided for mounting of mechanical elements. Each of the mounting portions 1313 may be partitioned from each other by a step of the base 1310. Hereinafter, components will be described in a counter-clockwise direction based on the connection duct 1230.

Unlike the drum 1030 disposed in the center based on a left-right direction of the clothing treatment apparatus 1000, the air circulation passage is disposed eccentrically to the left or right side of the drum 1030. In FIG. 2B, it is shown that the air circulation passage is disposed at a lower right side of the drum 1030. The eccentric arrangement of the air circulation passage is for the efficient drying of an object to be treated and for the efficient arrangement of parts.

An inlet portion 1311 of the connection duct 1230 is disposed below the outlet duct 1220, and connected to the outlet duct 1220. The inlet portion 1311 of the connection duct 1230 is disposed to guide air in an inclined direction together with the outlet duct 1220. For instance, in FIG. 2B, the inlet portion 1311 of the connection duct 1230 becomes narrower downward. In particular, a left side of the inlet portion 1311 is disposed to be inclined to the lower right side. If the air circulation passage is disposed at a lower left side of the drum 1030, a right side of the inlet portion 1311 will be disposed to be inclined to the lower left side.

The evaporator 1110, the condenser 1130, and the circulation fan 1710 are sequentially arranged at a downstream side of the inlet portion 1311 based on the flow of air. When the clothing treatment apparatus 1000 is viewed from the front, the condenser 1130 is disposed behind the evaporator 1110, and the circulation fan 1710 is disposed behind the condenser 1130. The evaporator 1110, the condenser 1130, and the circulation fan 1710 are mounted on respective mounting portions 1313 provided in the base 1310.

The base cover 1320 may be provided on the evaporator 1110 and the condenser 1130. The base cover 1320 may be composed of a single member or a plurality of members. When the base cover 1320 is composed of a plurality of members, the base cover 1320 may include a front base cover 1321 and a rear base cover 1322.

The base cover 1320 is disposed to cover the evaporator 1110 and the condenser 1130. The base cover 1320 may be coupled to a step or sidewall of the base 1310 disposed at left and right sides of the evaporator 1110 and the condenser 1130 to constitute part of the connection duct 1230.

The circulation fan 1710 is surrounded by the base 1310 and the base cover 1320. The outlet portion 1312 of the connection duct 1230 is disposed at an upper side of the circulation fan 1710. The outlet portion 1312 of the connection duct 1230 is connected to the inlet duct 1210. Hot dry air formed by the heat pump cycle devices 1100 is supplied to the drum 1030 through the inlet duct 1210.

A water pump 1440 is provided at one side of the condenser 1130 (or one side of the circulation fan 1710). The water pump 1440 is disposed to transfer condensate water collected to a mounting portion provided with the water pump 1440.

The base 1310 is disposed to drain condensate water generated during the operation process of the heat pump cycle devices 1100 to the mounting portion provided with the water pump 1440. For example, a bottom surface of the mounting portion 1313 may be inclined to allow condensate water to flow to the mounting portion provided with the water pump 1440, or a step height of the mounting portion provided with the water pump 1440 may be partially low.

Condensate water collected by the mounting portion 1313 provided with the water pump 1440 due to the structure of the base 1310 may be transferred to the water tank 1410 by the water pump 1440. Furthermore, the condensate water may be transferred by the water pump 1440 and used for the cleaning of the evaporator 1110 or the condenser 1130.

A compressor 1120 and a compressor cooling fan 1720 for cooling the compressor 1120 may be provided at one side of the water pump 1440. The compressor 1120 is an element constituting the heat pump cycle devices 1100, but does not directly exchange heat with air, and thus does not need to be provided at the air circulation passage. Rather, when the compressor 1120 is provided at the air circulation passage, it may interfere with the flow of air, and thus the compressor 1120 is preferably provided outside the air circulation passage as shown in FIG. 2B.

The compressor cooling fan 1720 generates wind toward the compressor 1120 or in a direction in which air is sucked from the compressor 1120. When the temperature of the compressor 1120 is lowered by the compressor cooling fan 1720, compression efficiency is improved.

An accumulator 1140 is provided at an upstream side of the compressor 1120 based on the flow of refrigerant. The accumulator 1140 separates two-phase refrigerant flowing into the compressor 1120 into a gas phase and a liquid phase to allow only the gas phase to flow into the compressor 1120. This is because the liquid phase causes failure of the compressor 1120 and decreases efficiency.

The refrigerant is evaporated (liquid→gaseous) while absorbing heat in the evaporator 1110, and becomes a low-temperature, low-pressure gaseous state to be sucked into the compressor 1120. When the accumulator 1140 is provided at an upstream side of the compressor 1120, the refrigerant may pass through the gas-liquid separator 1140 prior to flowing into the compressor 1120. In the compressor 1120, the refrigerant becomes a high-temperature, high-pressure state while gas-phase refrigerant is compressed to flow to the condenser 1130. In the condenser 1130, the refrigerant is liquefied while releasing heat. The liquefied high-pressure refrigerant is depressurized in an expansion apparatus (not shown). Low-temperature, low-pressure liquid refrigerant enters the evaporator 1110.

Hot dry air is supplied to the drum 1030 through the inlet duct 1210 to dry an object to be treated. The hot dry air evaporates the moisture of the object to be treated and becomes hot humid air. The hot humid air is recovered through the outlet duct 1220, and becomes low-temperature air by receiving the heat of refrigerant through the evaporator 1110. As the temperature of air decreases, the amount of saturated vapor in the air decreases, and the vapor contained in the air is condensed. Subsequently, low-temperature dry air receives heat from the refrigerant through the evaporator 1110 to become high-temperature dry air, and is supplied to the drum 1030 again.

Figure 3A:
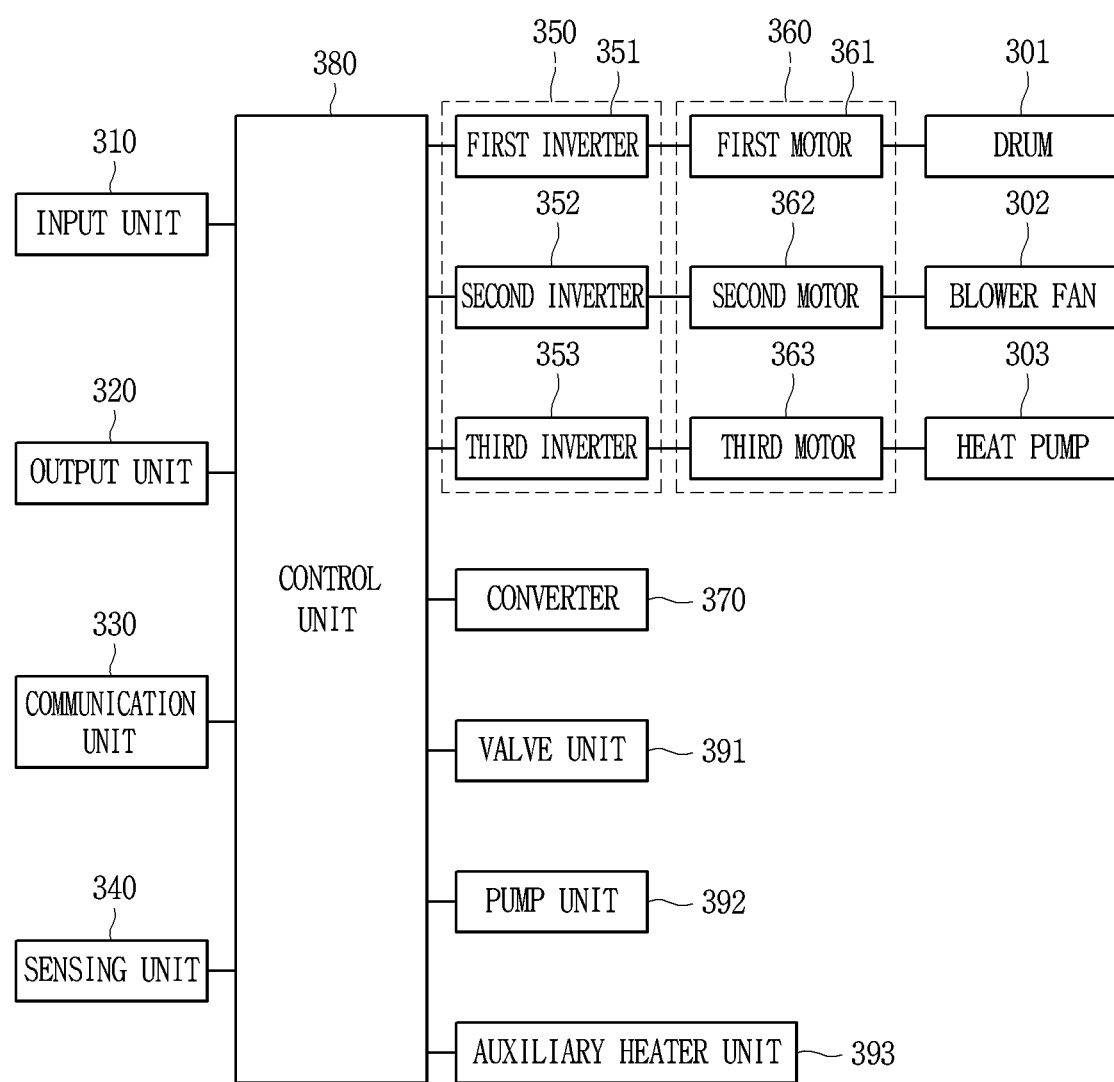
FIG. 3A is a block diagram showing components in a clothing treatment apparatus according to the present disclosure.

Next, referring to FIG. 3A, the clothing treatment apparatus according to the present disclosure may include at least one of an input unit 310, an output unit 320, a communication unit 330, a sensing unit 340, an inverter 350, a motor 360, and a converter 370, a control unit 380, a valve unit 391, a pump unit 392, and an auxiliary heater unit 393.

The input unit 310 may receive a control command related to the operation of the clothing treatment apparatus from a user. The input unit 310 may be composed of a plurality of buttons or may be composed of a touch screen.

Specifically, the input unit 310 may be provided with a control panel that receives a selection of an operation mode of the clothing treatment apparatus or an input related to the execution of the selected operation mode.

The output unit 320 may output information related to the operation of the clothing treatment apparatus. The output unit 320 may include at least one display.

The information output by the output unit 320 may include information related to an operation state of the clothing treatment apparatus. In other words, the output unit 320 may output information related to at least one of the selected operation mode, whether a failure has occurred, an operation completion time, and an amount of laundry accommodated in the drum.

In one embodiment, the output unit 320 may be a touch screen integrally formed with the input unit 310.

The communication unit 330 may communicate with an external network. The communication unit 330 may receive a control command related to an operation of the clothing treatment apparatus from an external network. For example, the communication unit 330 may receive an operation control command of the clothing treatment apparatus sent from an external terminal through an external network. Accordingly, the user may remotely control the clothing treatment apparatus.

In addition, the communication unit 330 may transmit information related to an operation result of the clothing treatment apparatus to a predetermined server through an external network.

Furthermore, the communication unit 330 may communicate with other electronic devices in order to establish an Internet of Things (IOT) environment.

The sensing unit 340 may sense information related to an operation of the clothing treatment apparatus.

Specifically, the sensing unit 340 may include at least one of a current sensor, a voltage sensor, a vibration sensor, a noise sensor, an ultrasonic sensor, a pressure sensor, an infrared sensor, a visual sensor (camera sensor), and a temperature sensor.

In one example, the current sensor of the sensing unit 340 may sense a current flowing through a point of the control circuit of the clothing treatment apparatus.

In another example, the temperature sensor of the sensing unit 340 may sense the temperature in the drum.

As described above, the sensing unit 340 may include at least one of various types of sensors, and the types of sensors included in the clothing treatment apparatus are not limited. In addition, the number or installation location of each sensor may be designed in various ways according to the purpose.

The inverter 350 includes a plurality of inverter switches to convert DC power (Vdc) smoothed by the on/off operation of the switches into three-phase AC power (Va, Vb, Vc) at a predetermined frequency and output it to the motor.

Referring to FIG. 3A, the clothing treatment apparatus according to the present disclosure may include a plurality of inverters 351, 352, 353, and each inverter may supply power to a plurality of motors 361, 362, 363.

In FIG. 3A, it is shown that the clothing treatment apparatus includes three inverters 351, 352, 353, and each inverter supplies power to the three motors 361, 362, 363, but the number of inverters and motors is not limited thereto.

Specifically, a first inverter 351 may supply power to a first motor 361 for rotating a drum 301, and a second inverter 352 may supply power to a second motor 362 for rotating a blower fan 302, and a third inverter 353 may supply power to a third motor 363 for driving a compressor of a heat pump 303.

A rotation shaft of the first motor 361 and a rotation shaft of the drum 301 are connected by a belt (not shown), and the first motor 361 may transmit a rotational force to the drum 301 through the belt.

The motor 360 may be a BLDC motor capable of speed control based on a speed command value, or may be a constant speed motor that does not perform speed control. In one example, the first motor for rotating the drum and the third motor for driving the compressor may be configured as BLDC motors, and the second motor for rotating the blower fan may be configured as a constant speed motor.

For the Inverters 351, 352, 353, upper arm switches (Sa, Sb, Sc) and lower arm switches (Sa', Sb', Sc') connected in series with each other, respectively, constitute a pair, and a total of three pairs of upper and lower arm switches (Sa & Sa', Sb & Sb', Sc & Sc') are connected in parallel to each other. Diodes are connected in reverse-parallel to each of the switches (Sa, Sa', Sb, Sb', Sc, Sc').

In other words, a first upper arm switch (Sa) and a first lower arm switch (Sa') implement a first phase, and a second upper arm switch (Sb) and a second lower arm switch (Sb') implement a second phase, and a third upper arm switch (Sc) and a third lower arm switch (Sc') may implement a third phase.

In one embodiment, the inverter 350 may have a shunt resistor corresponding to at least one of the first to third phases.

Specifically, a first shunt resistor may be connected to one end of the first lower arm switch (Sa') in the first switch pair (Sa, Sa'), and similarly, a second shunt resistor may be connected to one end of the second lower arm switch (Sb'), and a third shunt resistor may be connected to one end of the third lower arm switch (Sc'). The first to third shunt resistors are not essential components, and only part of the three shunt resistors may be provided if necessary.

In another embodiment, the inverter 350 may be connected to a common shunt resistor commonly connected to the first to third phases.

Meanwhile, the switches in the inverters 351, 352, 353 perform on/off operations for each of the switches based on an inverter switching control signal generated by the control unit 380. Accordingly, three-phase AC power having a predetermined frequency is output to the motor 360.

The control unit 380 may control the switching operation of the inverter 351, 352, 353 based on a sensorless method. Specifically, the control unit 380 may control the switching operation of the inverter 350 using a motor phase current detected by the current sensor of the sensing unit 340.

The control unit 380 outputs an inverter switching control signal to the inverter 351, 352, 353 in order to control the switching operation of the inverter 351, 352, 353. Here, the inverter switching control signal is composed of a pulse width modulation (PWM) switching control signal.

As shown in FIG. 3A, the clothing treatment apparatus according to the present disclosure includes a plurality of inverters. In FIG. 3A, three motors 360 and inverters 350 for driving the compressor of the drum 301, the blower fan 302, and the heat pump 303 are shown, but the present disclosure is not limited thereto. For example, in case of a structure in which the drum 301 and the blower fan 302 are driven by one motor, and the compressor of the heat pump 303 is driven by another motor, it may include two motors and two inverters.

Since power consumption may increase as the number of inverters increases, the present disclosure proposes a clothing treatment apparatus including the converter 370.

The converter 370 converts commercial AC power into DC power and outputs the converted DC power. More specifically, the converter 370 may convert single-phase AC power or three-phase AC power into DC power and output the converted DC power. Depending on the type of commercial AC power, the internal structure of the converter 370 also varies.

Meanwhile, the converter 370 may be composed of a diode or the like without any switching element to perform a rectification operation without a separate switching operation.

For example, in case of single-phase AC power, four diodes may be used in the form of a bridge, and in case of three-phase AC power, six diodes may be used in the form of a bridge.

On the other hand, for the converter 370, a half-bridge type converter in which two switching elements and four diodes are connected, for example, may be used, and in case of three-phase AC power, six switching elements and six diodes may be used.

When the converter 370 includes switching elements, step-up operation, power factor improvement, and DC power conversion may be performed by a switching operation of the relevant switching element.

The valve unit 391 is disposed at one point of a passage provided in the clothing treatment apparatus to control the flow of the relevant passage. The pump unit 392 may provide a driving force for supplying gas or liquid to the passage.

In addition, the auxiliary heater unit 393 may be provided separately from the heat pump to supply heat into the drum. The auxiliary heater unit 393 may heat air flowing into the drum.

The control unit 380 may control components included in the clothing treatment apparatus.

First, the control unit 380 may generate at least one of a power command value, a current command value, a voltage command value, and a speed command value corresponding to the motor in order to control the rotation of the motor 360.

Specifically, the control unit 380 may calculate the power or load of the motor 360 based on the output of the sensing unit 340. Specifically, the control unit 380 may calculate a rotation speed of the motor using a phase current value sensed by the current sensor of the sensing unit 340.

Furthermore, the control unit 380 may generate a power command value corresponding to the motor, and may calculate a difference between the generated power command value and the calculated power. In addition, the control unit 380 may generate a speed command value of the motor based on a difference between the power command value and the calculated power.

Moreover, the control unit 380 may compute a difference between a speed command value of the motor and the computed rotation speed of the motor. In this case, the control unit 380 may generate a current command value applied to the motor based on a difference between the speed command value and the calculated rotation speed.

In one example, the control unit 380 may generate at least one of a q-axis current command value and a d-axis current command value.

Meanwhile, the control unit 380 may convert the current command value into a phase current of the stationary coordinate system or a phase current of the rotating coordinate system based on a phase current sensed by the current sensor. The control unit 380 may generate a voltage command value applied to the motor using the converted phase current and the current command value.

By performing such a process, the control unit 380 generates an inverter switching control signal according to a PWM method.

The control unit 380 may adjust a duty ratio of a switch included in the inverter using an inverter switching control signal.

Furthermore, the control unit 380 may control an operation of at least one of a drum, a blower fan, and a heat pump based on a control command received by the input unit 310.

In one example, the control unit 380 may control the rotation pattern of the drum based on a user input applied to the input unit 310.

In another example, the control unit 380 may control the rotational speed or operation time point of the blower fan based on a user input applied to the input unit 310.

In another example, the control unit 380 may control the output of the heat pump to adjust the temperature in the drum based on a user input applied to the input unit 310.

Figure 3B:
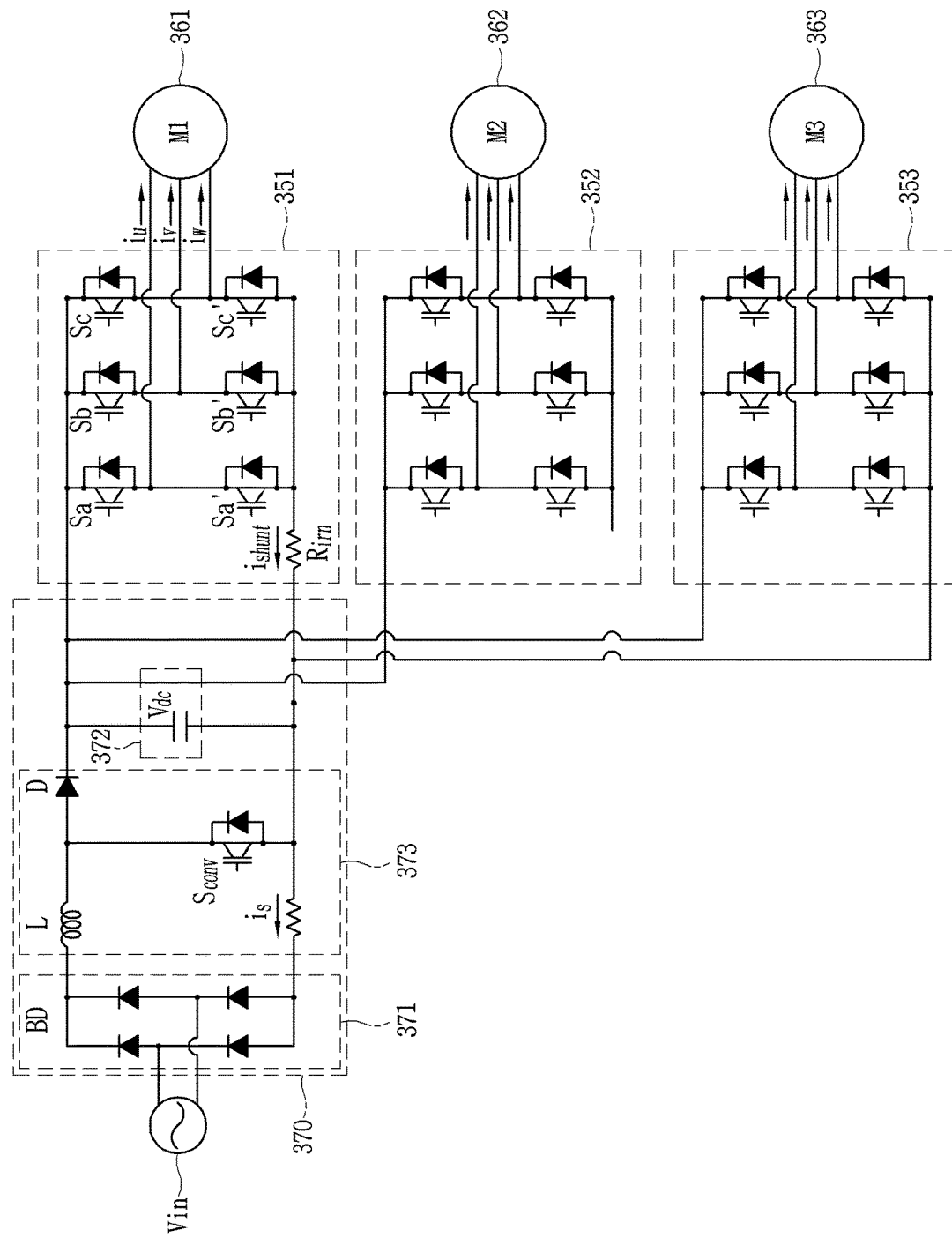
FIG. 3B is a circuit diagram showing a control circuit in a clothing treatment apparatus according to the present disclosure.

In FIG. 3B below, a control circuit of the clothing treatment apparatus according to the present disclosure will be described.

The control circuit included in the clothing treatment apparatus according to the present disclosure may further include a converter 370, a DC end voltage detector (B), a smoothing capacitor (Vdc), a plurality of shunt resistors, a plurality of inverters 351, 352, 353, and a plurality of diodes (D, BD), a reactor (L), and the like.

The reactor (L) is disposed between the commercial AC power source (Vin) and the converter 370 to perform power factor correction or step-up operation. In addition, the reactor (L) may perform a function of limiting harmonic current due to high-speed switching of the converter 370.

The converter 370 converts the commercial AC power (Vin) passed through the reactor (L) into DC power to outputs the converted DC power. In the drawing, the commercial AC power (Vin) is shown as single-phase AC power, but may also be three-phase AC power.

The smoothing capacitor (Vdc) smooths the input power and stores it. In the drawings, a single device is illustrated as a smoothing capacitor (Vdc), but a plurality of devices may be provided to ensure device stability. Meanwhile, since DC power is stored at both ends of the smoothing capacitor (Vdc), they may be referred to as dc ends or dc link ends.

The control unit 380 may detect input current received from the commercial AC power 405 using a shunt resistor provided in the converter 370. In addition, the control unit 380 may detect the phase current of the motor using a shunt resistor (Rin) provided in the inverter 350.

[Clothing Treatment Apparatus and Control Method Thereof]

Hereinafter, embodiments of a clothing treatment apparatus and a control method thereof according to the present disclosure will be described, but a portion overlapping with the above description will be omitted as much as possible.

First, an embodiment of a clothing treatment apparatus and a control method thereof according to the present disclosure will be described with reference to FIGS. 4 and 5.

An embodiment of the clothing treatment apparatus 1000 according to the present disclosure includes a main body defining an appearance thereof, a drum 301 that accommodates an object to be dried, which is rotatably provided inside the main body, a compressor 1120 of a heat pump 303 that compresses refrigerant to allow dehumidified air to pass through a condenser so as to be thermally circulated to the drum 301 when moisture is removed from heated air absorbed from the object to be dried, a blower fan 302 that generates a flow of the heated air or dehumidified air, a plurality of inverters 305 that transfer power to at least one of the drum 301, the compressor 1120, and the blower fan 302, a converter 370 that converts input power received from the outside to output the converted power to the inverters 305, and a control unit 380 that generates command information corresponding to the plurality of inverters 350 to control the converter 370 based on the generated command information.

Figure 4:
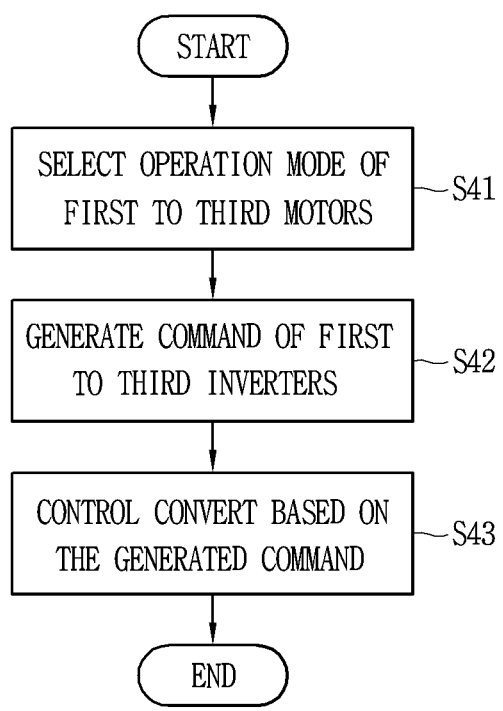
FIG. 4 is a flowchart 1 showing a control method according to an embodiment of the clothing treatment apparatus and the control method thereof according to the present disclosure.

In FIG. 4, a control method of a clothing treatment apparatus including a plurality of inverters 350 and converters 370 as described above will be described.

The control unit 380 may select an operation mode of the first to third motors 361, 362, 363 (S41).

Furthermore, the control unit 380 may generate a command related to the operation of the first to third inverters 351, 352, 353 based on the selected operation mode (S42).

In addition, the control unit 380 may control the operation of the converter 370 based on a command related to the operation of the inverter 350 (S43).

Specifically, the control unit 380 may generate command information corresponding to the plurality of inverters 350, and control the converter 370 based on the generated command information.

In other words, the control unit 380 may generate a first switching signal, a second switching signal, and a third switching signal corresponding to the first to third inverters 351, 352, 353, respectively, and control the operation of the converter 370 based on the generated first to third switching signals.

For example, the control unit 380 may determine an on/off time point of the converter 370 based on the generated first to third switching signals, or set a duty ratio of a switch included in the converter 370.

In one embodiment, the control unit 380 may detect a magnitude of load applied to the first to third inverters 351, 352, 353, and control the operation of the converter 370 based on the detected magnitude.

In other words, when the magnitude of load applied to the first to third inverters 351, 352, 353 exceeds a predetermined reference load value, the control unit 380 may control the converter 370 to activate the converter. Furthermore, the control unit 380 may change a duty ratio corresponding to the converter 370 according to the detected magnitude of load.

Meanwhile, in performing the step (S401) of selecting the operation mode of the first to third motors, the control unit 380 may select the operation mode of the first to third motors 361, 362, 363 based on a user input applied to the input unit 310 of the clothing treatment apparatus 1000.

In other words, the input unit 310 may receive a user input for setting an operation mode. The control unit 380 may set an operation mode of the plurality of motors 360 or control an operation of the converter 370 based on a user input applied to the input unit 310.

In another embodiment, the control unit 380 may control the converter 370 based on an operation time of the clothing treatment apparatus 1000 that is set by a user input. In other words, the control unit 380 may set the duty ratio, operation time and the like of the converter 370 according to the operation time of the clothing treatment apparatus 1000 that is set by the user.

In another embodiment, the control unit 380 may control the converter 370 based on the temperature of hot air supplied into the drum 301 that is set by a user input. For example, when the temperature of hot air that is set by the user passes a preset reference temperature value, the control unit 380 may increase the driving time of the converter 370 compared to the driving time of the moto.

Meanwhile, the clothing treatment apparatus according to the present disclosure may include a weight sensing unit (not shown) for sensing the weight of an object to be dried accommodated in the drum 301. In this case, the control unit 380 may control the operation of the converter 370 based on a weight of the object to be dried accommodated in the drum 301.

In one embodiment, the control unit 380 may set the outputs of the first to third inverters 351, 352, 353, respectively, based on a set operation mode of the clothing treatment apparatus, and control the operation of the converter 370 based on the outputs of the first to third inverters 351, 352, 353.

In addition, the control unit 380 may detect a voltage level of input power, and distribute the output of the converter 370 based on the detected level. Although not shown in the drawing, a circuit for distributing the output of the converter 370 may be configured with a plurality of resistors.

For example, when the voltage level of the input power is included in a first voltage range, the control unit 380 may control only a portion corresponding to a first ratio of a total output of the converter 370 to the first to third inverters 351, 352, 353. Likewise, when the voltage level of the input power is included in a second voltage range, the control unit 380 may transfer only a portion corresponding to a second ratio of the total output of the converter 370 to the first to third inverters 351, 352, 353. In this case, the first voltage range and the second voltage range are different from each other, and the first ratio and the second ratio are preferably set differently.

In addition, the control unit 380 may control a switching operation of the converter 370 by receiving feedback from the output of the converter 370. Specifically, the control unit 380 may generate the switching frequency and duty ratio of the converter that are set based on the operation mode of the inverter, and then compare an actual output of the converter with the set switching frequency and duty ratio to adjust the switching operation of the converter 370.

Figure 5:
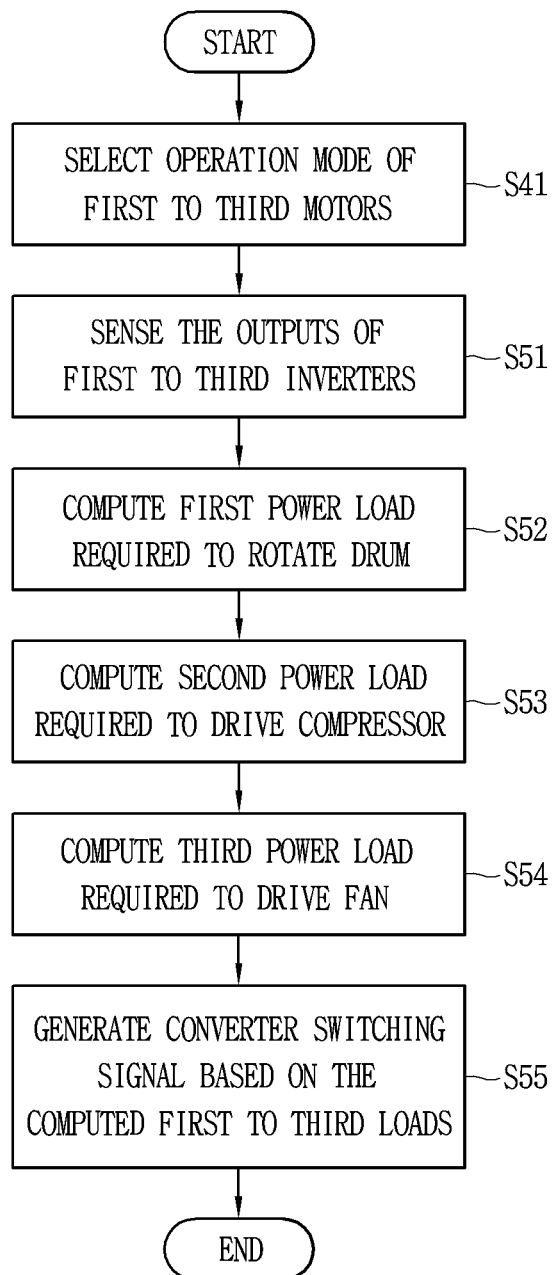
FIG. 5 is a flowchart showing a specific embodiment of the control method as shown in FIG. 4.

An embodiment in which the control method shown in FIG. 4 is more specifically implemented is shown in FIG. 5.

Referring to FIG. 5, after selecting the operation mode of the first to third motors 361, 362, 363 (S41), the control unit 380 may sense the outputs of the first to third inverters 351, 352, 353 (S51).

In addition, the control unit 380 may compute a first power load required to rotate the drum (S52), and compute a second power load required to drive the compressor (S53), and compute a third power load required to drive the fan (S54).

Furthermore, the control unit 380 may generate a switching signal of the converter 370 based on the computed first to third power loads (S55).

According to such an embodiment, a control circuit having a plurality of inverters and a converter may be stably driven, and the driving of the converter may be controlled under conditions requiring high output, thereby improving drying performance.

Hereinafter, another embodiment of a clothing treatment apparatus and a control method thereof according to the present disclosure will be described with reference to FIGS. 6 to 12.

Figure 6:
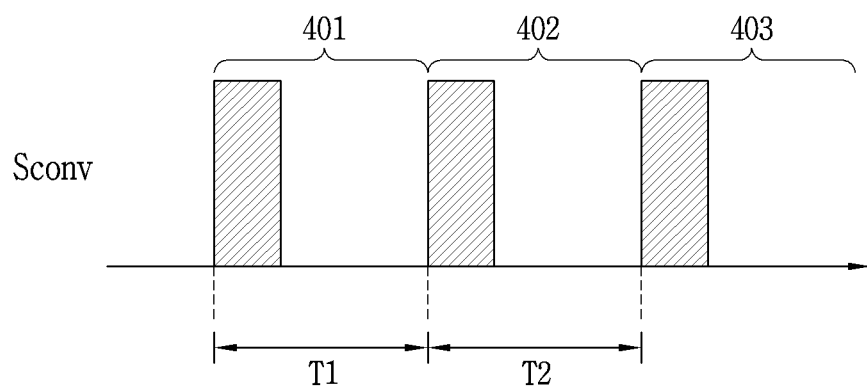
FIG. 6 is a graph showing a converter switching period according to an embodiment of the clothing treatment apparatus and the control method thereof according to the present disclosure.

Another embodiment of the clothing treatment apparatus 1000 according to the present disclosure includes a main body defining an appearance thereof, a drum 301 that accommodates an object to be dried, which is rotatably provided inside the main body, a compressor 1120 of a heat pump 303 that compresses refrigerant to allow dehumidified air to pass through a condenser so as to be thermally circulated to the drum 301 when moisture is removed from heated air absorbed from the object to be dried, a blower fan 302 that generates a flow of the heated air or dehumidified air, a converter 370 that converts input power received from the outside to output the converted power to at least one of a first motor 361 that rotates the drum 301, a second motor 362 that drives the blower fan 302, and a third motor 363 that drives the compressor 1120, and a control unit 380 that controls the switching elements of the converter 370 in a pulse width modulation (PWM) mode, Referring to FIG. 6, an embodiment of controlling the switching periods (T1, T2) of the converter 370 is shown.

As shown in FIG. 6, the control unit 380 variably sets a switching period, which is a period for generating a PWM signal for operating the converter 370.

The control unit 380 according to the present disclosure generates a second PWM signal 402 subsequent to generating a first PWM signal 401, and generates a third PWM signal 403 subsequent to generating the second PWM signal 402.

In addition, the control unit 380 may differently set a first switching period (T1), which is an interval between a time point of generating the first PWM signal 401 and a time point of generating the second PWM signal 402, and a second switching period (T2), which is an interval between a time point of generating the second PWM signal 402 and a time point of generating the third PWM signal 403.

Figure 7:
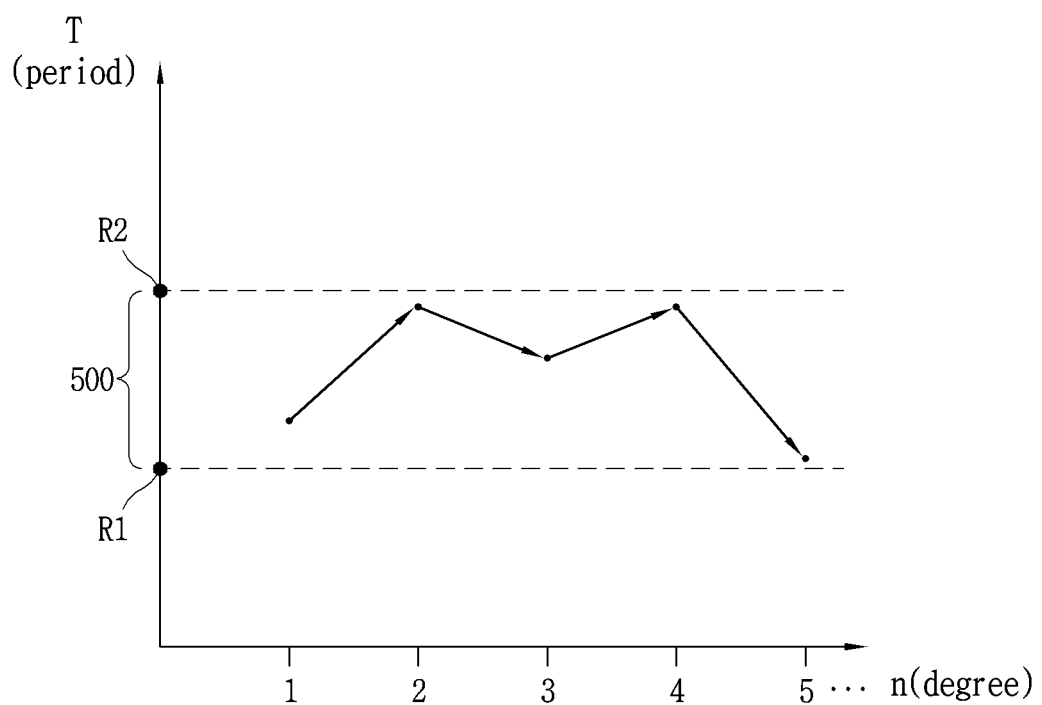
FIG. 7 is a graph showing an embodiment of variably setting a converter switching period according to an embodiment of the clothing treatment apparatus and the control method thereof according to the present disclosure.

Referring to FIG. 7, an embodiment of randomly setting a switching period is shown.

As shown in FIG. 7, the control unit 380 may randomly select any one switching period value within a predetermined range 500, thereby setting a switching period. The randomly selected switching period value is set to be smaller than a preset upper limit value (R2) and greater than a lower limit value (R1).

Although not shown in FIG. 7, when the switching period value is randomly selected, the control unit 380 may set the predetermined range 500 to exclude the first switching period (T1) in order to prevent the first switching period (T1) and the second switching period (T2) from being set to be the same.

In another embodiment, the control unit 380 may randomly select any one of a plurality of preset switching period values whenever any one PWM signal is generated.

In addition, the control unit 380 may generate the next PWM control signal after the any one PWM control signal is generated, based on the selected switching period value.

In other words, the control unit 380 may set a switching period corresponding to a PWM signal to be generated next time while at the same time generating a PWM signal.

Meanwhile, the control unit 380 may randomly determine a switching period, but may set a switching period such that the determined switching period is included within a preset switching period range.

Figure 8:
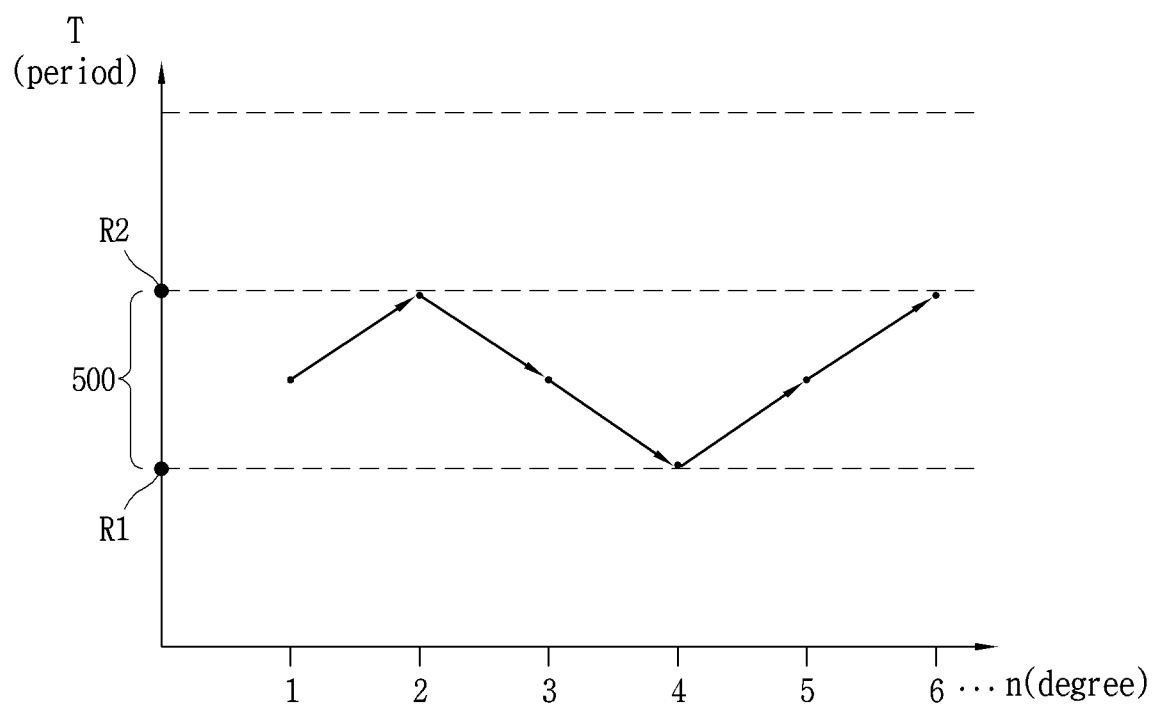
FIG. 8 is a graph showing another embodiment of variably setting a converter switching period according to an embodiment of the clothing treatment apparatus and the control method thereof according to the present disclosure.

In FIG. 8, an embodiment of changing the switching period according to a predetermined pattern is shown.

Referring to FIG. 8, the control unit 380 may change a switching period according to a predetermined pattern. In other words, the control unit 380 may set the second switching period (T2) by increasing or decreasing a predetermined value from the first switching period (T1).

For example, the control unit 380 may set an initial switching period as an average value of the upper limit value (R2) and the lower limit value (R1), and increase a second switching period to the upper limit value. Furthermore, the control unit 380 may reduce a third switching period to an average value of the upper limit value (R2) and the lower limit value (R1) again, and reduce a fourth switching period to the lower limit value (R1).

Figure 9:
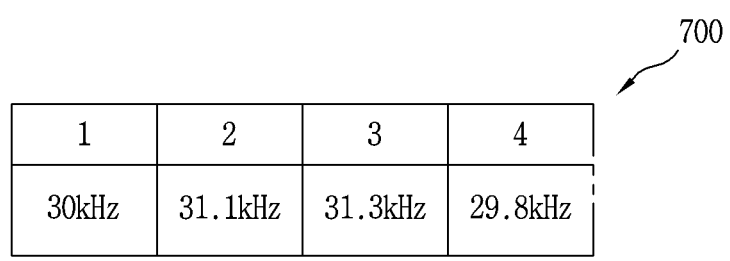
FIG. 9 is a conceptual view showing a table consisting of converter switching period values according to an embodiment of the clothing treatment apparatus and the control method thereof according to the present disclosure.

Referring to FIG. 9, an embodiment of setting the switching period according to a predetermined order is shown.

As shown in FIG. 9, the control unit 380 may sequentially set the switching period using table information 700 in which a plurality of switching period values are matched with a sequence corresponding to each switching period value.

Specifically, whenever any one PWM signal is generated, the control unit 380 may select any one of a plurality of preset switching period values in a predetermined order. Then, the control unit 380 may generate a next PWM signal using a switching period selected according to a predetermined order.

Figure 10:
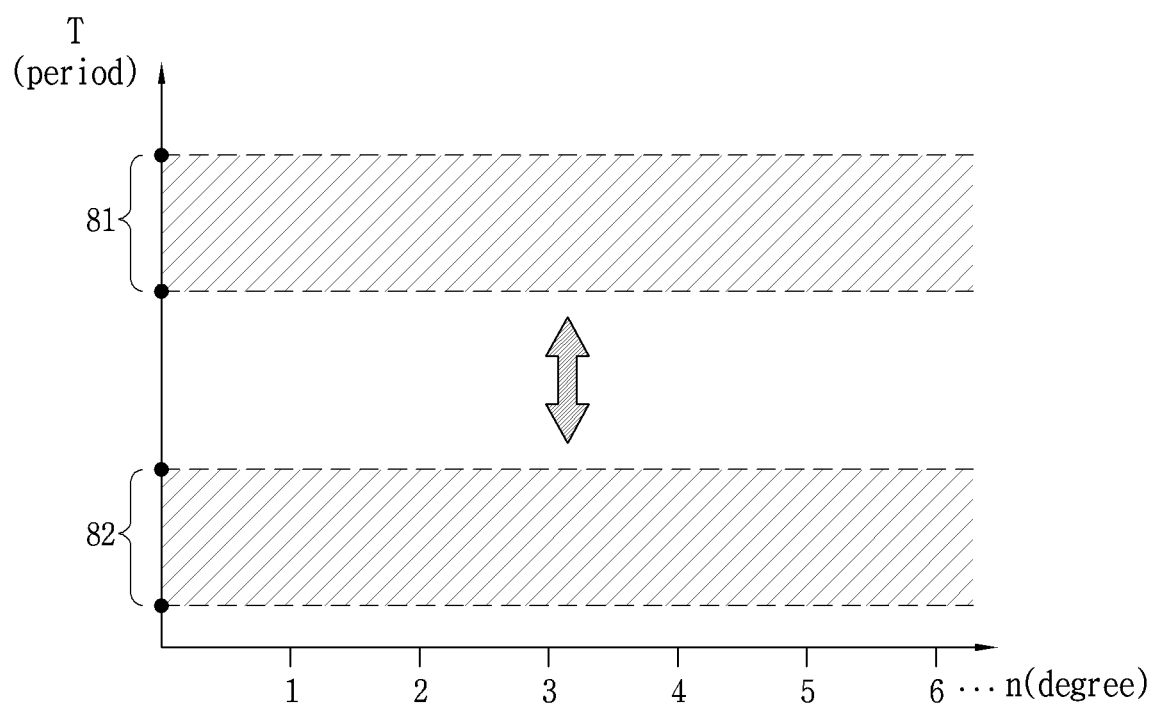
FIG. 10 is a graph associated with a setting range associated with a converter switching period according to an embodiment of the clothing treatment apparatus and the control method thereof according to the present disclosure.

FIG. 10 shows an embodiment in which a setting range of the switching period is variably set.

As shown in FIG. 10, the control unit 380 may set a switching period range differently according to an operating load of the clothing treatment apparatus.

In one example, the control unit 380 may detect a magnitude of load applied to the first to third motors 361, 362, 363, and set a switching period range based on the detected magnitude of load. The control unit 380 may detect a magnitude of load applied to each motor using at least one of a current flowing through the motor, a voltage applied to the motor, and a PWM signal corresponding to the motor.

In another example, the control unit 380 may detect a magnitude of load applied to the first to third motors 361, 362, 363, and determine whether the detected magnitude of load is above a preset limit load value.

When the detected magnitude of load is above a preset limit load value, the control unit 380 may fix the switching frequency to a preset frequency value. In this way, when the load is abnormally increased, the switching frequency is not variably set to use a fixed switching frequency.

Meanwhile, the control unit 380 may detect a heat value generated by the converter 370. In one example, the control unit 380 may compute the amount of energy generated from the converter 370 based on the amount of current flowing through the converter 370.

In addition, the control unit 380 may maintain the switching period as one period value when the sensed heat value is less than a preset limit heat value. In other words, the control unit 380 may control the converter 370 using a fixed switching period when the sensed heat value is less than a limit heat value.

On the contrary, the control unit 380 may variably set the switching period using any one of the embodiments shown in FIGS. 6 to 9 when the detected heat value exceeds a preset limit heat value.

Meanwhile, the control unit 380 may increase or decrease a change width of the switching period based on the weight of a fabric accommodated in the drum.

In one embodiment, the control unit 380 may increase a change width of the switching period when the weight of fabric accommodated in the drum exceeds a preset limit weight.

In another embodiment, as the weight of fabric accommodated in the drum increases, the control unit 380 may increase a width change of the switching period.

For reference, the control unit 380 may detect the weight of fabric accommodated in the drum using information sensed by the sensing unit 340. The control unit 380 may rotate the drum in a predetermined pattern in order to sense the weight of fabric, and at this time, the sensing unit 340 may sense a current flowing through a motor that rotates the drum or a voltage applied to the motor that rotates the drum.

Figure 11:
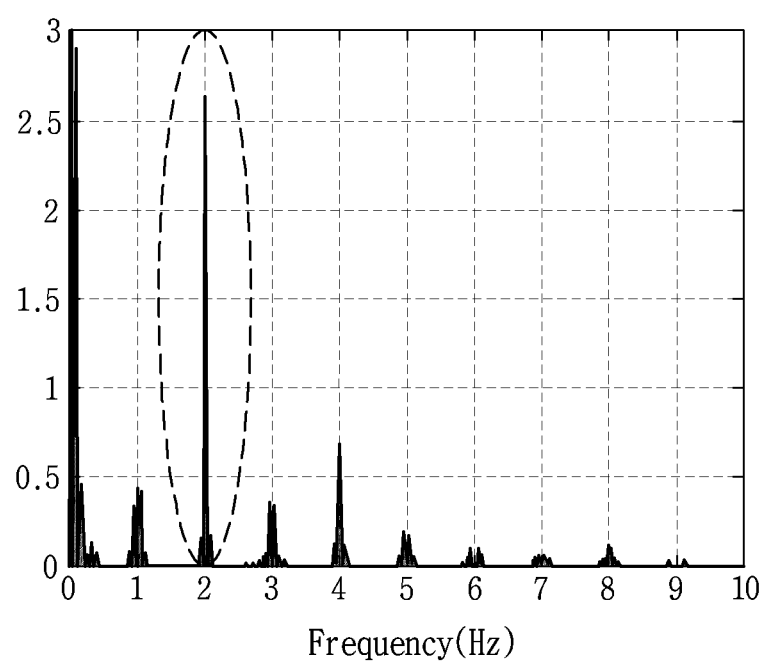
FIG. 11 is a graph showing the EMI noise of a typical converter.
Figure 12:
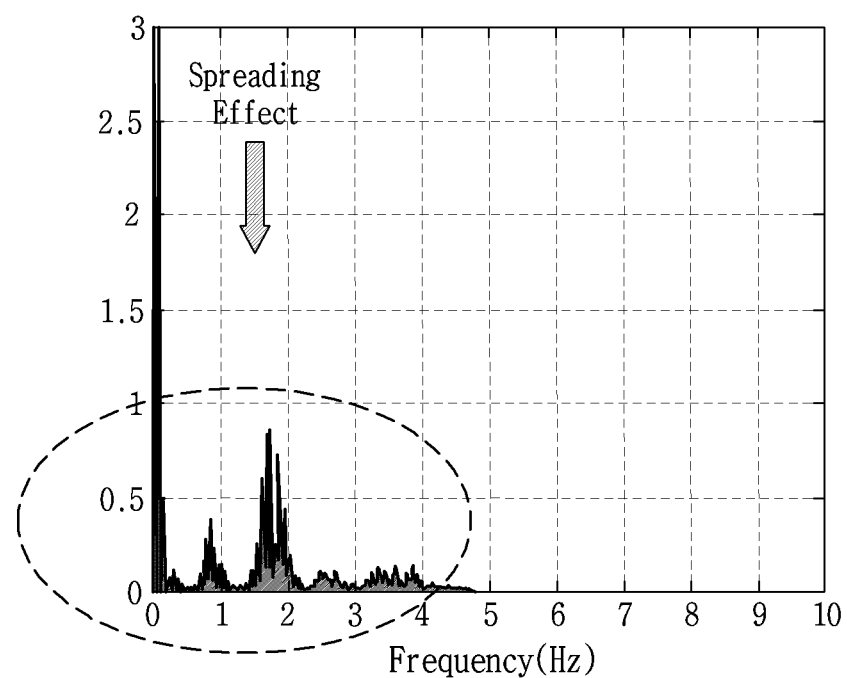
FIG. 12 is a graph showing the EMI noise of a converter according to an embodiment of the clothing treatment apparatus and the control method thereof according to the present disclosure.

FIG. 11 is a graph showing the EMI noise of a typical converter, and FIG. 12 is a graph showing the EMI noise of a converter according to the foregoing embodiment. As shown in FIG. 12, the switching period of the converter may be variably set, thereby confirming that EMI noise generated from a typical converter is significantly suppressed.

According to this embodiment, the heat value may be reduced by variably setting the switching period of the converter, and the amplitude of noise may be reduced by randomly setting the switching period of the converter, and electromagnetic interference (EMI) noise may be reduced by variably setting the switching period of the converter.

Hereinafter, another embodiment of a clothing treatment apparatus and a control method thereof according to the present disclosure will be described with reference to FIGS. 13 to 17.

Another embodiment of the clothing treatment apparatus 1000 according to the present disclosure includes a drum 301 that accommodates an object to be dried, which is rotatably provided inside the main body, a drum motor 361 that drives the drum 301, and a control unit 380 that controls the operation and rotational speed (RPM) of the drum motor 361 in the clothing treatment apparatus 1000 for driving the drum 301. When a drying operation is initiated subsequent to placing an object to be dried into the drum 301, the clothing treatment apparatus 1000 dries the object to be dried accommodated in the drum 301 in such a manner that hot air is blown into the drum 301 while rotating the drum 301 and the blower fan 302.

Furthermore, the clothing treatment apparatus 1000 according to the present disclosure controls the drum motor 361 without any additional sensor for detecting the rotor position of the drum motor 361, that is, by a sensorless method, and to this end, the driving of the inverter 351 is controlled by controlling a switching element in the inverter 351 that supplies power to the drum motor 361.

Meanwhile, the drum motor 361 may simultaneously drive the drum 301 and the blower fan 302 that generates a flow of heated air or dehumidified air. In other words, the drum motor 361 may provide a rotational force to not only the drum 301 but also the blower fan 302 at the same time. To this end, one drum motor 361 may be provided with a plurality of output shafts (or rotation shafts), and in this case, a driving force of the drum motor 361 may be transmitted to the drum 301 and the blower fan 302 through a pulley and a belt connected to each output shaft. At this time, the drum 301 and the blower fan 302 may be rotated at different rotation speeds.

However, the structure is not limited thereto, and embodiments according to the present disclosure may, of course, be applicable to a structure in which a separate fan motor 362 for driving the blower fan 302 is added as described above. In this case, the inverter 351 that supplies driving power to the drum motor 361, the inverter 352 that supplies driving power to the fan motor 362, and the inverter 353 that supplies driving power to the compressor of the heat pump 303 are separately provided according to the control signal of the control unit 380.

As the number of inverters 351, 352, 353 increases, the total load and power consumption of the clothing treatment apparatus 1000 also increase, and the converter 370 for converting and boosting input AC power into DC power may be connected to the inverters 351, 352, 353 to solve the problem. The converter 370 converts input AC power into DC power, and the converted DC power is stored in a DC link capacitor. In other words, a DC link capacitor is provided between the converter 370 and the inverters 351, 352, 353.

The inverters 351, 352, 353 convert DC power stored in the DC link capacitor into AC power, and supply the AC power to the motors 361, 362, 363 of the clothing treatment apparatus 1000 by a switching operation of a switching element provided therein, thereby driving the drum 301, the compressor, and the blower fan 302 of the clothing treatment apparatus 1000.

When the drying operation of the clothing treatment apparatus 1000 is initiated, the blower fan 302 is driven. In addition, the drum 301 may be driven together when the blower fan 302 is driven, or may be driven together with the compressor of the heat pump 303 after the blower fan 302 is driven. As described above, when the blower fan 302, the drum 301, and the compressor of the heat pump 303 are all driven, a magnitude of load increases, and accordingly, a voltage of the link capacitor that supplies DC power to the inverter 360 that drives the motor 360 drops.

Figure 13:
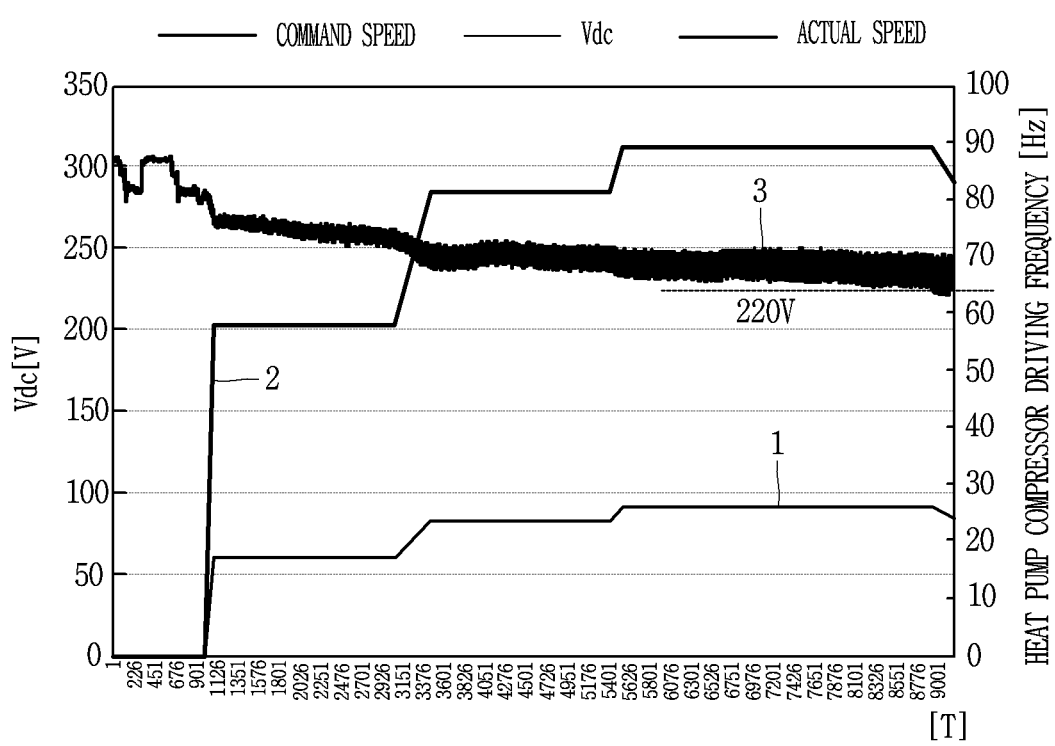
FIG. 13 is a graph showing a relationship between a driving speed and an output voltage in a compressor of a heat pump according to a drying operation as a drying operation proceeds according to the clothing treatment apparatus and the control method thereof according to an embodiment of the present disclosure.

In connection with this, FIG. 13 shows a relationship between the driving speed and the output voltage of the compressor of the heat pump 303 as the drying operation proceeds.

Referring to FIG. 13, as the drying operation of the clothing treatment apparatus 1000 proceeds, the load of the clothing treatment apparatus 1000 increases.

Specifically, as the drying operation proceeds, the load of the clothing treatment apparatus 1000 is gradually increased due to the driving of the blower fan 302, the rotation of the drum 301, the driving of the compressor of the heat pump 303 for air circulation, the weight of the drum 301, and the falling and agglomeration of an object to be dried accommodated in the drum 301.

In particular, as a driving speed of the compressor of the heat pump 303 increases, discharge pressure gradually increases, which is one of the biggest factors for increasing the load of the clothing treatment apparatus 1000.

As shown in FIG. 13, when a driving frequency 1 of the compressor of the heat pump 303 is increased step-by-step, an actual driving speed 2 of the compressor of the heat pump 303 is increased to a greater width, thereby increasing a load of the clothing treatment apparatus 1000, and increasing a drop distance of the output voltage 3.

For example, in FIG. 13, it may be seen that a magnitude of the output voltage 403 that was close to 300V in an initial driving section decreases to about 220V as a driving frequency 401 of the compressor of the heat pump 303 increases. When the output voltage is lowered in this way, drying efficiency and control stability are reduced.

Therefore, in order to solve a voltage drop due to a load that increases as the drying operation of the clothing treatment apparatus 1000 proceeds, it is required to drive the converter 370 for providing a boosted voltage.

Accordingly, the control unit 380 of the clothing treatment apparatus 1000 according to the present disclosure drives the converter 370 in a first operation mode in which pulse width modulation duty is limited subsequent to driving the blower fan 302, and the first operation mode is switched to a second operation mode in which the limitation of the pulse width modulation duty is released to drive the converter 370 when a predetermined condition is satisfied.

Here, the predetermined condition may be whether the load of the clothing treatment apparatus 1000 reaches a predetermined magnitude. Whether or not the load of the clothing treatment apparatus 1000 has reached a predetermined magnitude may be confirmed or estimated by monitoring, for example, a driving speed of the compressor of the heat pump 303, which is one of the biggest factors for increasing the load, a magnitude of the output voltage, a magnitude of the output current, and the like.

In other words, the magnitude of load of the clothing treatment apparatus 1000, which is a condition for converting the converter 370 to the second operation mode, does not need to be accurately computed, and is enough to be about the magnitude of load determined to be above a predetermined level that is estimated based on the driving speed of the compressor of the heat pump 303.

During the operation in the first operation mode, the output voltage output from the converter 370 to the DC link capacitor increases according to the limitation of the pulse width modulation duty. In other words, only boosting is performed without outputting the pulse width modulation duty.

As described above, the reason why the converter 370 is operated in the first operation mode is because the converter 370 tends to further increase the magnitude of leakage current in an initial driving period. In other words, a leakage current value according to the driving of other loads of the clothing treatment apparatus 1000, for example, the drum 301, the blower fan 302, and the compressor of the heat pump 303, and a leakage current value according to the driving of the inverter 370 may be added to generate an overshoot.

Meanwhile, during the operation in the second operation mode, the pulse width modulation duty varied within a predetermined limit current value is output to the inverters 351, 352, 353. Accordingly, even when the load is increased, the motors 361, 362, 363 may be stably driven.

Figure 14:
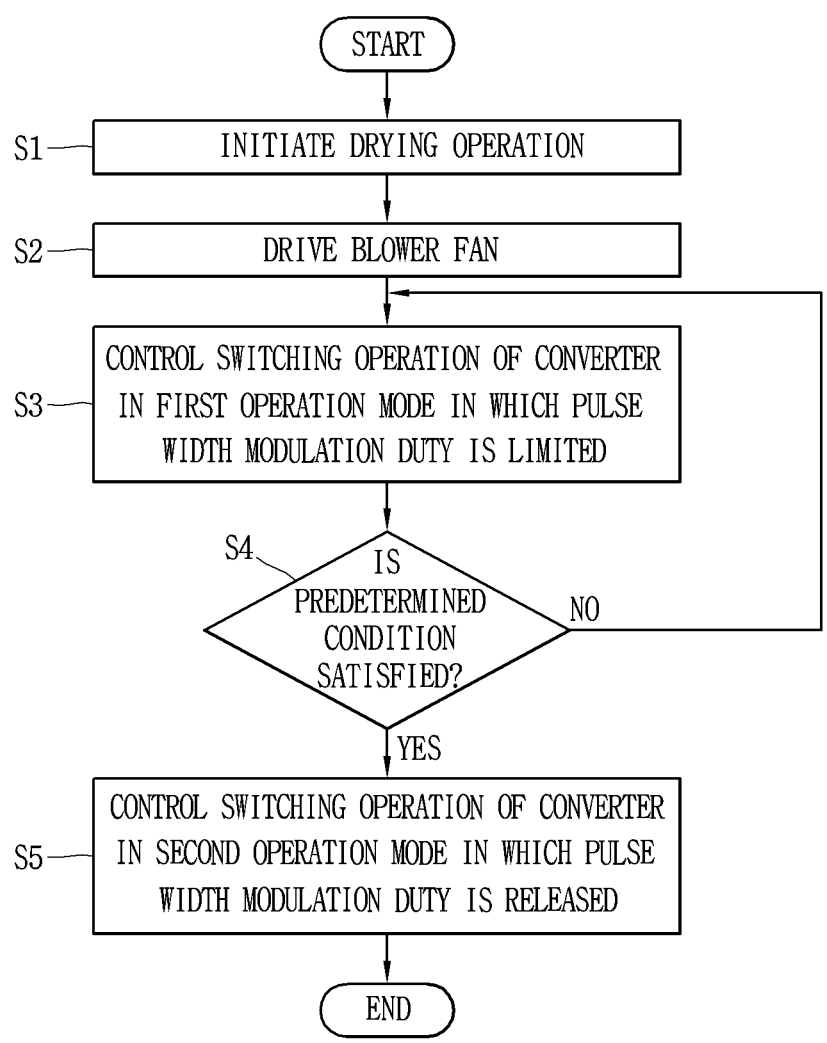
FIG. 14 is a flowchart for explaining a method of selectively performing a first operation mode or a second operation mode when a converter is driven after initiating a drying operation of the clothing treatment apparatus and the control method thereof according to an embodiment of the present disclosure.

Hereinafter, FIG. 14 is a flowchart for more specifically explaining a method of selectively performing a first operation mode or a second operation mode when a converter is driven after initiating a drying operation of the clothing treatment apparatus according to the present disclosure.

Referring to FIG. 14, first, according to an input of a control command for a drying operation, a drying operation is initiated (S1). The input of the control command for the drying operation is carried out through an input signal received by the input unit 310 of the clothing treatment apparatus 1000, and the input signal may be generated through a push of a power button, a specific voice command, sensing a set time, or the like.

Then, the motor 360 is driven based on the control command from the control unit 380 to drive the blower fan 302 (S2). Subsequently, the drum 301 of the clothing treatment apparatus 1000 is rotated to sense the laundry amount of an object to be dried.

Then, a single converter 370 connected to a plurality of inverters 350 for driving the drum 301, the blower fan 302, and the motor of the heat pump 303 in the clothing treatment apparatus 1000 is driven. To this end, the control unit 380 transfers a predetermined voltage command value to the converter 370 to allow the converter 370 to output a DC voltage corresponding to the predetermined voltage command value.

When the converter 370 is driven, the control unit 380 controls the switching operation of the converter 370 to drive the converter in a first operation mode in which the pulse width modulation (PWM) duty is limited (S3).

In other words, in the initial driving of the converter 370, the first operation mode is performed at a driving time point of the converter 370 regardless of a magnitude of load of the clothing treatment apparatus 1000, thereby blocking the possibility of overshooting due to leakage current from the beginning.

Meanwhile, in one embodiment, the first operation mode may be performed simultaneously with the driving of the compressor of the heat pump 303 subsequent to the driving of the blower fan 302. Furthermore, in another example, after a predetermined period of time has elapsed subsequent to driving the drum 301, the heat pump 303, and the compressor of the blower fan 302, the converter 370 may be driven in the first operation mode.

While the drying operation is in progress, the control unit 380 may determine whether a predetermined condition is satisfied (S4).

Here, the predetermined condition may be, for example, whether at least one of a magnitude of load of the clothing treatment apparatus 1000 or an output voltage of the converter 370, an output current, a driving speed of the motor 360, a speed command value of the heat pump 303 of the compressor, and an input current/input voltage of the inverter 360 exceeds a predetermined value. Here, the magnitude of load may be determined by an output current applied to the motor 363 that drives the compressor of the heat pump 303, an output voltage, a driving frequency of the motor 363, an operation mode of the clothing treatment apparatus 1000, a set time, and the like, or a combination thereof.

Alternatively, the predetermined condition may simply denote that a predetermined period of time elapses subsequent to performing the first operation mode.

When the predetermined condition is satisfied, the control unit 380 controls the switching operation of the converter 370 in the second operation mode in which the limitation of the pulse width modulation duty is released (S5).

Specifically, the control unit 380 may perform the second operation mode of generating a control signal for varying an operating frequency of the converter 370 based on a load of the clothing treatment apparatus 1000.

To this end, the clothing treatment apparatus 1000 according to the present disclosure may include a load detection unit (not shown) that detects a load. The load detection unit includes a speed detection unit that detects a driving speed of the compressor of the heat pump 303, and/or a current detection unit that detects an output current output from the inverter 353 to the motor of the compressor of the heat pump 303.

Specifically, the control unit 380 determines whether the detected magnitude of load has reached a predetermined level based on the magnitude of the load detected through the load detection unit, and switches to the second operation mode when the detected magnitude of load reaches the predetermined level to generate a control signal for increasing the driving frequency of the converter 370 and then output it to the converter 370.

When the compressor of the heat pump 303 is initially driven, the leakage current value may suddenly increase as the discharge pressure increases, but after that, as the driving speed increases step-by-step or is maintained at a target speed, the leakage current value is maintained or decreased. Therefore, when the converter 370 is switched to the second operation mode after a predetermined period of time has elapsed subsequent to driving the compressor of the heat pump 303, overshoot does not occur.

The control unit 380 may generate a control signal of the converter 370 and the inverter 350 based on a driving command and a driving speed of the compressor of the heat pump 303.

Alternatively, in another example, the control unit 380 may generate a control signal of the converter 370 and the inverter 350 using a driving command and an output current output to the motor 363 of the compressor of the heat pump 303. Here, the detection of the output current may be performed through a shunt resistor in a circuit of the converter 370.

On the other hand, even during the second operation mode of the converter 370, when the magnitude of load estimated from the driving speed of the compressor of the heat pump 303 increases to get out of a predetermined range, the control unit 380 may control the operating frequency to increase.

Similarly, the control unit 380 maintains the operating frequency when there is no change in the magnitude of load computed from the driving speed of the compressor of the heat pump 303 during the second operation mode, and decreases the operating frequency when the magnitude of load is reduced less than the threshold value.

For example, when the driving frequency of the compressor of the heat pump 303 is increased to increase an output current of the corresponding inverter 351, the control unit 380 may increase the operating frequency of the converter 370. In addition, when the driving frequency of the compressor of the heat pump 303 is decreased to reduce an output current of the corresponding inverter 351, the control unit 380 may reduce the operating frequency of the converter 370.

Here, the operating frequency of the converter 370 may be a pulse width modulation duty signal. When the driving frequency of the compressor of the heat pump 303 changes from low to high, the pulse width modulation duty of the converter 370 is also varied.

As a result, even after the magnitude of load increases above a predetermined level and the first operation mode is switched to the second operation mode, the pulse width modulation duty varied according to the load of the clothing treatment apparatus 1000 is output to the converter 370.

In one embodiment, when switching from the first operation mode to the second operation mode, the pulse width modulation duty may be gradually changed by applying a slope to the control signal of the switching operation. Accordingly, it may be possible to block the occurrence of an inrush current due to a sudden change in the pulse width modulation duty.

Even when the pulse width modulation duty limit is released according to the execution of the second operation mode, the execution section of the second operation mode may be divided into a plurality of sections to control the converter 370 in such a manner that the pulse width modulation duty is output as the lowest duty in an initial section, and a gradually increasing pulse width modulation duty is output in a subsequent section, and the maximum duty is output to correspond to a predetermined voltage command value in the next stabilization section.

In addition, even during the second operation mode, the control unit 380 may control to further increase an output voltage of the converter 370 when the magnitude of a DC voltage stored in the DC link capacitor becomes less than a preset reference voltage.

In addition, the control unit 380 may increase an output voltage of the converter 370 when an input current input to the motor 362 of the compressor of the heat pump 303, that is, an output current of the inverter 352, increases, and decrease the output voltage of the converter 370 when the output current of the inverter 352 decreases.

Here, the control signal of the switching operation for controlling the converter 370 denotes a switching signal for changing the duty cycle of a plurality of switching elements provided in the converter 370.

In another embodiment, when it is detected that a current value of the output current of the inverter 352 exceeds a threshold value for a predetermined number of times or more while the converter 370 is operating in the second operation mode, the controller 380 may reduce a predetermined magnitude of the limit current value.

In this case, the reduction in the magnitude of the predetermined limit current value may be performed by reducing the pulse width modulation duty for a predetermined time.

Specifically, the control unit 380 may perform a pulse width modulation (PWM) switching operation according to a control signal of a pulse width modulation (PWM) duty corresponding to the reduced limit current value, thereby outputting an output current lower than before. The converter 370 may set a pulse width modulation (PWM) duty value corresponding to the reduced output current, and perform pulse width modulation (PWM) switching according to the set pulse width modulation (PWM) duty, thereby reducing the output current of the converter 370.

In addition, the control unit 380 may further increase the output current reduction amount as the amount or number of times that the output current of the converter 370 exceeds the limit current value increases, thereby allowing the output current of the converter 370 to be less than the limit current within a short period of time.

For another example, when it is determined that an output current supplied to various loads of the clothing treatment apparatus 1000 through an output end of the converter 370, specifically, the inverter 350 for driving the motor, exceeds the current limit value while the converter 370 is operated in a second operation mode, the control unit 380 may limit the output current for a predetermined period of time (e.g., 3 to 5 seconds), thereby preventing the driving of the converter 370 from being stopped due to an overshooting of leakage current.

To this end, the output current of the converter is reduced for 5 seconds, and the counter value may be initialized after 5 seconds. In other words, when a predetermined period of time elapses, for instance, the relevant control field control value may be changed to supply the output current from the output end of the converter 370 to various loads of the clothing treatment apparatus 1000.

Figure 15A:
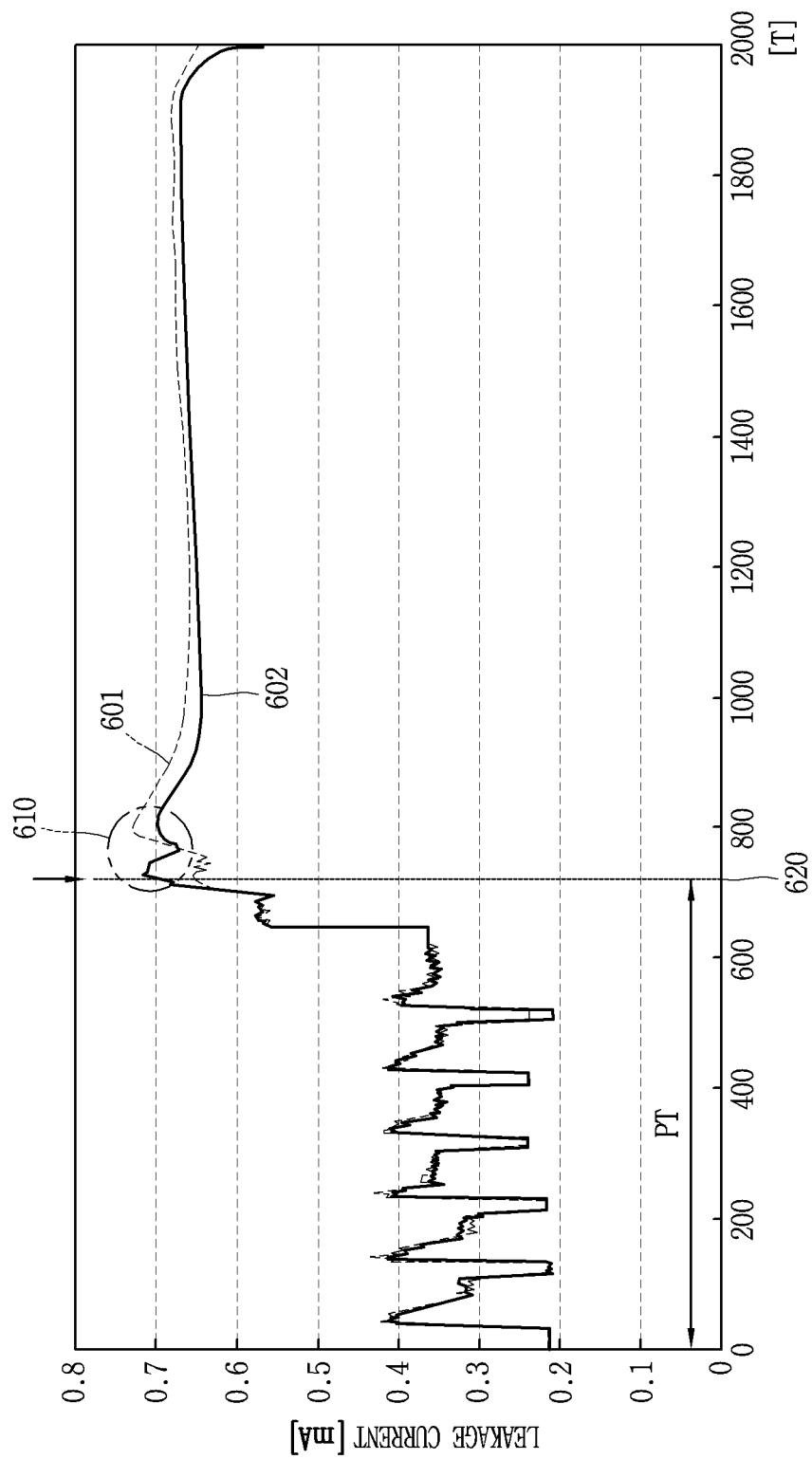
FIGS. 15A and 15B are graphs for explaining the overshooting of a leakage current according to the magnitude of load when a converter is driven after initiating a drying operation of the clothing treatment apparatus and the control method thereof according to an embodiment of the present disclosure.
Figure 15B:
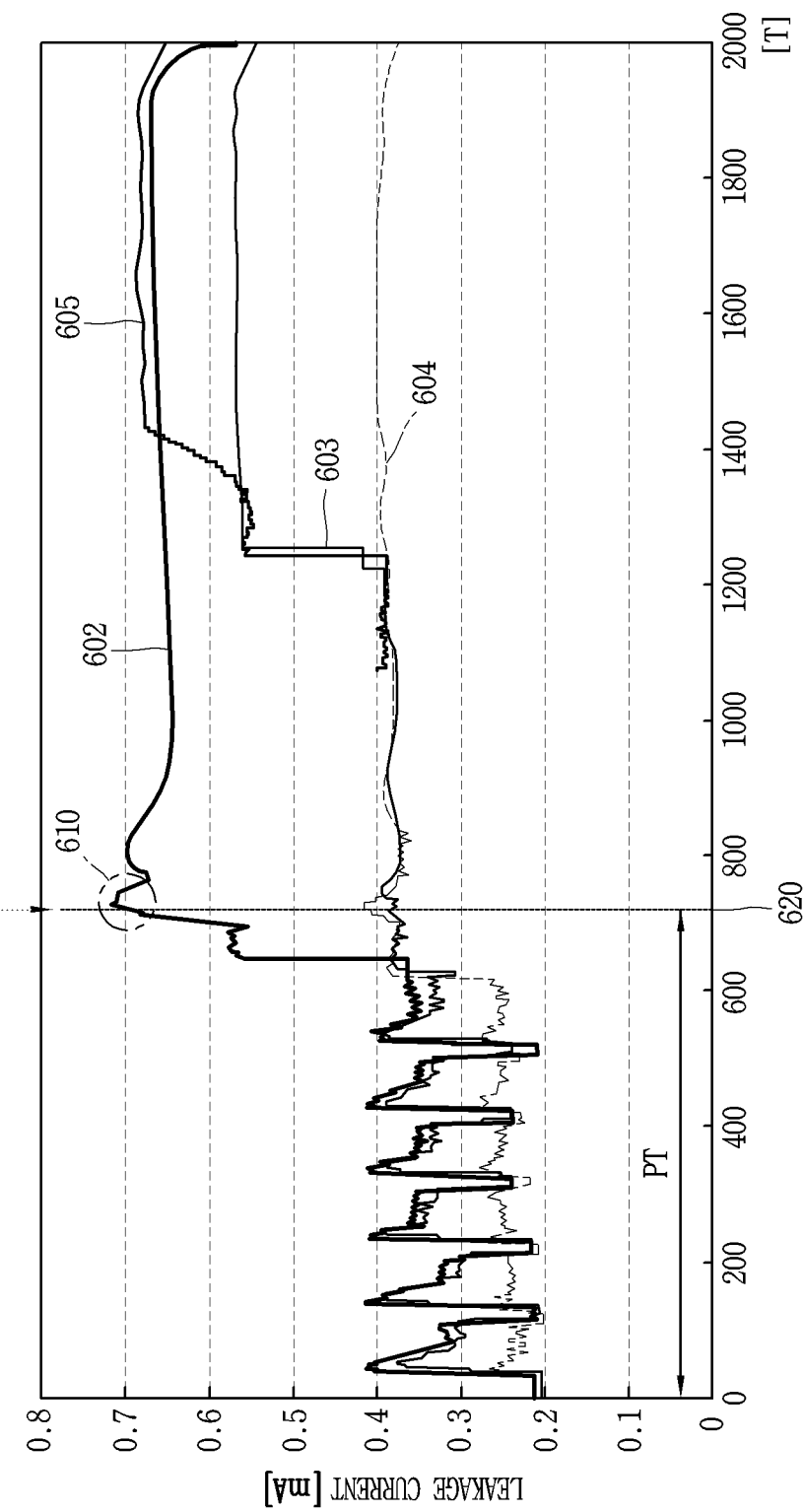

Hereinafter, FIGS. 15A and 15B are graphs for explaining the overshooting of a leakage current according to the magnitude of load when the converter 370 is driven after initiating a drying operation in the clothing treatment apparatus 1000 according to the present disclosure.

In FIGS. 15A and 15B, when a drying operation initiation command of the clothing treatment apparatus 1000 is received, the blower fan 302 is driven, and subsequently, a first section (PT) in which a process of sensing the amount of an object to be dried by the rotation of the drum 301 is performed is carried out. Here, the first section (PT) is shown to be about 600 to 700 time periods, but this is an example, and may vary depending on the laundry amount and laundry state of an object to be dried accommodated in the drum 301.

Next, in a second section, the compressor of the heat pump 303 in the clothing treatment apparatus is driven to perform the actual drying of an object to be dried. In the second section, since the blower fan 302, the drum 301, and the compressor of the heat pump 303 are driven together, the load of the clothing treatment apparatus 1000 suddenly increases. Therefore, the driving of the converter 370 is required to reach a target voltage during the drying operation.

FIG. 15A shows a graph in which a leakage current value 601 during a typical operation of the converter is compared with a leakage current value 602 during an operation of the converter at the maximum duty, as leakage current values when the converter 370 is operated when the drum 301 and the compressor of the heat pump 303 are driven (620) subsequent to the first section (PT), which is a laundry amount sensing section.

As shown in FIG. 15A, although there is a slight time difference, it may be seen that an overshoot 610 of the leakage current value occurs in both cases after sensing the amount of an object to be dried. Specifically, it may be seen that an overshoot occurs first when the converter is operated at the maximum duty, and then an overshoot occurs during a typical general operation of the converter.

FIG. 15B shows graphs in which a leak current value 603 when the converter 370 is operated, and a leak current value 604 when the converter 370 is not operated at all, after a predetermined period of time has elapsed subsequent to the driving (620) of the drum 301 and the compressor of the heat pump 303 after the first section (PT), which is a laundry amount sensing section, are compared with a leakage current value 605 when the converter 370 is not operated until the first section (PT) and the driving of the compressor of the heat pump 303, but operated only after a predetermined period of time has elapsed subsequent to driving the compressor.

When the converter 370 is not operated at all, as shown in graph 604, there is no possibility of an overshoot of leakage current, but voltage decreases due to an increase in power consumption. Accordingly, the control stability of the clothing treatment apparatus 1000 such as a possibility of stopping the operation of the compressor is deteriorated.

Accordingly, when the converter 370 is operated after a predetermined period of time has elapsed subsequent to driving the compressor, there is no occurrence of an overshoot as seen in graphs 603 or 605, but a time point of driving the converter 370 should be determined by comprehensively considering a timer check subsequent to driving the compressor and the possibility of stopping the driving of the compressor through continuous monitoring of the output current and output voltage. If an error occurs in the middle, the driving of the compressor may be stopped due to an increase in power consumption because of missing a time point of driving the converter 370, or drying efficiency may decrease due to a decrease in output voltage.

Accordingly, in the present disclosure, it is not required to separately compute the driving time of the converter 370, and pulse width modulation duty is limited at the beginning of the driving of the converter 370 to achieve only the boosting of the output voltage. In other words, when the converter 370 is driven, the output of the pulse width modulation duty is immediately limited regardless of the load of the clothing treatment apparatus 1000.

Then, when the load of the clothing treatment apparatus 1000 increases over time, the operation of the converter 370 may be controlled by releasing the duty limit to release a variable pulse width modulation duty, thereby solving the foregoing problem.

Figure 16:
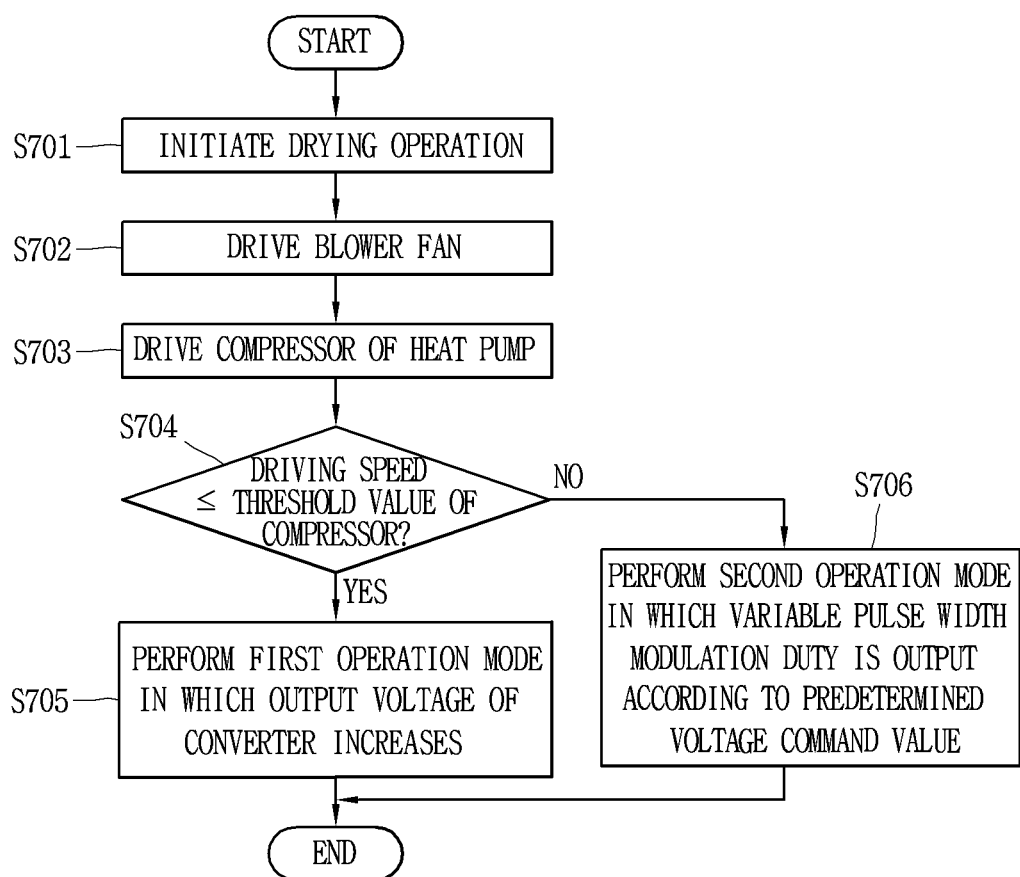
FIG. 16 is a flowchart showing a method of selectively performing a first operation mode or a second operation mode according to a driving speed of a compressor after initiating a drying operation of the clothing treatment apparatus and the control method thereof according to an embodiment of the present disclosure.

FIG. 16 is a flowchart showing a method of selectively performing a first operation mode or a second operation mode according to a driving speed of a compressor after initiating a drying operation in the clothing treatment apparatus according to the present disclosure.

Referring to FIG. 16, according to an input of a control command for a drying operation of the clothing treatment apparatus 1000, a drying operation of the clothing treatment apparatus 1000 is initiated (S701). Then, the motor is driven based on the control command from the control unit 380 to drive the blower fan 302 (S702). In this section, the amount of an object to be dried accommodated in the drum 301 is sensed.

Subsequently, the compressor of the heat pump 303 is driven (S703). In one embodiment, the compressor of the heat pump 303 may be driven simultaneously with the drum 301. In other words, the blower fan 302 of the clothing treatment apparatus 1000 is driven first, and then the compressor of the heat pump 303 may be driven with the drum 301.

Next, while the compressor of the heat pump 303 is being driven, a driving speed of the compressor is detected to determine whether it is below a predetermined threshold value (S704). In other words, it is determined whether the driving speed of the compressor exceeds a predetermined RPM.

As a result of the determination in step S704, when the driving speed of the compressor of the heat pump 303 is below a predetermined threshold value, the control period of the switching operation of the converter 370 is performed in the first operation mode in which pulse width modulation duty is limited to increase the output voltage of the converter 370 to store it in the DC link capacitor (S705).

Here, the limitation of the pulse width modulation duty may denote outputting the pulse width modulation duty by adjusting a ratio of maintaining high and low, for example, in such a manner that the pulse width modulation duty ratio falls within a range of 25% to 50% based on the target voltage. Here, the range of 25% to 50% is an example, and may, of course, be variably applicable according to circumstances.

In one example, the control unit 380 computes the magnitude of load based on the driving speed of the compressor of the heat pump 303 detected by the speed detection unit, and maintains the foregoing first operation mode while the computed magnitude of load is less than a predetermined level. Here, the predetermined level is a preset load range, and may be divided into a plurality of levels in advance according to the magnitude of the driving speed of the compressor.

A time point of driving the converter 370 may correspond to a time point of driving the compressor of the heat pump 303. Alternatively, in another example, the compressor of the heat pump 303 may be driven first, and then the converter 370 may be driven in the first operation mode after a predetermined period of time elapses.

As a result of the determination in step S704, when the compressor of the heat pump 303 exceeds a predetermined threshold value, it is assumed that the magnitude of load is above a predetermined level at this time, and the switching operation of the converter 370 may be controlled in the second operation mode in which a varied pulse width modulation duty is output according to a predetermined voltage command value. (S706). In other words, at this time, for example, the limitation of a predetermined duty ratio (e.g., a range of 25% to 50%) may be released to output a pulse width modulation signal with a 100% duty ratio when the voltage is within a limit voltage.

The switching operation of the converter 370 denotes that a switching signal for changing a duty cycle of a plurality of switching elements provided in the converter 370 is provided to the converter 370.

While performing the second operation mode, the control unit 380 further increases the operating frequency of the converter 370 as the magnitude of load increases, and further decreases the operating frequency of the converter 370 when the magnitude of load decreases. Furthermore, while the magnitude of load is maintained at a predetermined level, the operating frequency of the converter 370 may also be maintained within a predetermined value or within a predetermined range.

To this end, the second operation mode may be divided into a plurality of operation sections based on the magnitude of load, and then the operating frequency may be controlled to vary the duty ratio or change rate of the pulse width modulation duty of the converter 370 for each divided section. For example, a duty ratio of the pulse width modulation duty is not varied when the driving speed of the compressor of the heat pump 303, that is, RPM, is within an error range of target RPM, and the duty ratio may be increased or decreased only when exceeding the error range. Accordingly, the pulse width modulation duty may not be sensitively varied, thereby allowing stable driving.

In this way, the control unit 380 may control the converter and the inverters together according to the magnitude of load, thereby ensuring the control stability of the drying operation.

Furthermore, the control unit 380 may control the switching operation of the converter 370 by switching the first operation mode to the second operation mode when the computed magnitude of load exceeds the predetermined level.

In another example, the control unit 380 may perform only the first operation mode in which the PWM output is limited, and the output voltage of the converter 370 is increased and stored in the DC link capacitor while the driving speed of the compressor of the heat pump 303 is below a predetermined threshold value. Similarly, when the driving speed of the compressor of the heat pump 303 exceeds the predetermined threshold value, the switching operation of the converter 370 is controlled to output a variable pulse width modulation duty to a set voltage command value.

As a result, in performing the drying operation of the clothing treatment apparatus 1000 having a plurality of inverters and a single converter, the driving of the compressor for performing a drying operation may be stably driven with no occurrence of an overshoot without adjusting the driving point of the converter.

Figure 17:
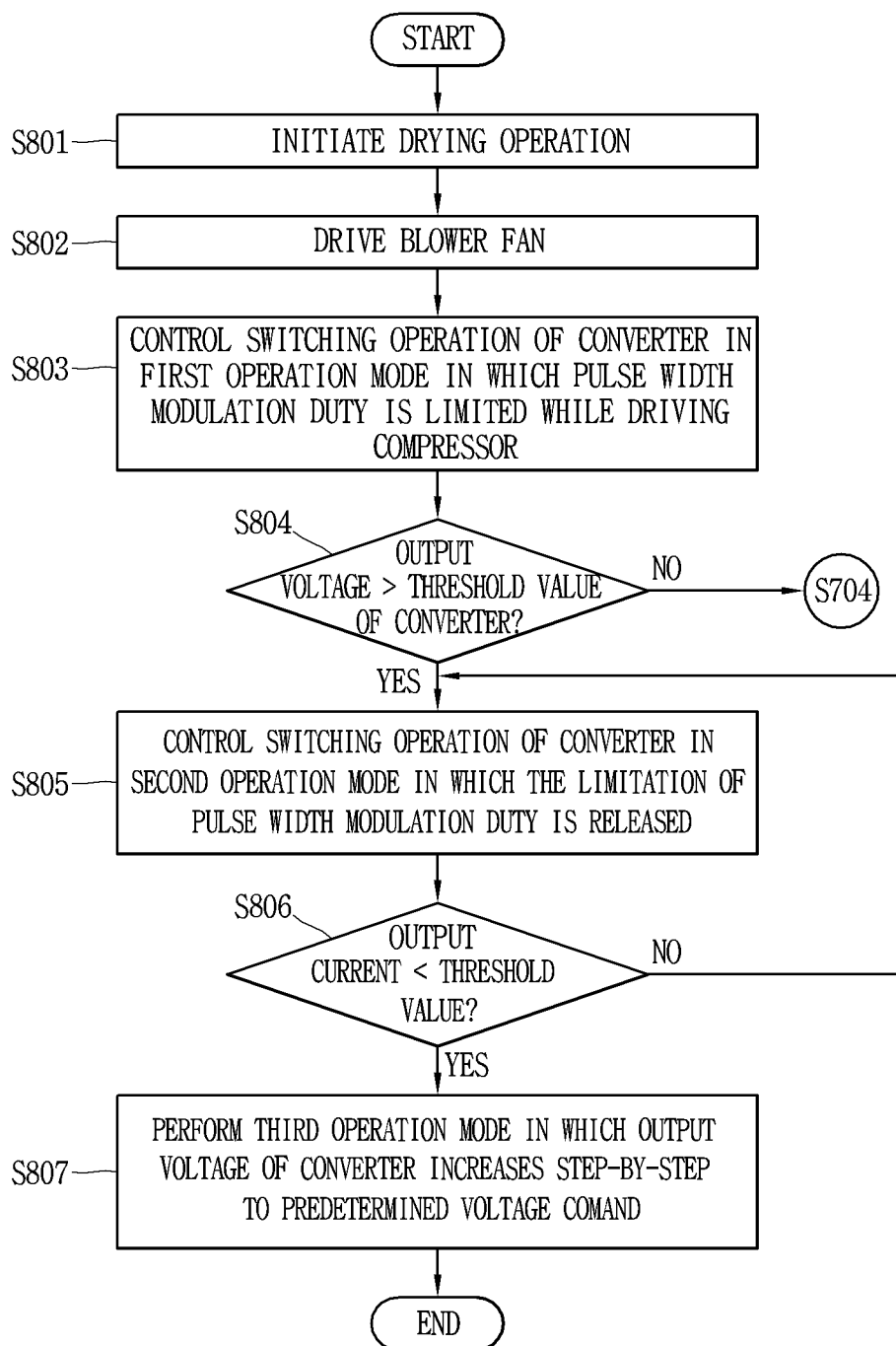
FIG. 17 is a flowchart for explaining a method of selectively performing a first operation mode, a second operation mode, and a third operation mode according to the magnitude of the output voltage and output current of the converter after initiating a drying operation according to the clothing treatment apparatus and the control method thereof according to an embodiment of the present disclosure.

FIG. 17 is a flowchart for explaining a method of selectively performing a first operation mode, a second operation mode, and a third operation mode according to the magnitude of the output voltage and output current of the converter after initiating a drying operation of the clothing treatment apparatus 1000 according to another embodiment of the present disclosure.

In FIG. 17, when an object to be dried is placed into the drum 301 and a control command for a drying operation is received, the drying operation is initiated (S801). Then, the motor is driven based on the control command from the control unit 380 to drive the blower fan (S802). In this section, the amount of an object to be dried accommodated in the drum 301 may be sensed.

Next, when the compressor of the heat pump 303 for performing an actual drying operation is driven, the converter 370 is controlled in the first operation mode in which the pulse width modulation (PWM) duty is limited (S803). Here, the PWM duty ratio may be limited to 0.3 to 0.5, but is not limited thereto. As described above, due to the limitation of the PWM duty, the possibility of occurring an overshoot during the driving of the converter 370 is eliminated.

Then, the output voltage of the converter 370 is monitored to determine whether it is within a limit voltage (804).

When the output voltage of the converter 370 is above the limit voltage, the process of determining whether the driving speed of the compressor of the heat pump 303 is below a threshold value, which is step S704 described in FIG. 16, and subsequent steps are performed.

For example, when the output voltage of the converter 370 exceeds the limit voltage, the first operation mode (S705) or the second operation mode (S706) described above according to the magnitude of load corresponding to the driving speed of the compressor of the heat pump 303 (S706) is performed. In other words, whether to maintain the first operation mode or switch to the second operation mode is determined according to the magnitude of load.

Meanwhile, when the output voltage of the converter 370 is less than the limit voltage, the switching operation of the converter 370 is controlled in the second operation mode in which the limitation of the pulse width modulation duty is released (S805).

Then, it is determined whether the output current of the converter 370 is less than a limit current value (S806) to perform a third operation mode in which the output voltage of the converter 370 increases step-by-step to a predetermined voltage command value when it is less than the limit current value (S807).

In other words, the output voltage of the converter 370 is determined by a voltage command value according to the control of the control unit 380. Accordingly, the output voltage of the converter 370 is controlled to follow a voltage command value transmitted from the control unit 380. To this end, the control unit 380 may perform PWM switching according to a set pulse width modulation (PWM) duty, thereby allowing the converter 370 to output an output voltage corresponding to the voltage command value.

In addition, although not shown, when the output voltage of the converter 370 reaches a predetermined voltage command value while performing the foregoing third operation mode, the control unit 380 switches back to the second operation mode to control the switching operation of the converter 370 so as to correspond to the set pulse width modulation duty.

According to this embodiment, the possibility of occurrence of an overshoot may be eliminated without adjusting a time point of driving the load when the converter is driven according to the use of a plurality of inverters, and when the magnitude of load increases, the duty ratio limit may be released to output a variable pulse width modulation duty to eliminate the possibility of stopping the driving of the compressor and ensure control stability, and the pulse width modulation duty output to the converter may be limited or varied according to the magnitude of load to adaptively adjust the output current of the converter while at the same time preventing the overshooting of leakage current.

Hereinafter, another embodiment of a clothing treatment apparatus and a control method thereof according to the present disclosure will be described with reference to FIGS. 18 to 23.

Another embodiment of the clothing treatment apparatus 1000 according to the present disclosure includes a main body defining an appearance thereof, a drum 301 that accommodates an object to be dried, which is rotatably provided inside the main body, a compressor 1120 of a heat pump 303 that compresses refrigerant to allow dehumidified air to pass through a condenser so as to be thermally circulated to the drum 301 when moisture is removed from heated air absorbed from the object to be dried, a blower fan 302 that generates a flow of the heated air or dehumidified air, a converter 370 that converts input power received from the outside to output the converted power to at least one of a first motor 361 that rotates the drum 301, a second motor 362 that drives the blower fan 302, and a third motor 363 that drives the compressor 1120, and a control unit 380 that controls at least one of the converter 370 and the compressor 1120 to drive the converter 370 from a second time point later than a first time point at which the compressor 1120 is driven.

Figure 18:
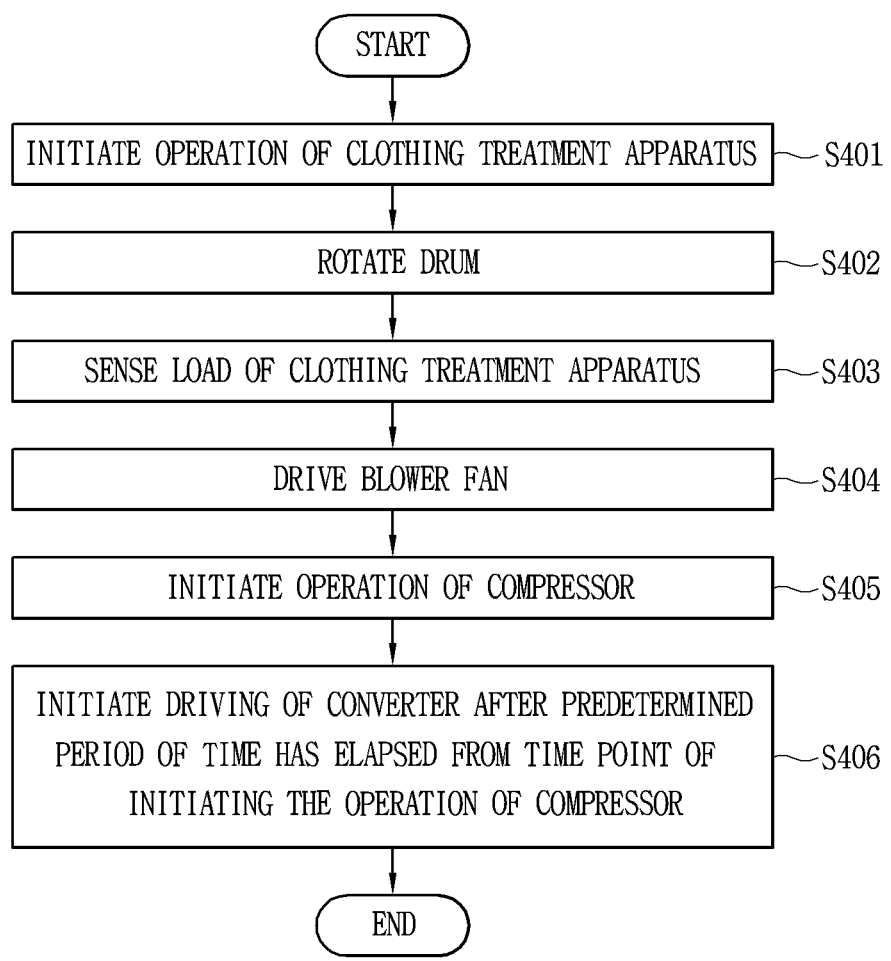
FIG. 18 is a flowchart 2 showing a control method according to the clothing treatment apparatus and the control method thereof according to an embodiment of the present disclosure.

Referring to FIG. 18, a control method of a clothing treatment apparatus according to the present disclosure is shown.

As shown in FIG. 18, when a user input is applied to the input unit, the operation of the clothing treatment apparatus is initiated (S401).

First, the control unit 380 may drive the first motor to rotate the drum (S402).

Specifically, the control unit 380 may sense a load of the clothing treatment apparatus while driving the drum in a predetermined pattern (S403).

Then, the control unit 380 may drive the second motor to rotate the blower fan (S404).

When the blower fan starts to be driven, the control unit 380 may control the third motor to initiate the operation of the compressor (S405).

In addition, the control unit 380 may initiate the driving of the converter 370 after a predetermined time interval has elapsed from a time point of initiating the operation of the compressor (S406).

In this way, the control unit 380 according to the present disclosure may control at least one of the converter 370 and the compressor to drive the converter 370 from a second time point later than a first time point at which the compressor is driven.

In one embodiment, the control unit 380 may drive the converter 370 after a predetermined time interval elapses from a time point of initiating the driving of the compressor.

Referring to FIG. 18, when the drying operation of the clothing treatment apparatus is started, the control unit 380 first drives the first motor to rotate the drum. Driving the drum with the highest priority has an effect of visually confirming to the user that the driving of the clothing treatment apparatus has been initiated.

Then, the control unit 380 may sequentially drive the blower fan and the compressor, and initiate the driving of the converter 370 after a predetermined time interval elapses subsequent to driving the compressor.

The control unit 380 may delay a time point of initiating the operation of the converter 370 by a predetermined time from a time point of initiating the operation of the compressor or initiating the rotation of the drum to reduce the leakage current in the clothing treatment apparatus.

In other words, the control unit 380 may delay a time point of turning on the converter 370 by a predetermined time from a time point of initiating the driving of the first motor or the third motor to reduce the leakage current in the clothing treatment apparatus.

Figure 21:
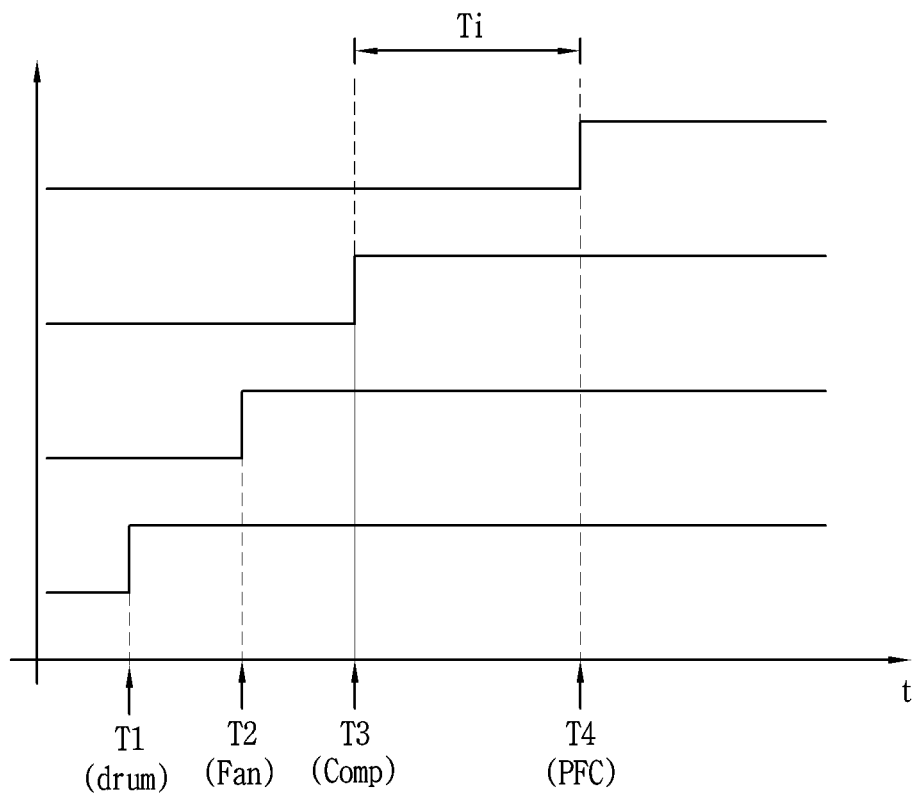
FIG. 21 is a graph showing a driving sequence of a drum, a blower fan, a compressor, and a converter according to the clothing treatment apparatus and the control method thereof according to an embodiment of the present disclosure.

For reference, a graph showing the control method described in FIG. 18 will be shown in FIG. 21.

Referring to FIG. 21, the rotation of the drum is initiated from a first time point (T1), and the driving of the blower fan is initiated from a second time point (T2), and the driving of the compressor is initiated from a third time point (T3). In addition, the driving of the converter 370 is initiated from a fourth time point (T4) at which a predetermined time interval (Ti) elapses from the third time point (T3) at which the driving of the compressor is initiated.

Figure 19:
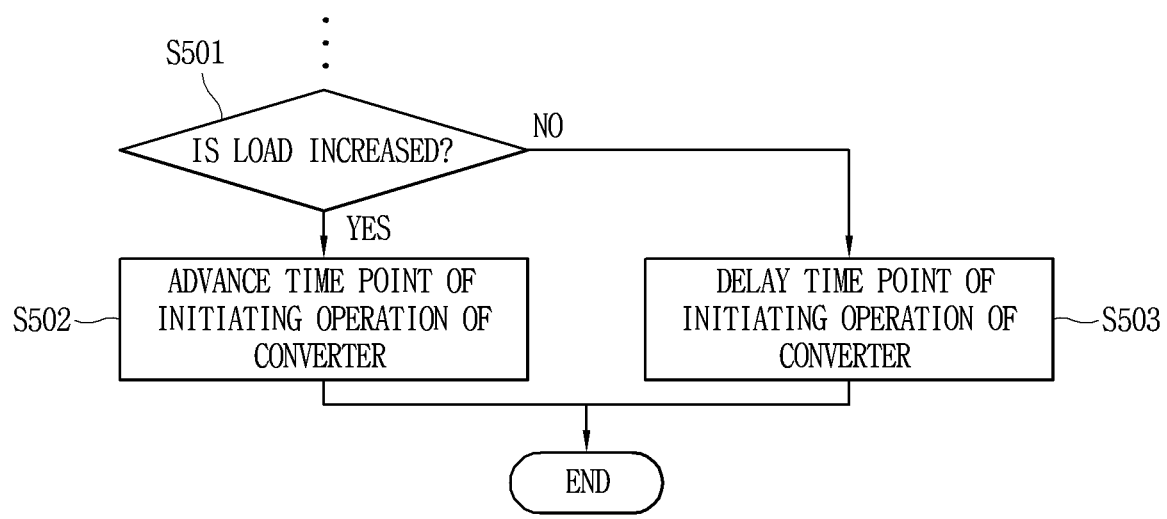
FIG. 19 is a flowchart 1 showing a specific control embodiment of the control method as shown in FIG. 18.

In FIG. 19, an embodiment related to a method of controlling a clothing treatment apparatus according to the present disclosure will be described.

Referring to FIG. 19, the control unit 380 may detect the magnitude of load applied to the compressor using information sensed by the sensing unit 340, and control the driving of the converter 370 to change a time interval from a time point of initiating the operation of the compressor to a time point of initiating the operation of the converter 370 based on the detected load.

Specifically, the control unit 380 may determine whether the load applied to the compressor increases for each predetermined period (S501).

In one example, the control unit 380 may compute a load applied to the compressor using a current flowing through a third motor that drives the compressor sensed by the sensing unit 340 or a voltage applied to the third motor. Furthermore, the control unit 380 may compute a load applied to the compressor based on a sensing result of the weight sensing unit that senses the weight of laundry accommodated in the drum.

In another example, the control unit 380 may control the driving of the converter 370 based on a speed command value generated in response to the third motor 363. In other words, the control unit 380 may set an interval between a time point of driving the converter 370 and a time point of driving the compressor using a speed command value generated to control the third motor 363.

Specifically, when a speed command value corresponding to the third motor 363 increases, the control unit 380 may control the driving of the converter 370 to reduce a time interval from a time point of initiating the operation of the compressor to a time point of initiating the operation of the converter 370.

Conversely, when a speed command value corresponding to the third motor 363 decreases, the control unit 380 may control the driving of the converter to increase the time interval.

In another embodiment, when the magnitude of a voltage applied to the third motor 363 increases, the control unit 380 may control the driving of the converter 370 to reduce a time interval from a time point of initiating the operation of the compressor to a time point of initiating the operation of the converter 370.

In another example, when the magnitude of a current flowing through the third motor 363 increases, the control unit 380 may control the driving of the converter 370 to reduce a time interval from a time point of initiating the operation of the compressor to a time point of initiating the operation of the converter 370.

In another example, the control unit 380 may control the driving of the converter 370 based on the weight of laundry accommodated in the drum.

Specifically, when the sensed weight of laundry increases, the control unit 380 may control the driving of the converter 370 to reduce a time interval from a time point of initiating the operation of the compressor to a time point of initiating the operation of the converter 370.

Referring to FIG. 19, when a load applied to the compressor increases, the control unit 380 may advance a time point of initiating the operation of the converter 370 (S502).

Conversely, when the load applied to the compressor does not increase or decreases, the control unit 380 may delay a time point of initiating the operation of the converter 370 (S503).

In other words, the control unit 380 may variably set an interval between a time point of initiating the operation of the compressor and a time point of initiating the operation of the converter 370 according to the computed magnitude of load.

Figure 20:
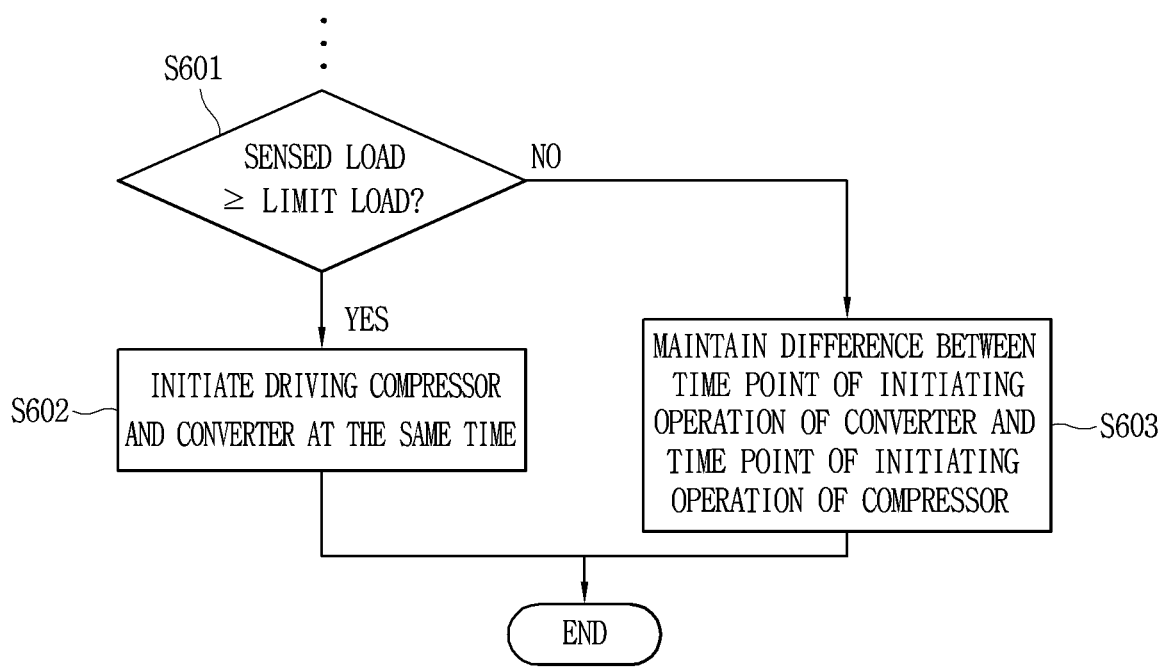
FIG. 20 is a flowchart 2 showing a specific control embodiment of the control method as shown in FIG. 18.

In FIG. 20, another embodiment related to a method of controlling a clothing treatment apparatus according to the present disclosure will be described.

Referring to FIG. 20, the control unit 380 may determine whether the magnitude of load applied to the compressor is above a preset limit load (S601).

The control unit 380 may drive the compressor and the converter 370 at the same time when the magnitude of load applied to the compressor is above the preset limit load (S602).

Conversely, when the magnitude of load applied to the compressor is below a preset limit load, the control unit 380 may maintain a difference between a time point of initiating the operation of the converter 370 and a time point of initiating the operation of the compressor (S603).

Although not shown in FIGS. 18 to 20, the control unit 380 may compute the amount of power consumed by the first motor, the second motor, and the third motor to control the driving of the converter 370 based on the computed amount of power.

In the foregoing embodiment, the control unit 380 for setting a time point of initiating the driving of the converter 370 based on a time point of initiating the driving of the compressor has been described, but the present disclosure is not limited thereto.

Accordingly, the control unit 380 may set a time point of initiating the driving of the converter 370 using power applied to the first motor 361 rotating the drum or power applied to the second motor 362 rotating the blower fan 302.

Figure 22:
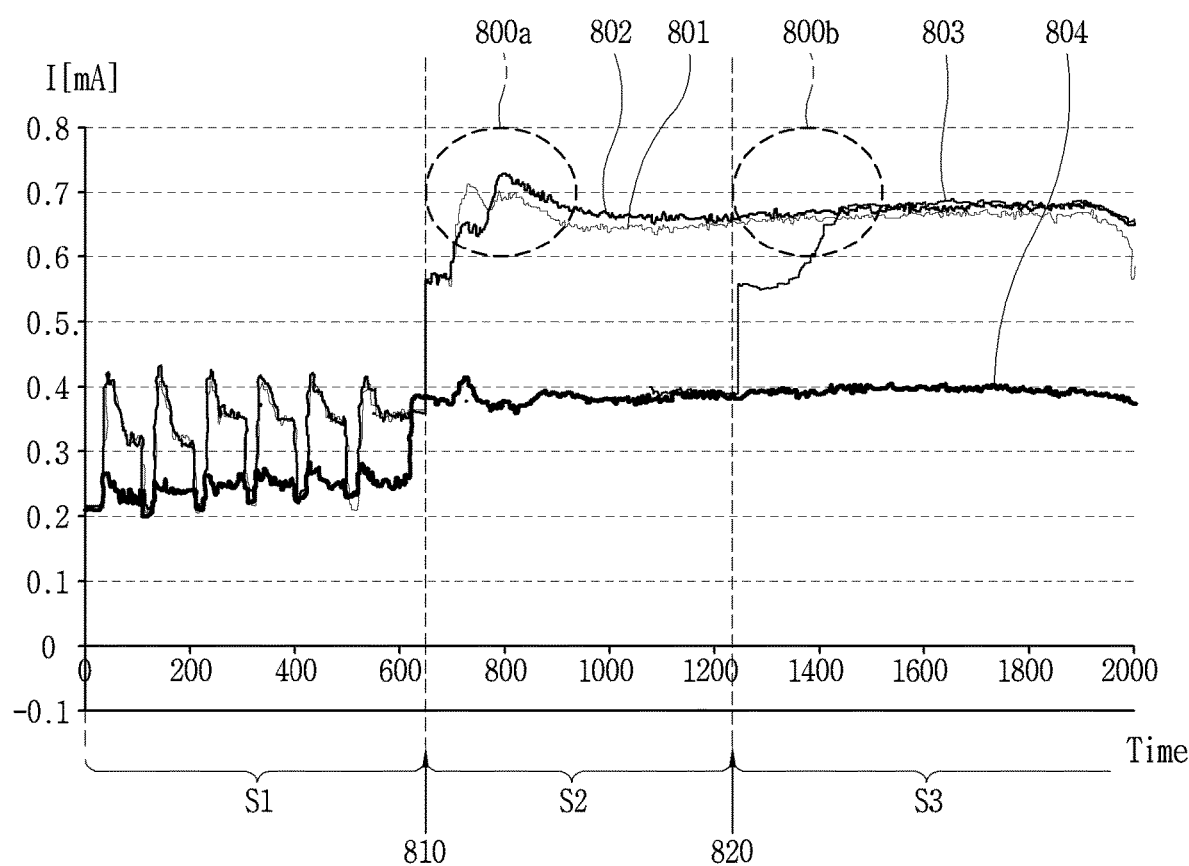
FIG. 22 is a graph showing a leakage current generated in a control circuit of a clothing treatment apparatus according to the clothing treatment apparatus and the control method thereof according to an embodiment of the present disclosure.

FIG. 22 shows an amount of leakage current generated according to a method of driving the converter.

In a graph shown in FIG. 22, a first leakage current 801 corresponds to a case where the compressor and the converter 370 are driven at the same time. A second leakage current 802 corresponds to a case in which the switching duty of the converter 370 increases to the maximum. A third leakage current 803 corresponds to a case of controlling the converter 370 using the control method of the present disclosure shown in FIG. 18. A fourth leakage current 804 corresponds to a case of maintaining the converter 370 in a turn-off state.

As shown in FIG. 22, an overshoot phenomenon 800a occurs on the first leakage current 801 and the second leakage current 802. On the contrary, in case of the third leakage current 803, the overshoot does not occur (800b).

Figure 23:
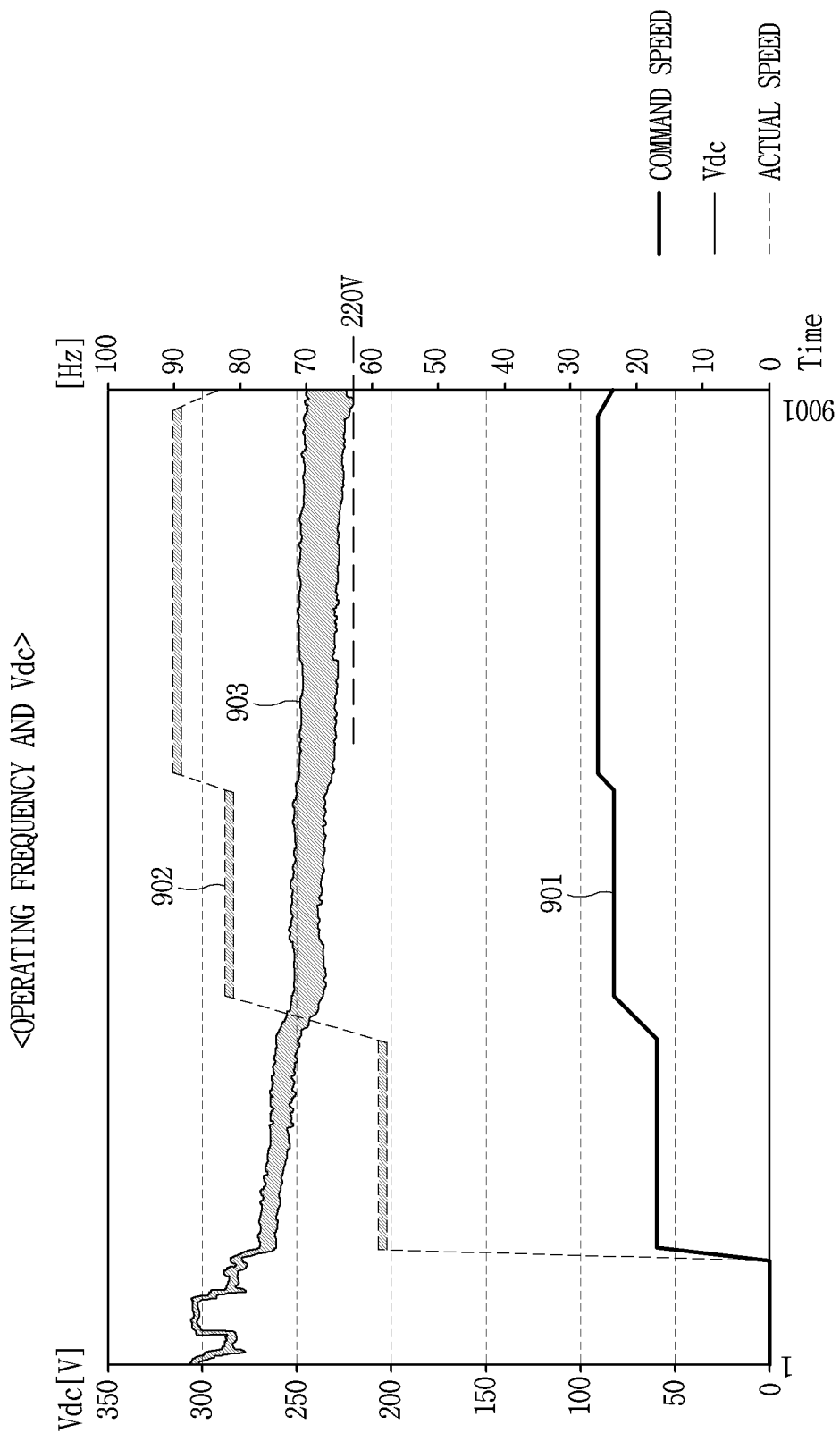
FIG. 23 is a graph showing an operating frequency fluctuation of a compressor according to the clothing treatment apparatus and the control method thereof according to an embodiment of the present disclosure.

FIG. 23 is a graph showing a change in voltage (Vdc) applied to a DC link voltage according to an operating frequency of the compressor.

In the graph of FIG. 23, a command speed 901 of the compressor, a DC end voltage 902, and an actual speed 903 of the compressor are shown.

As shown in FIG. 23, as the command speed 901 or the actual speed 903 of the compressor increases, the magnitude of the DC end voltage 902 may decrease. Specifically, as the command speed 901 or the actual speed 903 of the compressor increases, a drop distance of the DC end voltage 902 may increase.

Accordingly, the control unit 380 according to the present disclosure may control the driving of the converter 370 based on a rotational speed of the compressor in order to prevent a state in which the voltage margin is insufficient.

In one embodiment, the control unit 380 may activate the driving of the converter 370 before the third motor 363 reaches a preset speed. Since the load of the clothing treatment apparatus increases according to the rotational speed of the compressor, a rate of using DC voltage is reduced. Therefore, in order to prevent the DC voltage utilization rate from falling below the limit utilization rate, the control unit 380 may control the converter 370 to start the driving of the converter before a rotational speed of the compressor increases to the maximum.

In this way, the control unit 380 may monitor a rotational speed of the third motor 363 in order to turn on the converter before a rotational speed of the compressor increases to the maximum.

According to this embodiment, a time point of driving the converter may be controlled to minimize the occurrence of leakage current, and a time point of driving the converter under conditions requiring high output may be actively adjusted to secure driving stability and drying efficiency at the same time.

Hereinafter, another embodiment of a clothing treatment apparatus and a control method thereof according to the present disclosure will be described with reference to FIGS. 24 to 29.

Other embodiments of the clothing treatment apparatus and the control method thereof according to the present disclosure may be divided into {Control device of clothing treatment apparatus}, {Clothing treatment apparatus}, {Control method 1 of clothing treatment apparatus}, and {Control method 2 of clothing treatment apparatus} for implementation, and may be implemented, and each of the embodiments will be separately described in order below.

{Control Device of Control Device of Clothing Treatment Apparatus}

A control device of a clothing treatment apparatus according to the present disclosure (hereinafter, referred to as a control device), which is a control device of the clothing treatment apparatus as shown in FIG. 3A, may be the control unit 1600 as described above in the basic configuration of the clothing treatment apparatus.

The control device may be disposed as a module on a single circuit board.

A specific circuit configuration of the control device disposed as a module on a single circuit board may be as shown in FIG. 3B.

Figure 24:
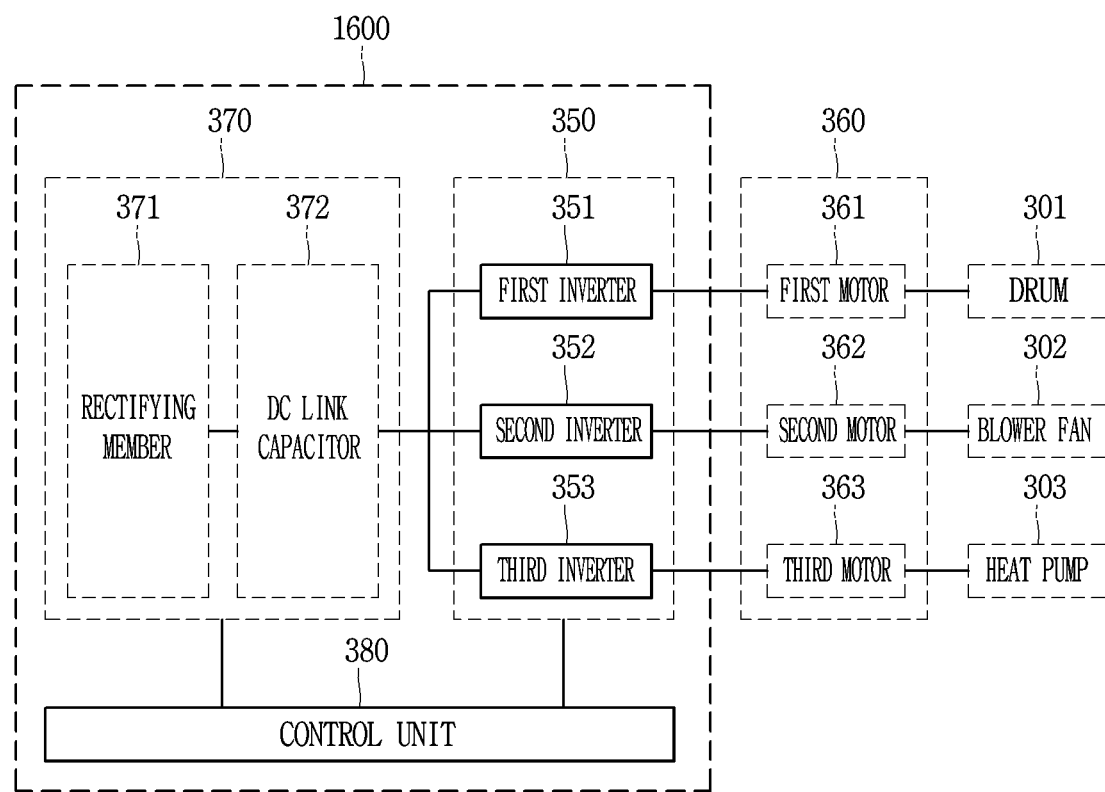
FIG. 24 is a block diagram showing the configuration of a control device of a clothing treatment apparatus according to the clothing treatment apparatus and the control method thereof according to an embodiment of the present disclosure.

As shown in FIG. 24, the control device 1600 includes a converter 370 having a rectifying member 371 that converts AC power input from an external power supply into DC power, and a DC link capacitor 372 that smooths the DC power converted by the rectifying member 371, a plurality of inverters 350 having a switching unit that converts the DC power smoothed by the DC link capacitor 372 into driving power for driving a plurality of motors 360 driving the clothing treatment apparatus to output it to the plurality of motors 360, respectively, and a control unit 380 that generates a control signal for controlling the operation of the converter 370 and the inverters 350 to transfer it to the converter 370 and the inverters 350, respectively, wherein the control unit 380 controls the operation of the converter 370 to increase a DC link voltage (Vdc) stored in the DC link capacitor 372 according to a preset increase reference when the clothing treatment apparatus is initially driven, so as to increase the DC link voltage (Vdc) to the increase reference.

In other words, the control device 1600 controls the operation of the converter 370 when the clothing treatment apparatus is initially driven to control the DC link voltage (Vdc) to increase based on the increase reference.

When the clothing treatment apparatus is initially driven, a voltage stored in the DC link capacitor 372 is close to zero, and when the initial driving of the clothing treatment apparatus starts and the DC link voltage (Vdc) rises rapidly, a difference between the previous value and the current value increases, thereby increasing an error in a control value or an error or a measurement value for controlling the clothing treatment apparatus. In this case, since the initial driving control of the clothing treatment apparatus becomes unstable due to the error, it is required to control the DC link voltage (Vdc) to gradually increase.

Accordingly, the control device 1600 may control the operation of the converter 370 to increase the DC link voltage (Vdc) according to the increase reference, thereby gradually increasing the DC link voltage to secure stability for the initial driving control.

The control unit 380 may control a conversion operation of the DC power of the rectifying member 371 included in the converter 370 to increase the DC link voltage (Vdc) based on the increase reference.

For instance, the control unit 380 may control the speed or period at which the rectifying member 371 converts the AC power into the DC power, thereby controlling the speed at which the DC power is transmitted to the DC link capacitor 372 to increase the DC link voltage (Vdc) based on the increase reference.

The control unit 380 may control the operation of the converter 370 by sequentially increasing a target output value of the DC power output from the converter 370 according to the increase reference.

In other words, the control unit 380 may sequentially increase the target output value according to the increase reference to control the operation of the converter 370, thereby increasing the DC link voltage (Vdc) based on the increase reference.

The increase reference may be a reference for an increase slope or an increase method of the DC link voltage (Vdc).

In other words, the control unit 380 may increase the target output value according to the increase slope or the increase method to control the operation of the converter 370, thereby increasing the DC link voltage (Vdc) based on the increase reference.

The increase reference may be a reference for a slope or method of increasing the DC link voltage (Vdc) from 0 [V] to a maximum voltage level from the initial driving.

The increase reference may be set such that the DC link voltage (Vdc) increases by a predetermined amount per hour up to a maximum voltage level.

For example, the DC link voltage (Vdc) may be set to increase from 0 [V] by 5 [V] per second.

The increase reference may be set such that the DC link voltage (Vdc) increases to the maximum voltage level for a predetermined period of time.

Specific examples of the increase reference and increasing the DC link voltage (Vdc) according to the increase reference are as shown in FIGS. 25A to 25F.

Figure 25A:
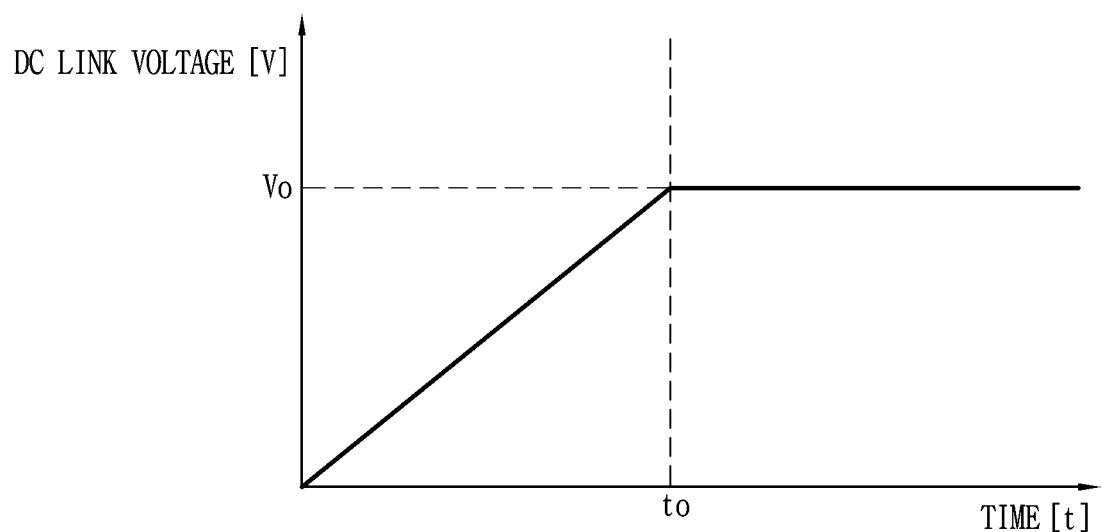
FIGS. 25A to 25F are graphs showing examples of increasing a DC link voltage according to an increase reference according to the clothing treatment apparatus and the control method thereof according to an embodiment of the present disclosure.

As shown in FIG. 25A, the increase reference may be set such that the DC link voltage (Vdc) increases to the maximum voltage level (V0) at a predetermined slope for a predetermined period of time (t0) subsequent to the initial driving.

In this case, the control unit 380 may increase the target output value at the predetermined slope and control the operation of the converter 370 so as to control the DC power output to the DC link capacitor 372 to increase at the predetermined slope, thereby increasing the DC link voltage (Vdc) as shown in FIG. 25A.

Figure 25B:
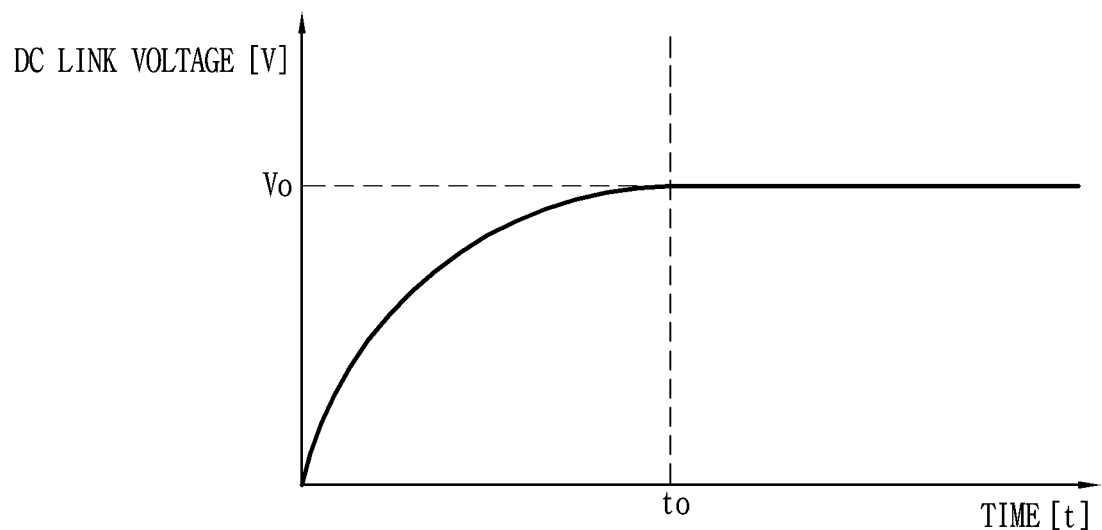
Figure 25C:
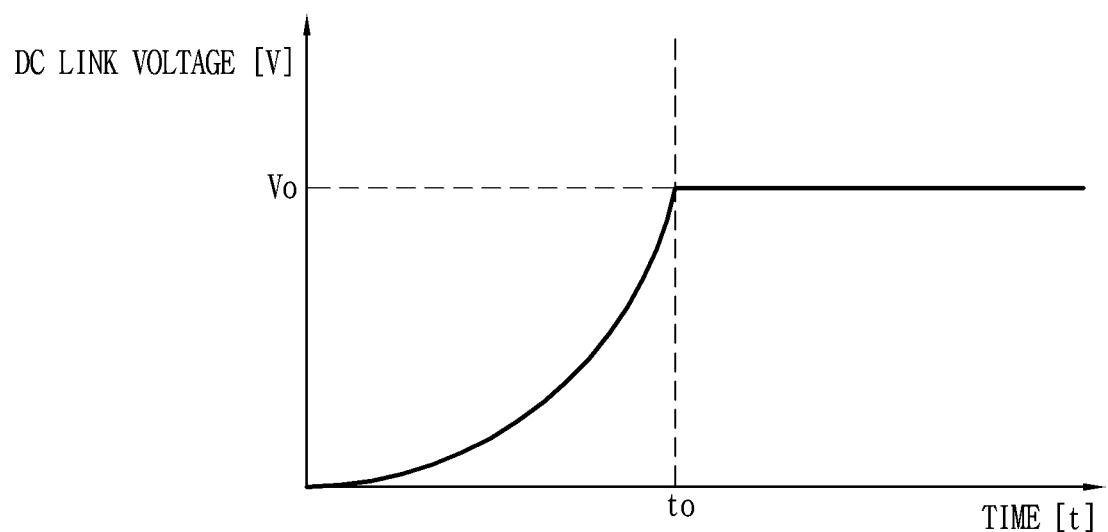

The increase reference may also be set such that the DC link voltage (Vdc) increases to the maximum voltage level (V0) at a parabolic slope for a predetermined period of time (t0) after the initial driving, as shown in FIG. 25B or 25C.

In this case, the control unit 380 may increase the target output value at the parabolic slope and control the operation of the converter 370 so as to control the DC power output to the DC link capacitor 372 to increase at the parabolic slope, thereby increasing the DC link voltage (Vdc), as shown in FIG. 25B or 25C.

Figure 25D:
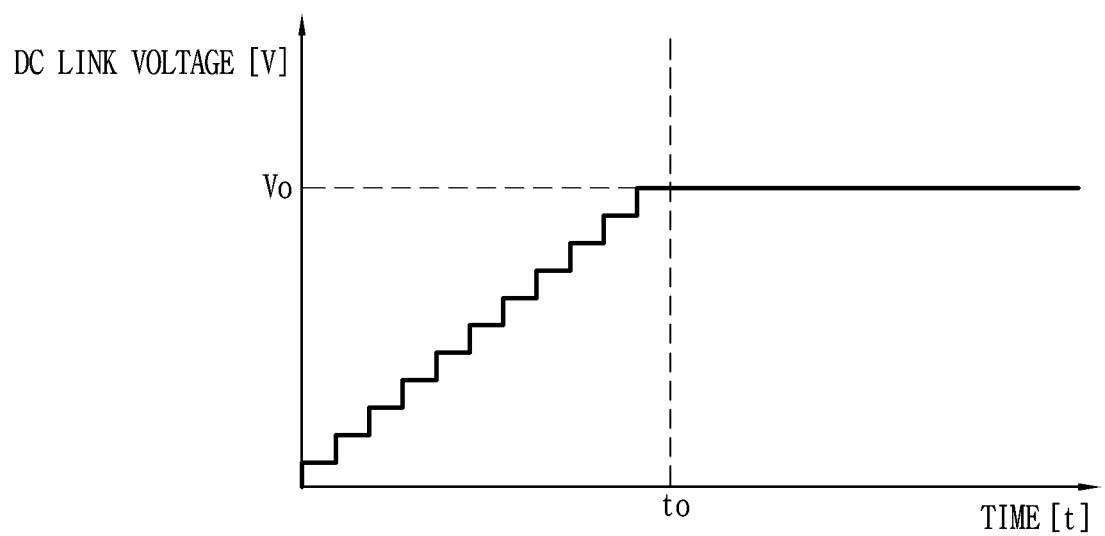

As shown in FIG. 25D, the increase reference may also be set such that the DC link voltage (Vdc) increases step-by-step to the maximum voltage level (V0) for a predetermined period of time (t0) after the initial driving.

In this case, the control unit 380 may increase the target output value step-by-step and control the operation of the converter 370 so as to control the DC power output to the DC link capacitor 372 to increase step-by-step, thereby increasing, the DC link voltage (Vdc) as shown in FIG. 25D.

Figure 25E:
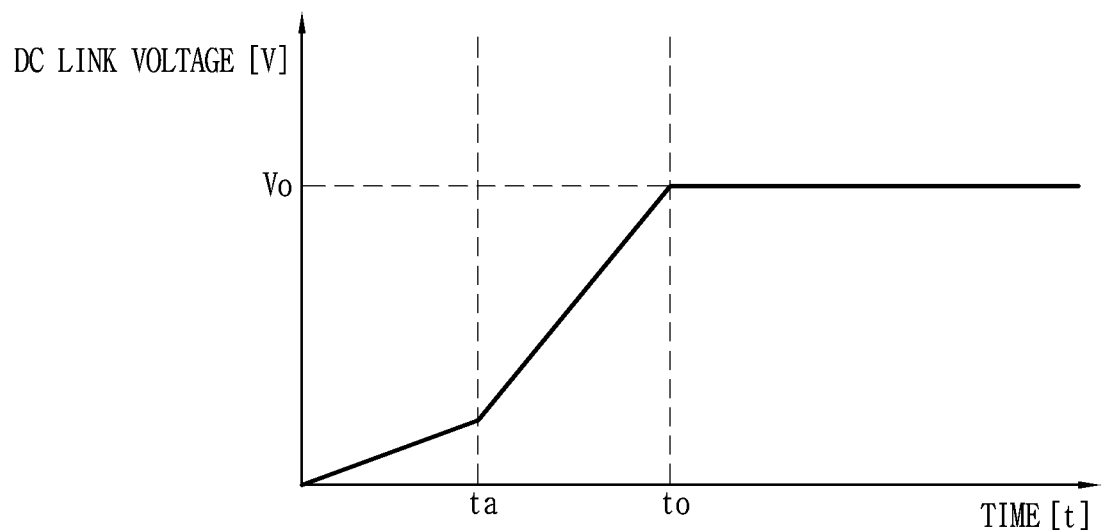
Figure 25F:
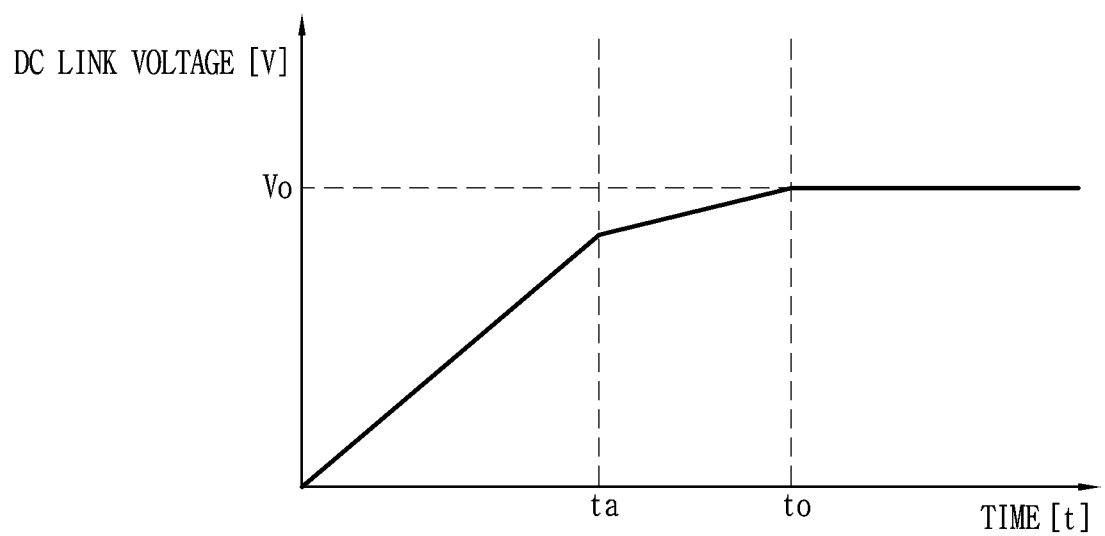

The increase reference is also set such that the DC link voltage (Vdc) increases to the maximum voltage level (V0) at a predetermined slope for each predetermined section (0-ta and ta-t0) after the initial driving, as shown in FIG. 25E or 25F.

In this case, the control unit 380 may increase the target output value at a predetermined slope for each predetermined section (0-ta and ta-t0) and control the operation of the converter 370 so as to control the DC power output to the DC link capacitor 372 to increase at a predetermined slope for each predetermined section (0-ta and ta-t0), thereby increasing the DC link voltage (Vdc), as shown in FIG. 25E or 25F.

Here, the predetermined slope for each predetermined section (0-ta and ta-t0) may be set differently for each predetermined section (0-ta and ta-t0).

In this way, the control unit 380 that controls the operation of the converter 370 to increase the DC link voltage (Vdc) according to the increase reference so as to increase the DC link voltage (Vdc) based on the increase reference may control an increase of the DC link voltage (Vdc) according to the capacity of an object to be dried accommodated in the drum 310 of the clothing treatment apparatus.

Figure 26:
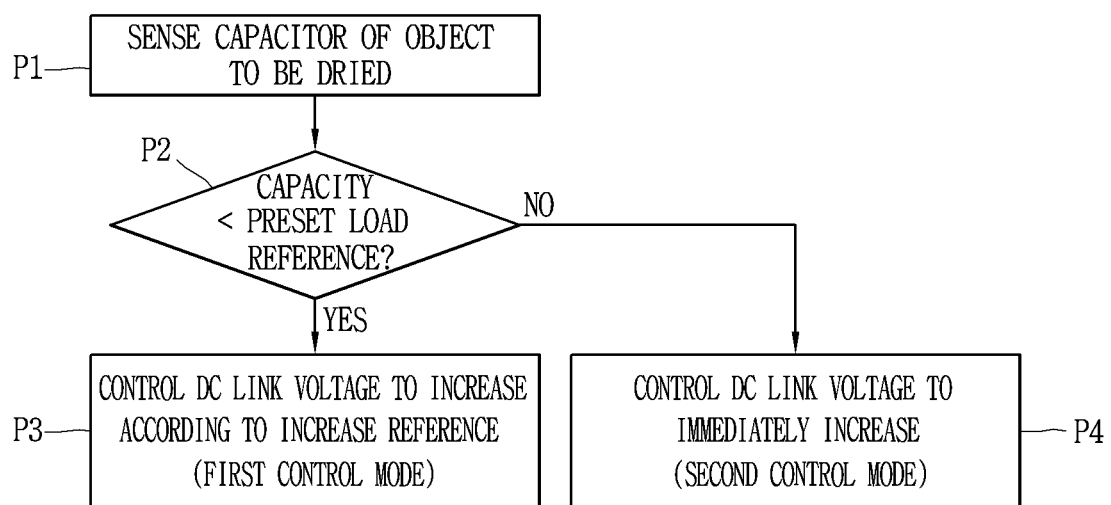
FIG. 26 is a flowchart showing an initial driving control process of a clothing treatment apparatus according to the clothing treatment apparatus and the control method thereof according to an embodiment of the present disclosure.

In other words, the control unit 380 may sense the capacity of the object to be dried accommodated in the drum 310 during the initial driving (P1), and control the increase of the DC link voltage (Vdc) (P3 or P4) based on the sensed capacity (P2), as shown in FIG. 26.

The control unit 380 may sense the capacity of the object to be dried accommodated in the drum 310 during the initial driving (P1).

The control unit 380 may sense the capacity accommodated in the drum 310 using a sensor included in the sensing unit 340 (P1).

The control unit 380 may sense the capacity accommodated in the drum 310 (P1) using at least one of a current sensor, a voltage sensor, a vibration sensor, a noise sensor, an ultrasonic sensor, a pressure sensor, an infrared sensor, a visual sensor (camera sensor), and a temperature sensor included in the sensing unit 340.

For example, the weight of the drum 340 may be measured using the pressure sensor that senses a pressure applied by the drum 340 to sense the capacity based on this, or an inner state of the drum 340 may be captured using the infrared sensor or the visual sensor that senses the inner state of the drum 340 to sense the capacity based on this.

The control unit 380 may sense the capacity (P1), and compare the sensed capacity with a preset load reference (P2) to control an increase of the DC link voltage (Vdc) according to the comparison result (P3 or P4).

Here, the load reference may be a control reference for the degree of the capacity.

In other words, the control unit 380 may compare the capacity and the load reference (P2) to determine whether the capacity is high or low, and control an increase of the DC link voltage (Vdc) according to whether the determined capacity is high or low.

As a result of comparing the capacity and the load reference (P2), when the capacity is less than the load reference, the control unit 380 may control the operation of the converter 370 to increase the DC link voltage (Vdc) according to the increase reference (P3).

As a result of comparing the capacity and the load criterion (P2), when the capacity is less than the load reference, the control unit 380 may determine that the capacity accommodated in the drum 340 is low, and control the operation of the converter 370 to increase the DC link voltage (Vdc) according to the increase reference (P3).

In other words, when the capacity is less than the load reference, the control unit 380 may determine that the capacity accommodated in the drum 340 is low so that it is not necessary to rapidly drive the clothing treatment apparatus, in other words, that it is not necessary to rapidly increase the DC link voltage (Vdc), and control the operation of the converter 370 such that the DC link voltage (Vdc) gradually increases according to the increase reference (P3).

When the capacity is less than the load reference, the control unit 380 may vary the increase reference according to the capacity to control the operation of the converter 370 (P3).

In other words, when the capacity is less than the load reference, the control unit 380 may vary the increase reference according to a difference between the capacity and the load reference to control the operation of the converter 370 (P3).

When the capacity is less than the load reference, the control unit 380 may determine that it is not necessary to rapidly increase the DC link voltage (Vdc), and vary the increase reference to gradually increase the DC link voltage (Vdc) according to a difference between the capacity and the load reference so as to the operation of the converter 370 (P3).

For example, the control unit 380 may vary a slope of the increase reference according to a difference between the capacity and the load reference so as to control the DC link voltage (Vdc) to increase according to the degree of the capacity.

The control unit 380 may vary the increase reference so that the DC link voltage (Vdc) increases more slowly than the increase reference, or vary the increase reference so that the DC link voltage (Vdc) increases more rapidly than the increase reference according to a difference between the capacity and the load reference.

In other words, the control unit 380 may be vary the reference to increase or decrease according to a difference between the capacity and the load reference, thereby varying an increase width of the DC link voltage (Vdc).

For instance, the load reference may be varied to decrease the increase reference when the capacity is scarce and significantly less than the load reference, or varied to increase the increase reference when the capacity is close to the load criterion and there is little difference, thereby controlling the increase reference to increase according to the capacity.

For a specific example, when the increase reference is set to increase by 5 [V] per 1 [s], and the capacity corresponds to less than half of the increase reference, it may be determined that there is no need to increase the DC link voltage (Vdc) according to the increase reference, so as to vary the increase reference to increase by 3 [V] per 1 [s], thereby controlling the operation of the converter 370 to increase the DC link voltage (Vdc) by 3 [V] per 1 [s] according to the varied increase reference (P3).

Alternatively, when the increase reference is set to increase by 5 [V] per 1 [s], and the capacity corresponds to 95 [%] or more of the increase reference, it may be determined that the DC link voltage (Vdc) is needed to increase more rapidly than the increase reference, so as to vary the increase reference to increase by 7 [V] per 1 [s], thereby controlling the operation of the converter 370 to increase the DC link voltage (Vdc) by 7 [V] per 1 [s] according to the varied increase reference (P3).

As a result of comparing the capacity and the load reference (P2), when the capacity is above the load reference, the control unit 380 may control the operation of the converter 370 to increase the DC link voltage (Vdc) without depending on the increase reference (P4).

As a result of comparing the capacity and the load criterion (P2), when the capacity is above the load reference, the control unit 380 may determine that the capacity accommodated in the drum 340 is high, and control the operation of the converter 370 to immediately increase the DC link voltage (Vdc) regardless of the increase reference (P4).

In other words, when the capacity is above the load reference, the control unit 380 may determine that the capacity accommodated in the drum 340 is high so that it is necessary to immediately drive the clothing treatment apparatus, in other words, that it is necessary to immediately increase the DC link voltage (Vdc), and control the operation of the converter 370 such that the DC link voltage (Vdc) immediately increases regardless of the increase reference (P4).

As such, the control device 1600 may control the operation of the converter 370 to increase the DC link voltage (Vdc) according to the increase reference depending on the capacity during the initial driving, so as to increase the DC link voltage (Vdc) based on the increase reference, thereby reducing an increase width of the DC link voltage (Vdc) to decrease a difference between the previous value and the current value, that is, an error value between the control periods so as to achieve stable control.

{Clothing Treatment Apparatus}

As shown in FIG. 3A, a clothing treatment apparatus according to the present disclosure may include a drum 301 in which an object to be dried is accommodated to perform a drying operation, a blower fan 302 that promotes the flow of air inside the clothing treatment apparatus, a heat pump 303 that removes moisture in the air exhausted from the drum 301 to exchange heat, a plurality of motors 360 that drive each of the drum 301, the blower fan 302, and the heat pump 303, a converter 370 that converts AC power input from an external supply into DC power, a plurality of inverters 350 that receive the DC power from the converter 370 to convert into driving power for driving the plurality of motors 360 so as to output it to the plurality of motors 360, respectively, and a control unit 380 that controls the operation of the converter 370 and the inverters 350, wherein the control unit 380 controls an increase in a DC link voltage (Vdc) of a DC link capacitor 372 provided in the converter 370 according to the capacity of an object to be dried when the clothing treatment apparatus is initially driven.

Here, the inverter 350, the converter 370, and the control unit 380 may be composed of a control device provided on one substrate, and may be the control device 1600 described above.

In other words, the clothing treatment apparatus may include the control device 1600 including the drum 301, the blower fan 302, the heat pump 303, the plurality of motors 360 and the inverters 350, the converter 370, and the control unit.

In the clothing treatment apparatus, the control unit 380 may control an increase of the DC link voltage (Vdc) in the DC link capacitor 372 provided in the converter 370 according to the capacity of an object to be dried accommodated in the drum 301 when the clothing treatment apparatus is initially driven.

In other words, the control unit 380 may control an increase of the DC link voltage (Vdc) according to the capacity.

For instance, depending on whether the capacity is less than the reference value, an increase width of the DC link voltage (Vdc) may be controlled.

The control unit 380 may control the operation of the converter 370 according to the capacity to control an increase of the DC link voltage (Vdc).

The converter 370 may include a rectifying member 371 that converts the AC power to the DC power and the DC link capacitor 372 that smooths the DC power converted by the rectifying member 371 to convert the AC power into the DC power, and may be controlled by the control unit 380.

The control unit 380 may control the operation of the rectifying member 371 according to the capacity to control the DC power transferred to the DC link capacitor 372, thereby controlling an increase of the DC link voltage (Vdc).

The control unit 380 may control a target output value of the rectifying member 371 output to the DC link capacitor 372 according to the capacity to control an increase of the DC link voltage (Vdc).

In other words, the control unit 380 may control the conversion operation of the DC power of the converter 370 by controlling the target output value of the rectifying member 371 to control an increase of the DC link voltage (Vdc).

The control unit 380 may increase the target output value according to the capacity to control an increase of the DC link voltage (Vdc).

The control unit 380 may increase the target output value and control the conversion operation of the rectifying member 371 to increase the output of the DC power transferred from the rectifying member 371 to the DC link capacitor 372, thereby controlling am increase of the DC link voltage (Vdc).

As shown in FIG. 26, the control unit 380 may sense the capacity of an object to be dried accommodated in the drum 301 when the clothing treatment apparatus is initially driven (P1), and control an increase of the DC link voltage (Vdc) (P3 or P4) based on the sensed capacity (P2).

The control unit 380 may sense the capacity (P1), and compare the capacity with a preset load reference (P2) to control an increase of the DC link voltage (Vdc) according to the comparison result (P3 or P4).

Here, the load reference may be an appropriate reference for the capacity, an appropriate laundry amount reference of the capacity, a reference for an appropriate carrying capacity of the drum 301, or a recommended laundry amount reference for the clothing treatment apparatus.

The control unit 380 may compare the capacity with the load reference (P2), and control an increase of the DC link voltage (Vdc) according to whether the capacity is less than or above the load reference (P3 or P4).

For instance, when the capacity is less than the load reference, it may be determined that an object to be dried accommodated in the drum 301 is accommodated less than an appropriate reference to gradually control the driving of the drum 301, that is, determined that the DC link capacitor 372 is not needed to immediately increase the DC power transferred to the inverter 350, thereby controlling the DC link voltage (Vdc) to gradually increase.

As a result of comparing the capacity with the load reference (P2), the control unit 380 may control the DC link voltage (Vdc) to increase sequentially according to a preset increase reference when the capacity is less than the load reference (P3).

In other words, when the capacity is less than the load reference, the control unit 380 may sequentially increase the DC link voltage (Vdc) according to the increase reference.

The increase reference may be a reference for an increase slope or an increase method of the DC link voltage (Vdc).

The increase reference may be shown as in FIGS. 25A to 25F.

The increase reference may be a reference set such that the DC link voltage (Vdc) increases by a predetermined amount per hour up to a maximum voltage level.

The increase reference may be a reference set such that the DC link voltage (Vdc) increases to the maximum voltage level for a predetermined period of time.

When controlled to sequentially increase according to the increase reference (P3), the control unit 380 may sequentially increase a target output value of the DC power output from the converter 370 according to the increase reference.

In other words, the control unit 380 may sequentially increase the target output value according to the increase reference and control the conversion operation of the rectifying member 371, thereby controlling the DC link voltage (Vdc) to sequentially increase according to the increase reference (P4).

When controlled to sequentially increase the DC link voltage (Vdc) according to the increase reference (P3) because the capacity corresponds to less than the load reference, the control unit 380 may vary the increase reference according to the capacity.

In other words, when the DC link voltage (Vdc) is sequentially increased (P3), the control unit 380 may vary the increase reference according to a difference between the capacity and the load reference to control an increase of the DC link voltage (Vdc).

For instance, the control unit 380 may vary a slope of the increase reference according to a difference between the capacity and the load reference so as to control the DC link voltage (Vdc) to increase according to the degree of the capacity.

The control unit 380 may vary the increase reference so that the DC link voltage (Vdc) increases more slowly than the increase reference, or vary the increase reference so that the DC link voltage (Vdc) increases more rapidly than the increase reference according to a difference between the capacity and the load reference.

In other words, the control unit 380 may vary the reference to increase or decrease according to a difference between the capacity and the load reference, thereby varying an increase width of the DC link voltage (Vdc).

For instance, the load reference may be varied to decrease the increase reference when the capacity is scarce and significantly less than the load reference, or varied to increase the increase reference when the capacity is close to the load criterion and there is little difference, thereby controlling the increase reference to increase according to the capacity.

As a result of comparing the capacity and the load reference (P2), when the capacity is above the load reference, the control unit 380 may control the DC link voltage (Vdc) to immediately increase (P4).

As a result of comparing the capacity and the load criterion (P2), when the capacity is above the load reference, the control unit 380 may determine that the capacity accommodated in the drum 340 is high, and control the DC link voltage (Vdc) to immediately increase regardless of the increase reference (P4).

In other words, when the capacity is above the load reference, the control unit 380 may immediately increase the DC link voltage (Vdc) regardless of the increase reference.

{Control Method 1 of Clothing Treatment Apparatus}

As shown in FIGS. 3A and 3B, a control method 1 of a clothing treatment apparatus according to the present disclosure (hereinafter, referred to as a control method 1) may be a control method of a clothing treatment apparatus, including a drum 301 in which an object to be dried is accommodated to perform a drying operation, a blower fan 302 that promotes the flow of air inside the clothing treatment apparatus, a heat pump 303 that removes moisture in the air exhausted from the drum 301 to exchange heat, a plurality of motors 360 that drive each of the drum 301, the blower fan 302, and the heat pump 303, a converter 370 that converts AC power input from an external supply into DC power, and a plurality of inverters 350 that receive the DC power from the converter 370 to convert into driving power for driving the plurality of motors 360 so as to output it to the plurality of motors 360, respectively, which is a method of controlling the clothing treatment apparatus of the control device 1600 as described above.

In other words, the control method 1 may be applicable to the control device 1600 as described above.

In addition, the control method 1 may be applicable to the clothing treatment apparatus including the control device 1600 as described above.

The control method 1 may be a control method for controlling the initial driving of the clothing treatment apparatus.

In other words, the control method 1 may be a control method for the initial driving control of the clothing treatment apparatus.

The control method 1 may be a control method in which the control unit 380 included in the control device 1600 performs the initial driving control of the clothing treatment apparatus.

Figure 27:
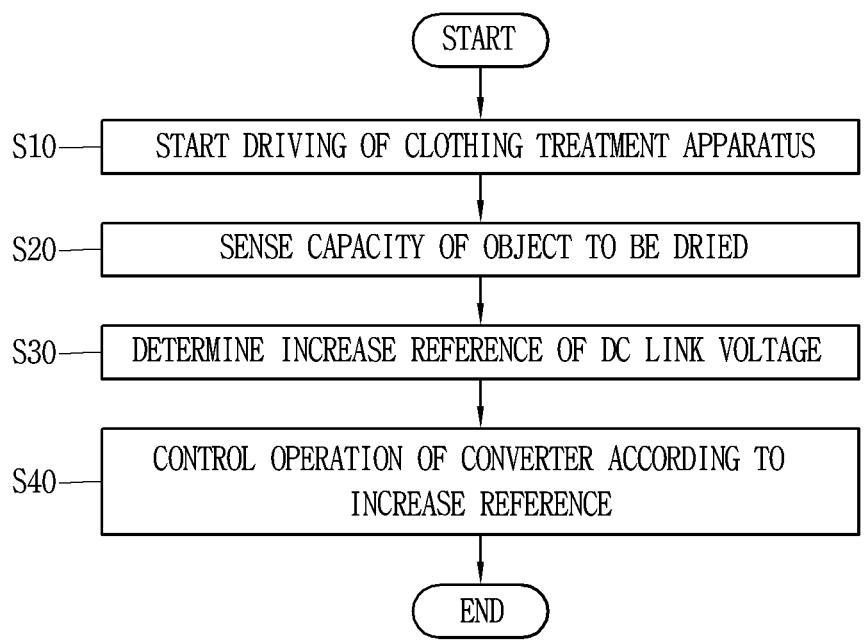
FIG. 27 is a flowchart showing a sequence of control method 1 of a clothing treatment apparatus according to the clothing treatment apparatus and the control method thereof according to an embodiment of the present disclosure.

As shown in FIG. 27, the control method 1 includes starting the driving of the clothing treatment apparatus (S10), sensing the capacity of the object to be dried (S20), determining an increase reference of the DC link voltage (Vdc) of the DC link capacitor 372 included in the converter 370 based on the capacity (S30), and controlling the operation of the converter 370 to increase the DC link voltage (Vdc) according to the increase reference (S40).

In other words, the control method 1 is a method of controlling the initial driving of the clothing treatment apparatus in a sequence of said starting step (S10), said sensing step (S20), said determining step (S30), and said controlling step (S40), and the control unit 380 performs control in the sequence of said starting step (S10), said sensing step (S20), said determining step (S30), and said controlling step (S40) to control an increase of the DC link voltage (Vdc), thereby controlling the initial driving of the clothing treatment apparatus.

Said starting step (S10) may be a step in which power is applied to the clothing treatment apparatus to start the driving the clothing treatment apparatus.

In said starting step (S10), the control unit 380 may control driving power to be applied to one or more components included in the clothing treatment apparatus.

Said sensing step (S20) may be a step of sensing the capacity of the object to be dried accommodated in the drum 301 after starting the driving of the clothing treatment apparatus (S10).

The control unit 380 may sense the capacity accommodated in the drum 301 using a sensor included in the sensing unit 340 in said sensing step (S20).

Said determining step (S30) may be a step of determining the increase reference according to the capacity after sensing the capacity (S20).

In said determining step S30, the control unit 380 may judge and determine the increase reference, which is an increase reference of the DC link voltage (Vdc), based on the capacity.

Figure 28:
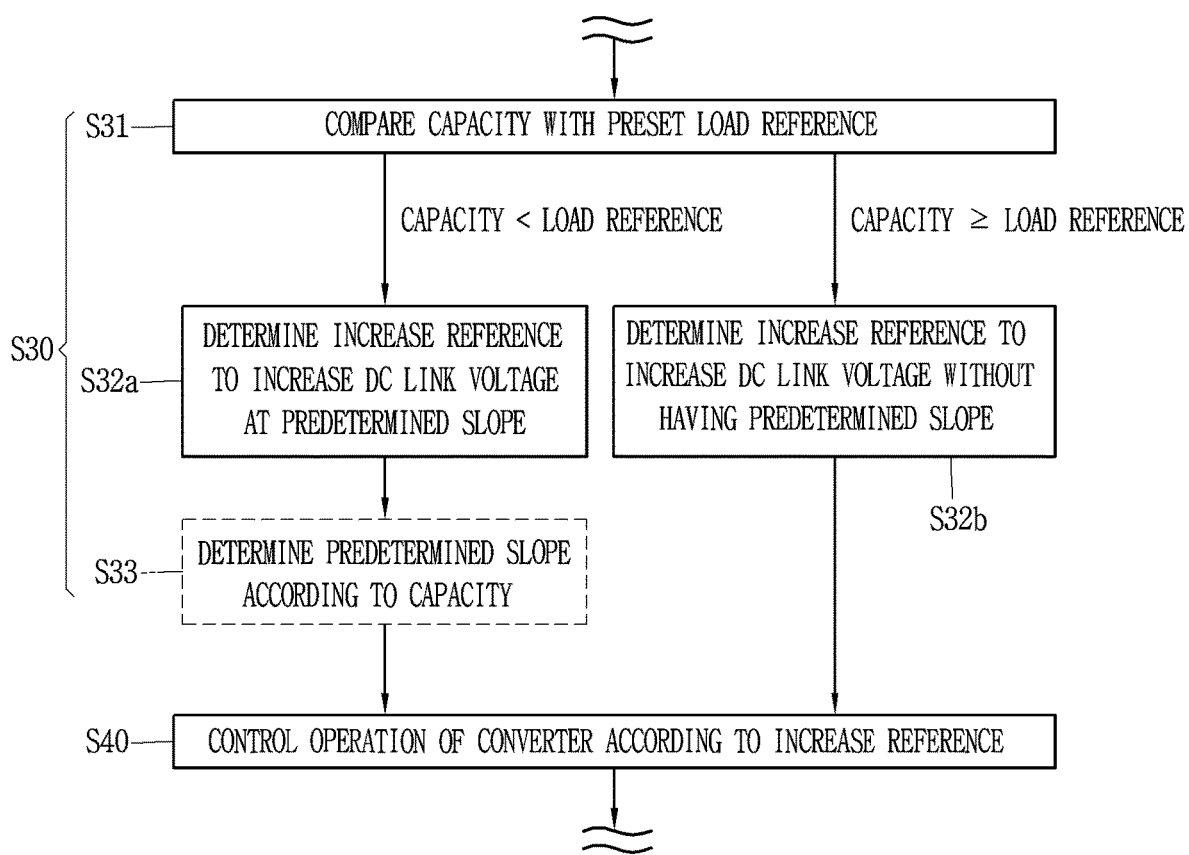
FIG. 28 is a flowchart showing a sequence according to a specific embodiment of the control method 1 of the clothing treatment apparatus shown in FIG. 27.

Said determining step (S30) may compare the capacity with a preset load reference (S31) to determine the increase reference (S32) according to the comparison result, as shown in FIG. 28.

Said determining step (S30) may compare the capacity with the load reference (S31) to determine whether the capacity is less than the load reference.

Said determining step (S30) may determine the increase reference to increase the DC link voltage (Vdc) at a predetermined slope (S32a) when the capacity is less than the load reference as a result of comparing the capacity and the load reference (S31).

In other words, when the capacity is less than the load reference, the increase reference may be determined (S32a) to increase the DC link voltage (Vdc) at the predetermined slope, thereby controlling the DC link voltage (Vdc) to increase at the predetermined slope according to the increase reference.

Said determining step S30 may determine the predetermined slope according to the capacity (S33).

Said determining step (S30) may determine the predetermined slope (S33) according to a degree that the capacity is less than the load reference.

Said determining step (S30) may determine the predetermined slope so that the DC link voltage (Vdc) increases slowly or the DC link voltage (Vdc) increases rapidly according to a difference between the capacity and the load reference (S33).

In other words, said determining step (S30) may determine the predetermined slope according to a difference between the capacity and the load reference, thereby controlling an increase width of the DC link voltage (Vdc) according to the capacity.

Said determining step (S30) may determine the increase reference to increase the DC link voltage (Vdc) without having the predetermined slope (S32b) when the capacity is above the load reference as a result of comparing the capacity and the load reference (S31).

In other words, when the capacity is above the load reference, the increase reference may be determined (S32b) to increase the DC link voltage (Vdc) without having the predetermined slope, thereby controlling the DC link voltage (Vdc) to immediately increase according to the increase reference.

Said controlling step (S40) may control the operation of the converter 370 to increase the DC link voltage (Vdc) according to the increase reference after determining the increase reference (S30).

The control unit 380 may control the conversion operation of the rectifying member 371 that converts the AC power to the DC power in said controlling step (S40), thereby controlling the operation of the converter 370 to increase the DC link voltage (Vdc).

Said controlling step (S40) may control the operation of the converter 370 to increase a target output value of the DC power output from the converter 370 according to the increase reference.

In other words, said controlling step (S40) may increase the target output value of the rectifying member 371 at which the DC power is output to the DC link capacitor 372 according to the increase reference, and control the operation of the rectifying member 371, thereby controlling the DC link voltage (Vdc) to increase according to the increase reference.

{Control Method 2 of Clothing Treatment Apparatus}

As shown in FIGS. 3A and 3B, a control method 2 of a clothing treatment apparatus according to the present disclosure (hereinafter, referred to as a control method 2) may be a control method of a clothing treatment apparatus, including a drum 301 in which an object to be dried is accommodated to perform a drying operation, a blower fan 302 that promotes the flow of air inside the clothing treatment apparatus, a heat pump 303 that removes moisture in the air exhausted from the drum 301 to exchange heat, a plurality of motors 360 that drive each of the drum 301, the blower fan 302, and the heat pump 303, a converter 370 that converts AC power input from an external supply into DC power, and a plurality of inverters 350 that receive the DC power from the converter 370 to convert into driving power for driving the plurality of motors 360 so as to output it to the plurality of motors 360, respectively, which is a method of controlling the clothing treatment apparatus as described above.

In other words, the control method 2 may be applicable to the control device 1600 as described above.

In addition, the control method 2 may be applicable to the clothing treatment apparatus including the control apparatus 1600 as described above.

The control method 2 may be a control method for controlling driving including initial driving of the clothing treatment apparatus.

In other words, the control method 2 may be a control method for the driving control of the clothing treatment apparatus.

The control method 2 may be a control method in which the control unit 380 included in the control device 1600 performs the initial driving control of the clothing treatment apparatus.

Figure 29:
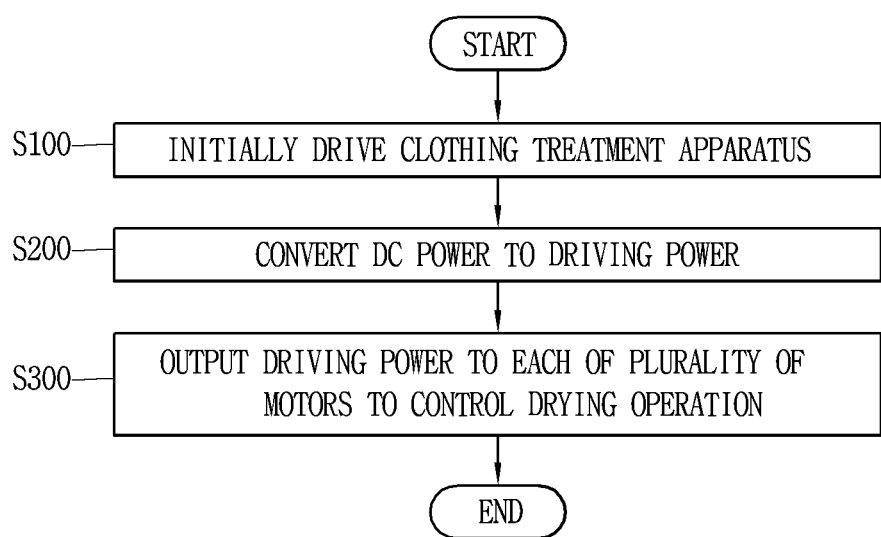
FIG. 29 is a flowchart showing a sequence of a control method 2 of a clothing treatment apparatus according to the clothing treatment apparatus and the control method thereof according to an embodiment of the present disclosure.

As shown in FIG. 29, the control method 2 includes initially driving the clothing treatment apparatus (S100), converting the DC power to the driving power (S200), and outputting the driving power to the plurality of motors 360, respectively, to control the drying operation (S300).

Here, said initially driving step (S100) may be carried out as in the control method 1 as described above.

Said initially driving step S100 may be a step of controlling the converter 370.

As shown in FIG. 27, said initially driving step (S100) may include starting the driving of the clothing treatment apparatus (S10), sensing the capacity of the object to be dried (S20), determining an increase reference of the DC link voltage (Vdc) of the DC link capacitor 372 included in the converter 370 based on the capacity (S30), and controlling the operation of the converter 370 to increase the DC link voltage (Vdc) according to the increase reference (S40).

Said starting step (S10) may be a step in which power is applied to the clothing treatment apparatus to start the driving the clothing treatment apparatus.

Said sensing step (S20) may be a step of sensing the capacity of the object to be dried accommodated in the drum 301 after starting the driving of the clothing treatment apparatus (S10).

Said determining step (S30) may be a step of determining the increase reference according to the capacity after sensing the capacity (S20).

Said determining step (S30) may compare the capacity with a preset load reference (S31) to determine the increase reference (S32) according to the comparison result, as shown in FIG. 28.

Said determining step (S30) may compare the capacity with the load reference (S31) to determine whether the capacity is less than the load reference.

Said determining step (S30) may determine the increase reference to increase the DC link voltage (Vdc) at a predetermined slope (S32a) when the capacity is less than the load reference as a result of comparing the capacity and the load reference (S31).

In other words, when the capacity is less than the load reference, the increase reference may be determined (S32a) to increase the DC link voltage (Vdc) at the predetermined slope, thereby controlling the DC link voltage (Vdc) to increase at the predetermined slope according to the increase reference.

Said determining step S30 may determine the predetermined slope according to the capacity (S33).

Said determining step (S30) may determine the predetermined slope (S33) according to a degree that the capacity is less than the load reference.

Said determining step (S30) may determine the predetermined slope so that the DC link voltage (Vdc) increases slowly or the DC link voltage (Vdc) increases rapidly according to a difference between the capacity and the load reference (S33).

Said determining step (S30) may determine the increase reference to increase the DC link voltage (Vdc) without having the predetermined slope (S32b) when the capacity is above the load reference as a result of comparing the capacity and the load reference (S31).

Said controlling step (S40) may control the operation of the converter 370 to increase the DC link voltage (Vdc) according to the increase reference after determining the increase reference (S30).

Said controlling step (S40) may control the operation of the converter 370 to increase a target output value of the DC power output from the converter 370 according to the increase reference.

In other words, said controlling step (S40) may increase the target output value of the rectifying member 371 at which the DC power is output to the DC link capacitor 372 according to the increase reference, and control the operation of the rectifying member 371, thereby controlling the DC link voltage (Vdc) to increase according to the increase reference.

As described above, said initially driving step (S100) including said starting step (S10), said sensing step (S20), said determining step (S30), and said controlling step (S40) may be carried out for a preset driving period of time.

Said converting to the driving power (S200) may be a step of controlling the inverter 350.

Said converting to the driving power (S200) may convert the DC power received from the DC link capacitor 372 from the inverter 350 into the driving power after controlling the converter 370 in the initially driving step (S100).

Said controlling the drying operation (S300) may be a step of outputting the driving power to the plurality of motors 360, respectively, to controlling the drying operation.

Said controlling the drying operation (S300) may control the inverter 350s in said converting to the driving power (S200), and then output the driving power converted by the inverters 350 to the plurality of motors 360, respectively, to control the drying operation.

The embodiments of the control device of the clothing treatment apparatus, the clothing treatment apparatus, and the control methods 1 and 2 of the clothing treatment apparatus as described above may be implemented separately and independently, and may also be implemented in a combination of two or more thereof.

The embodiments of the control device of the clothing treatment apparatus, the clothing treatment apparatus, and the control methods 1 and 2 of the clothing treatment apparatus as described above may be implemented as a part or a combination of components or steps included in each of the embodiments, or may be implemented as a combination of the embodiments.

The embodiments of the control device of the clothing treatment apparatus, the clothing treatment apparatus, and the control methods 1 and 2 of the clothing treatment apparatus as described above may be applicable to a control device, a control module, and a control member for controlling the clothing treatment apparatus, a control method of the control device for controlling the clothing treatment apparatus, a control method of controlling the clothing treatment apparatus, a control system of the clothing treatment apparatus, and the like.

The embodiments of the control device of the clothing treatment apparatus, the clothing treatment apparatus, and the control methods 1 and 2 of the clothing treatment apparatus as described above may be usefully applicable, in particular, to a control device provided with a converter and a plurality of inverters to control the initial driving of the clothing treatment apparatus, a clothing treatment apparatus including the same, or a control method thereof.

The embodiments of the control device of the clothing treatment apparatus, the clothing treatment apparatus, and the control methods 1 and 2 of the clothing treatment apparatus as described above may also be applicable to any clothing treatment apparatuses, dryers, initial driving control methods of the clothing treating apparatus, driving control methods of the clothing treatment apparatus, and the like.

The embodiments of the clothing treatment apparatus and the control method thereof as described above may be implemented separately and respectively, and may also be implemented in a combination of two or more thereof, or may be implemented as a part or a combination of components or steps included in each of the embodiments, or may be implemented as a combination of the embodiments.

Furthermore, the embodiments of the clothing treatment apparatus and the control method thereof according to the present disclosure may be implemented as computer-readable codes on a medium in which a program is written The computer-readable media may include any types of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the control unit 380 of the clothing treatment apparatus 1000.

Although a specific embodiment according to the present disclosure has been described so far, various modifications may of course be made without departing from the scope of the present disclosure. Therefore, the scope of the present disclosure should not be limited to the described embodiments, and should not be defined by the scope and equivalents of the claims as well as the scope of the claims which will be described later.

Although the present invention has been described with respect to specific embodiments and drawings, the present invention is not limited to those embodiments, and it will be apparent to those skilled in the art that various changes and modifications can be made from the description disclosed herein. Accordingly, all of the equivalent or equivalent modifications thereof will fall into the scope of the concept of the present invention.

What is claimed is:

1. A clothing treatment apparatus comprising:
   a main body that defines an outer appearance of the clothing treatment apparatus;
   a drum rotatably disposed inside the main body and configured to accommodate an object to be dried;
   a heat pump comprising a compressor and a condenser, the heat pump being configured to compress refrigerant by the compressor and to circulate the refrigerant through the condenser to thereby remove moisture in heated air discharged from the drum and circulate dehumidified air to the drum;
   a blower fan configured to generate a flow of the heated air or the dehumidified air;
   a first motor configured to rotate the drum;
   a second motor configured to rotate the blower fan;
   a third motor configured to drive the compressor;
   a converter configured to convert input power received from an external power source and to supply the converted input power to at least one of the first motor, the second motor, or the third motor; and
   a controller configured to control the converter and the compressor, the controller configured to:
   drive the compressor at a first time point, and
   drive the converter at a second time point subsequent to the first time point.

2. The clothing treatment apparatus of claim 1, wherein the controller is configured to drive the converter based on an elapse of a time interval after initiating an operation of the compressor at the first time point.

3. The clothing treatment apparatus of claim 2, wherein the controller is configured to:
   detect a magnitude of load applied to the compressor; and
   determine the time interval based on the magnitude of the load, the time interval being defined from the first time point to the second time point at which an operation of the converter is to be initiated.

4. The clothing treatment apparatus of claim 3, wherein the controller is configured to:
   generate a speed command value to be applied to the third motor; and
   control the converter based on the speed command value.

5. The clothing treatment apparatus of claim 4, wherein the controller is configured to reduce the time interval based on an increase of the speed command value.

6. The clothing treatment apparatus of claim 3, wherein the controller is configured to reduce the time interval based on an increase of a magnitude of a voltage applied to the third motor.

7. The clothing treatment apparatus of claim 3, wherein the controller is configured to reduce the time interval based on an increase of a magnitude of a current through the third motor.

8. The clothing treatment apparatus of claim 3, further comprising a sensor configured to detect a weight of clothes accommodated in the drum,
   wherein the controller is configured to control the converter based on the weight of the clothes detected by the sensor.

9. The clothing treatment apparatus of claim 8, wherein the controller is configured to reduce the time interval based on the weight of the clothes detected by the sensor.

10. The clothing treatment apparatus of claim 3, wherein the controller is configured to simultaneously drive the converter and the compressor based on the magnitude of the load applied to the compressor being greater than a preset limit load.

11. The clothing treatment apparatus of claim 1, wherein the controller is configured to initiate an operation of the converter before the third motor reaches a preset speed.

12. The clothing treatment apparatus of claim 1, wherein the controller is configured to:
   determine an amount of power consumed by the first motor, the second motor, and the third motor, and
   control the converter based on the determined amount of power.

13. The clothing treatment apparatus of claim 1, wherein the controller is configured to:
   control the first motor to rotate the drum before driving the blower fan and the compressor;
   control the second motor to rotate the blower fan after the drum starts to rotate; and
   control the third motor to drive the compressor after the blower fan starts to rotate.

14. The clothing treatment apparatus of claim 1, further comprising:
   a first inverter configured to supply the converted input power to the first motor;
   a second inverter configured to supply the converted input power to the second motor; and
   a third inverter configured to supply the converted input power to the third motor,
   wherein the controller is configured to independently control switching operations of the first inverter, the second inverter, and the third inverter, respectively.

15. The clothing treatment apparatus of claim 14, wherein the controller is configured to control the converter based on a switching signal applied to at least one of the first inverter, the second inverter, or the third inverter.

16. The clothing treatment apparatus of claim 1, wherein the controller is configured to delay the second time point by a predetermined time period from the first time point or from a start time point of a rotation of the drum to thereby reduce a leakage current in the controller.

17. A method for controlling a clothing treatment apparatus, the clothing treatment apparatus including a main body, a drum rotatably disposed inside the main body and configured to accommodate an object to be dried, a heat pump configured to compress refrigerant by a compressor and to circulate the refrigerant through a condenser to thereby remove moisture in heated air discharged from the drum and circulate dehumidified air to the drum, a blower fan configured to generate a flow of the heated air or the dehumidified air, a first motor configured to rotate the drum, a second motor configured to rotate the blower fan, a third motor configured to drive the compressor, a converter configured to convert input power received from an external power source and to output the converted input power to at least one of the first motor, the second motor, or the third motor, and a controller configured to control the converter and the compressor, the method comprising:

driving the compressor at a first time point, and driving the converter at a second time point subsequent to the first time point.

18. The method of claim 17, wherein driving the converter comprises:

driving the converter based on an elapse of a time interval after initiating an operation of the compressor at the first time point.

19. The method of claim 18, further comprising:

detecting a magnitude of load applied to the compressor, and determining the time interval based on the magnitude of the load, the time interval being from the first time point to the second time point at which an operation of the converter is initiated.

20. The method of claim 19, further comprising:

generating a speed command value to be applied to the third motor; and controlling the converter based on the speed command value.

\* \* \* \* \*